United States Patent
Hitomi et al.

(10) Patent No.: US 6,968,825 B2
(45) Date of Patent: Nov. 29, 2005

(54) CONTROL DEVICE FOR SPARK-IGNITION ENGINE

(75) Inventors: Mitsuo Hitomi, Fuchu-cho (JP); Takayoshi Hayashi, Fuchu-cho (JP); Kouji Sumida, Fuchu-cho (JP); Masahisa Yamakawa, Fuchu-cho (JP); Satoru Matsuzaki, Fuchu-cho (JP); Hiroyuki Maeda, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/859,605

(22) Filed: Jun. 3, 2004

(65) Prior Publication Data

US 2005/0016496 A1    Jan. 27, 2005

(30) Foreign Application Priority Data

Jun. 6, 2003   (JP)   ............................. 2003-162169
Jun. 25, 2003  (JP)   ............................. 2003-181782
Jun. 25, 2003  (JP)   ............................. 2003-181783
Sep. 30, 2003  (JP)   ............................. 2003-341798

(51) Int. Cl.$^7$ ................................................ F02P 5/00
(52) U.S. Cl. .............................. 123/406.11; 123/406.3; 123/406.12; 123/406.26; 123/406.34; 123/406.47
(58) Field of Search ................... 123/406.3, 406.29, 123/406.11, 406.12, 406.19, 406.26, 406.34, 123/406.37, 406.41, 406.48

(56) References Cited

U.S. PATENT DOCUMENTS

| | | | |
|---|---|---|---|
| 4,194,472 A | 3/1980 | Amano et al. | |
| 4,237,832 A | 12/1980 | Hartig et al. | |
| 5,012,782 A * | 5/1991 | Tokuda ..................... | 123/406.3 |
| 6,336,436 B1 | 1/2002 | Miyakubo et al. | |
| 2001/0017123 A1 | 8/2001 | Raab et al. | |

OTHER PUBLICATIONS

"Development of New Concept Three-Way Catalyst for Automotive Lean-Burn Engines", XP-000863313, pp. 1361-1370.

* cited by examiner

*Primary Examiner*—Bibhu Mohanty
(74) *Attorney, Agent, or Firm*—Nixon Peabody LLP

(57) ABSTRACT

A control device for a spark-ignition engine, in which a mixture in a combustion chamber is fired by compression ignition in a part-load range under warm-running conditions, includes an EGR controller incorporating a valve operation controller for controlling internal EGR of hot burned gas and a cold EGR controller for controlling external EGR of cold burned gas. The EGR controller performs EGR control operation to leave the hot EGR gas in the combustion chamber in a lower-load, lower-speed region within a compression ignition combustion range and to introduce the cold EGR gas into the combustion chamber in a higher-load, higher-speed region within the compression ignition combustion range. The control device further includes a firing assist unit for inducing the compression ignition at least when ignitability of the mixture decreases due to introduction of the cold EGR gas in the compression ignition combustion range.

31 Claims, 34 Drawing Sheets

FIG.24
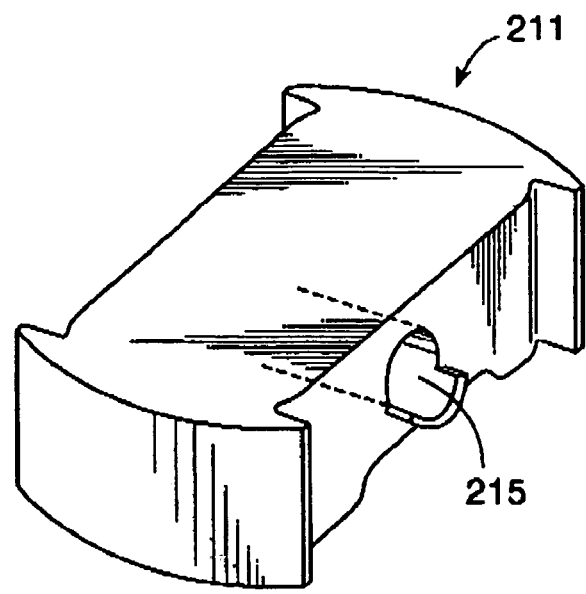
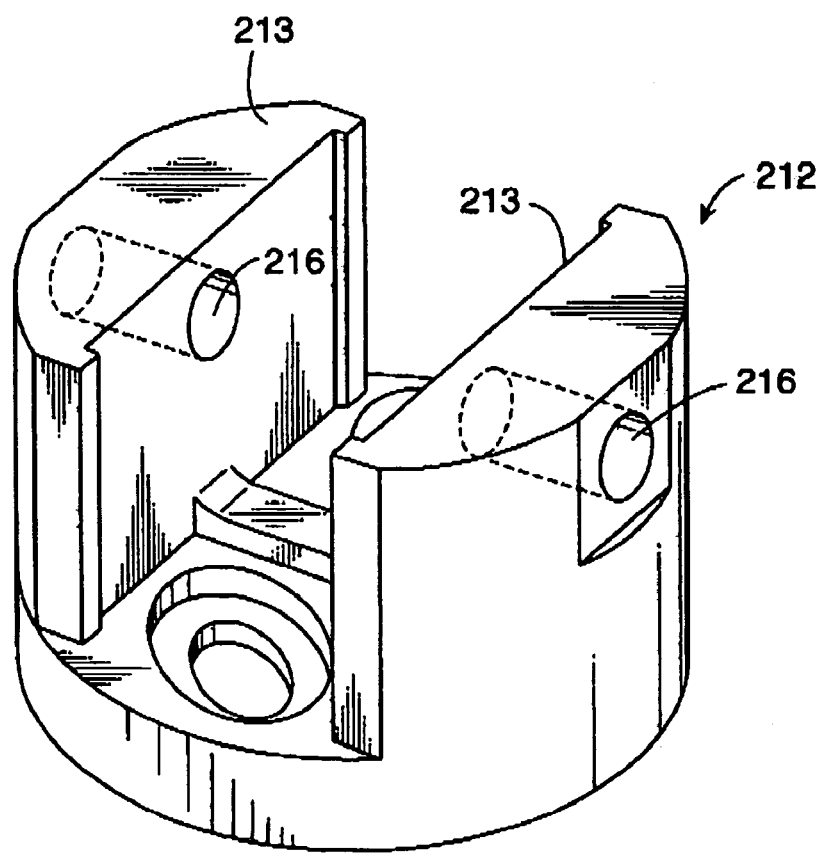

PRECEDING CYLINDER    FOLLOWING CYLINDER

CONTROL DEVICE FOR SPARK-IGNITION ENGINE

BACKGROUND OF THE INVENTION

1. Field of the Invention

The present invention relates to a spark-ignition engine which burns an air-fuel mixture in a combustion chamber by compression ignition in a part-load range under warm-running conditions.

2. Description of the Related Art

Compression ignition has intensively been studied in recent years as means for improving fuel economy in spark-ignition engines (gasoline engines). The compression ignition is spontaneous firing of a mixture in a combustion chamber occurring under high temperature and pressure conditions in a final part of a compression stroke as in a diesel engine. As the compression ignition causes the mixture to rapidly burn throughout the entire combustion chamber, the fuel economy greatly improves as a result of increased combustion efficiency. In addition, the compression ignition serves to decrease the production of nitrogen oxides (NOx), contributing thereby to an improvement in emissions.

Prior art proposes an arrangement for leaving hot burned gas in the combustion chamber by so-called internal exhaust gas recirculation (internal EGR) as a technique for producing the compression ignition. In an engine disclosed in Japanese Unexamined Patent Publication No. 2001-152919, for example, an intake valve is caused to open after an exhaust valve has closed to establish a negative overlap period, during which both of the intake valve and the exhaust valve are closed, in a specific part-load operation region, so that the amount of burned gas left in the combustion chamber due to the internal EGR increases and the compression ignition occurs as a result of a temperature increase in the combustion chamber caused by the internal EGR.

Although the compression ignition is efficiently produced due to the temperature increase in the combustion chamber by the internal EGR in a relatively low-speed, low-load operating region according to the aforementioned conventional arrangement, knocking is likely to occur under high-speed, high-load conditions due to an excessive temperature increase in the combustion chamber. In regions of increased knocking tendency, the internal EGR and compression ignition are interrupted and the mixture is ignited by an electric spark with the intake valve and the exhaust valve opened and closed with normal timing. It is however desirable to broaden a range of combustion initiated by compression ignition for improving the fuel economy and the quality of emissions. There has been a room for improvement in conventional spark-ignition engines from this point of view.

SUMMARY OF THE INVENTION

In view of the foregoing, it is an object of the invention to provide a control device for a spark-ignition engine which makes it possible to broaden a range of combustion initiated by compression ignition to a higher-load, higher-speed side and efficiently prevent knocking in higher-load, higher-speed regions within the range of combustion initiated by the compression ignition.

In a first principal form of the invention, a control device for a spark-ignition engine, in which a mixture in a combustion chamber is fired by compression ignition in a part-load range under warm-running conditions, includes an EGR controller and a firing assist unit. The EGR controller regulates the temperature in the combustion chamber at a point of the compression ignition by performing an EGR control operation in such a way that hot burned gas is left in the combustion chamber in a lower-load, lower-speed region within a compression ignition combustion range, which is an operating range in which the mixture is fired by the compression ignition, whereas cold burned gas is introduced into the combustion chamber in a higher-load, higher-speed region within the compression ignition combustion range. The firing assist unit accelerates the compression ignition at least when ignitability of the mixture decreases as a result of introduction of the cold burned gas in the compression ignition combustion range.

With the control device thus constructed, the temperature in the combustion chamber is increased by the hot burned gas left therein so that combustion can be initiated by the compression ignition in a preferable fashion in the lower-load, lower-speed region within the compression ignition combustion range. In the higher-load, higher-speed region within the compression ignition combustion range, on the other hand, there is a general tendency for the temperature in the combustion chamber to immoderately increase. However, the introduction of the cold burned gas into the combustion chamber serves to prevent an excessive temperature increase in the combustion chamber, contributing thereby to the prevention of knocking. While the introduction of the cold burned gas serves to prevent knocking, it creates a tendency for the compression ignition to become difficult. Nevertheless, the control device of the invention ensures that combustion is properly made by the compression ignition due to firing assist operation performed by the firing assist unit.

The compression ignition has not conventionally been used in relatively high-speed, high-load regions as the compression ignition, if produced, causes engine knock to occur. According to the present invention, however, a combination of the introduction of the cold burned gas into the combustion chamber and the firing assist operation makes it possible to broaden the compression ignition combustion range and properly combust the mixture by the compression ignition even in the high-speed, high-load regions.

Preferably, the EGR controller of the aforementioned control device of the invention performs the EGR control operation in such a way that the amount of hot burned gas left in the combustion chamber decreases as engine load increases in the compression ignition combustion range and the amount of cold burned gas introduced into the combustion chamber increases as the engine load increases in the higher-load region within the compression ignition combustion range.

The EGR control operation thus performed serves to regulate the ratio between the amount of hot burned gas and the amount of cold burned gas to make up for the aforementioned tendency for the temperature in the combustion chamber to excessively increase with an increase in engine load.

Preferably, the EGR controller includes a valve operation controller for regulating the amount of internal EGR gas by controlling the working of intake and exhaust valves, and a cold EGR controller for regulating the amount of external EGR gas recirculated from an exhaust passage through an EGR passage provided with a cooling unit.

This arrangement makes it possible to effectively regulate the amount of hot burned gas and the amount of cold burned gas.

Preferably, the firing assist unit is made essentially of an ignition controller for igniting the mixture in a cylinder before a top dead center in a compression stroke.

This arrangement helps accelerate the compression ignition due to a rapid increase in pressure in the cylinder caused by firing the mixture immediately before the top dead center in the compression stroke.

In a second principal form of the invention, a control device for a spark-ignition engine, in which a mixture in a combustion chamber is fired by compression ignition in a part-load range under warm-running conditions, includes an octane rating identifier, a firing assist unit and a firing assist ignition timing setter. The octane rating identifier determines the octane number of fuel supplied, and the firing assist unit accelerates the compression ignition by firing the mixture in the combustion chamber at a point preceding a top dead center in a compression stroke in part or all of an operating range in which the mixture is fired by the compression ignition. The firing assist ignition timing setter sets an ignition point according to the octane number determined by the octane rating identifier in the operating range in which the mixture is fired by the compression ignition for inducing the compression ignition, wherein the firing assist ignition timing setter progressively advances the ignition point as the octane number increases.

With the control device thus constructed, the compression ignition occurs in the part-load range of the engine and the mixture rapidly burns as a result of simultaneous firing at multiple points in the combustion chamber, contributing thereby to a significant improvement in fuel economy due to enhanced thermal efficiency as well as to an improvement in the quality of emissions. Also, this arrangement helps produce the compression ignition in a reliable fashion since the firing assist operation is performed to accelerate the compression ignition by firing the mixture in the combustion chamber at a point preceding the top dead center in the compression stroke.

In particular, the firing assist ignition timing setter adjusts the point of firing the mixture for inducing the compression ignition, in which the ignition point is progressively advanced as the octane number increases. Thus, the aforementioned arrangement serves to produce combustion initiated by the compression ignition in a preferable manner even when the octane number of the fuel supplied to the combustion chamber has changed.

Preferably, the control device of the aforementioned second principal form of the invention further includes an intra-cylinder temperature limiter for decreasing the temperature in a cylinder at compression stroke in a special operation region in which the temperature in the cylinder tends to excessively increase due to compression within the operating range in which the compression ignition is performed, wherein the firing assist unit fires the mixture for inducing the compression ignition at least in the special operation region.

While the intra-cylinder temperature limiter serves to prevent an excessive temperature increase in the combustion chamber, contributing thereby to the prevention of knocking, it creates a tendency toward a reduction of the capability of the engine to produce the compression ignition. Nevertheless, the aforementioned firing assist operation makes up for this tendency and ensures that combustion is properly made by the compression ignition.

Preferably, the firing assist ignition timing setter has a map defining a relationship between the engine load and appropriate ignition points for fuels having different octane numbers.

With this arrangement, the mixture can be fired by the compression ignition in a preferable manner even when the octane number of the supplied fuel or engine load has changed.

Preferably, the octane rating identifier determines the octane number of the fuel based on a detected combustion pattern.

The control device for the spark-ignition engine may further include as means for detecting the combustion pattern an ion current sensor for detecting an ion current occurring as a result of combustion in the combustion chamber, a pressure sensor for detecting the pressure in the combustion chamber, or a knock sensor for detecting engine vibrations.

Provided that the spark-ignition engine has a plurality of cylinders in which successive combustion cycles occur with specific phase delays, the control device of the aforementioned second principal form of the invention is preferably constructed such that a special operation mode is selected as the mode of controlling intake and exhaust operation and conditions of combustion in the part-load range of the engine, and a pair of preceding and following cylinders of which exhaust and intake strokes overlap is connected to form a two-cylinder interconnect configuration in the special operation mode in which burned gas discharged from the preceding cylinder which is currently in the exhaust stroke is introduced into the following cylinder which is currently in the intake stroke through an intercylinder gas channel and exhaust gas discharged from the following cylinder is led to an exhaust passage, a lean mixture having an air-fuel ratio higher than the stoichiometric air-fuel ratio is combusted in the preceding cylinder, and the fuel is supplied to the burned gas having a high air-fuel ratio introduced from the preceding cylinder into the following cylinder so that a mixture thus produced in the following cylinder is combusted by the compression ignition. In this preferable form of the control device, the firing assist unit fires the mixture in the following cylinder at the point preceding the top dead center in the compression stroke of the following cylinder in part or all of the operating range in which the mixture is fired by the compression ignition, and the firing assist ignition timing setter sets the ignition point for the following cylinder according to the octane number of the fuel in the operating range in which the mixture is fired by the firing assist unit for inducing the compression ignition in the following cylinder.

In this construction, the lean mixture having a high air-fuel ratio containing excess air is burnt in the preceding cylinder in the part-load range of the engine, and this lean burn operation serves to enhance thermal efficiency and reduce pumping loss, resulting in a significant improvement in fuel economy. In the following cylinder, on the other hand, the mixture produced by supplying the fuel to the burned gas having a high air-fuel ratio introduced from the preceding cylinder is combusted. Since the burned gas introduced from the preceding cylinder contains excess air, it is possible to combust the mixture in the following cylinder. The burned gas introduced from the preceding cylinder through the intercylinder gas channel is so hot that the temperature in the combustion chamber of the following cylinder rises in a final part of the compression stroke, causing the compression ignition in the following cylinder.

The firing assist operation, if performed for inducing the compression ignition by firing the mixture in the combustion chamber immediately before the top dead center in the compression stroke, ensures that the compression ignition occurs in a reliable fashion.

In particular, the firing assist ignition timing setter adjusts the point of firing the mixture for inducing the compression ignition, in which the ignition point is progressively advanced as the octane number increases. Thus, the aforementioned arrangement serves to produce combustion initiated by the compression ignition in a preferable manner even when the octane number of the fuel supplied to the combustion chamber has changed.

In a third principal form of the invention, a control device for a spark-ignition engine having a plurality of cylinders in which successive combustion cycles occur with specific phase delays, wherein a special operation mode is selected as the mode of controlling intake and exhaust operation and conditions of combustion in a part-load range of the engine, and wherein a pair of preceding and following cylinders of which exhaust and intake strokes overlap is connected to form a two-cylinder interconnect configuration in the special operation mode in which burned gas discharged from the preceding cylinder which is currently in the exhaust stroke is introduced into the following cylinder which is currently in the intake stroke through an intercylinder gas channel and exhaust gas discharged from the following cylinder is led to an exhaust passage, a lean mixture having an air-fuel ratio higher than the stoichiometric air-fuel ratio is combusted in the preceding cylinder, and fuel is supplied to the burned gas having a high air-fuel ratio introduced from the preceding cylinder into the following cylinder so that a mixture thus produced is combusted in the following cylinder, includes a firing assist unit for accelerating compression ignition in the following cylinder. The air-fuel ratio in the preceding cylinder is set to a value equal to or larger than the stoichiometric air-fuel ratio while the firing assist unit accelerates the compression ignition in the following cylinder in a lower-load, lower-speed region within the part-load range in which combustion is made in the special operation mode.

When the special operation mode is selected in the part-load range of the engine, the control device thus constructed offers an effect of improving fuel economy as a result of an improvement in thermal efficiency and a reduction in pumping loss achieved by lean burn operation in the preceding cylinder. In the lower-load, lower-speed region within the part-load range in which combustion is made in the special operation mode, the air-fuel ratio in the preceding cylinder is set to a value equal to or larger than the stoichiometric air-fuel ratio. As a consequence, the temperature of the exhaust gas introduced into the following cylinder is prevented from becoming excessively high and the occurrence of knocking of the following cylinder is effectively suppressed, while the firing assist unit properly performs a control operation for inducing the compression ignition in the following cylinder.

Preferably, the firing assist unit is made essentially of a spark ignition controller which fires the mixture in the following cylinder immediately before the top dead center in the compression stroke.

Also, combustion in the following cylinder is preferably made with the air-fuel ratio therein set to a value approximately equal to the stoichiometric air-fuel ratio in the special operation mode.

With this arrangement, only the burned gas combusted at the stoichiometric air-fuel ratio is discharged from the following cylinder to the exhaust passage in the part-load range in which combustion is made in the special operation mode, so that the exhaust gas can be sufficiently converted with a three-way catalyst alone.

Preferably, the control device of the aforementioned third principal form of the invention further includes an octane rating identifier for determining the octane number of the fuel, wherein the higher the octane number of the fuel determined by the octane rating identifier, the more a firing assist range in which the compression ignition in the following cylinder is induced (accelerated) by the firing assist unit is broaden to a higher-load, higher-speed side of the part-load range.

In this construction, the firing assist range in which the compression ignition in the following cylinder is induced (accelerated) by the firing assist unit is broaden to a higher-load, higher-speed side of the part-load range when the octane rating identifier judges that the octane number of the fuel is large. Consequently, the air-fuel ratio in the preceding cylinder is set to a value equal to or larger than the stoichiometric air-fuel ratio on the higher-load, higher-speed side of the part-load range as well and the firing assist unit properly performs the control operation for inducing the compression ignition in the following cylinder.

Preferably, stratified charge combustion is produced in the preceding cylinder in the firing assist range in which the compression ignition in the following cylinder is induced (accelerated) by the firing assist unit.

With this arrangement, it becomes possible to produce stratified charge combustion in the preceding cylinder by producing an extremely lean mixture of which air-fuel ratio is set to a value equal to or higher than three times the stoichiometric air-fuel ratio in the lower-load, lower-speed region within the part-load range in which the firing assist unit performs the control operation for inducing the compression ignition in the following cylinder, so that a significant fuel economy improvement effect is achieved. It also becomes possible for the firing assist unit to properly perform the control operation for inducing the compression ignition in the following cylinder.

Preferably, the compression ignition in the following cylinder is induced (accelerated) by the firing assist unit while the air-fuel ratio in the preceding cylinder is made equal to twice or higher than the stoichiometric air-fuel ratio from engine idle when the engine is warm.

This arrangement makes it possible to produce a fuel economy improvement effect as a result of an improvement in thermal efficiency and a reduction in pumping loss achieved by lean burn operation as a control operation for the special operation mode is performed from engine idle when the engine is warm. Since the air-fuel ratio in the preceding cylinder is set to a value equal to twice or higher than the stoichiometric air-fuel ratio from engine idle conditions, the temperature of the exhaust gas introduced into the following cylinder is prevented from becoming excessively high and the occurrence of knocking of the following cylinder is effectively suppressed, while the firing assist unit properly performs the control operation for inducing the compression ignition in the following cylinder.

Preferably, the control device of the aforementioned third principal form of the invention further includes an anti-knock unit for suppressing knocking of the following cylinder, wherein the compression ignition in the following cylinder is induced (accelerated) by the firing assist unit while the anti-knock unit suppresses knocking of the following cylinder in medium-load, medium-speed to higher-load, higher-speed regions within the part-load range of the engine.

This construction broadens a range of combustion initiated by the compression ignition induced (accelerated) by the firing assist unit to a higher-load, higher-speed side of the engine while suppressing the occurrence of knocking of the following cylinder. This produces a more apparent fuel economy improvement effect.

In one feature of the invention, the aforementioned anti-knock unit is made essentially of a cooling controller for cooling the burned gas introduced from the preceding cylinder into the following cylinder through the intercylinder gas channel.

In this construction, the burned gas passing through the intercylinder gas channel is cooled when the engine is set to the special operation mode in the higher-load, higher-speed region within the part-load range. This serves to prevent the temperature of the exhaust gas introduced into the following cylinder from becoming excessively high, so that the occurrence of knocking of the following cylinder is effectively suppressed, while the firing assist unit properly performs the control operation for inducing the compression ignition in the following cylinder.

In another feature of the invention, the aforementioned anti-knock unit is made essentially of an effective compression ratio reducer for reducing the effective compression ratio of the following cylinder.

In this construction, the effective compression ratio of the following cylinder is reduced when the engine is set to the special operation mode in the higher-load, higher-speed region within the part-load range, so that the occurrence of knocking of the following cylinder is effectively suppressed, while the firing assist unit properly performs the control operation for inducing the compression ignition in the following cylinder.

In a fourth principal form of the invention, a control device for a multicylinder spark-ignition engine of which individual cylinders go through successive cycles of intake, compression, expansion and exhaust strokes with specific phase delays includes an air-fuel ratio controller, an ignition controller and a knocking detector. In the multicylinder spark-ignition engine provided with this control device, gas flow paths can be connected to form a two-cylinder interconnect configuration in which a pair of preceding and following cylinders of which exhaust and intake strokes overlap is connected in such a way that burned gas discharged from the preceding cylinder which is currently in the exhaust stroke is introduced directly into the following cylinder which is currently in the intake stroke through an intercylinder gas channel and exhaust gas discharged from the following cylinder is led to an exhaust passage. The control device of the fourth principal form of the invention offers at least a special operation mode as an engine operation mode in which the gas flow paths are connected to form the two-cylinder interconnect configuration so that a lean mixture having an air-fuel ratio higher than the stoichiometric air-fuel ratio by a specific amount is combusted in the preceding cylinder while homogeneous (uniform) charge combustion is produced in the following cylinder by firing a mixture produced by supplying fuel to the burned gas having a high air-fuel ratio introduced from the preceding cylinder into the following cylinder. The air-fuel ratio controller sets the air-fuel ratio in each of the cylinders, the ignition controller sets an ignition point of a spark plug disposed in each of the cylinders, and the knocking detector detects engine knock. The EGR ratio is increased in the following cylinder in an engine operating region on a relatively high-load side and the ignition controller enhances anti-knock performance of the engine by retarding a firing assist ignition point in a case where the mixture in the following cylinder is fired by compression ignition by performing a firing assist operation while the engine is operated in the special operation mode. The air-fuel ratio controller decreases the air-fuel ratio in the preceding cylinder to enrich the mixture therein when the knocking detector has detected engine knock.

In this construction, the mixture in the preceding cylinder is combusted at a high air-fuel ratio in the special operation mode so that a significant fuel economy improvement effect is obtained as a result of an improvement in thermal efficiency and a reduction in pumping loss. Also, the homogeneous charge combustion is produced in the following cylinder by firing the mixture produced by supplying the fuel to the burned gas introduced from the preceding cylinder in the special operation mode so that a fuel economy improvement effect is obtained as a result of a reduction in pumping lose.

The fuel economy improvement effect can be further enhanced if the mixture in the following cylinder is combusted by the compression ignition while the engine is operated in the special operation mode. It is possible to produce the compression ignition in a stable fashion if the mixture in the following cylinder is ignited by the spark plug immediately before the compression ignition is expected to occur. It is also possible to control the timing of firing the mixture by the compression ignition by adjusting the (firing assist) ignition point of the spark plug.

In a case where the mixture in the following cylinder is fired by compression ignition by performing a firing assist operation while the engine is operated in the special operation mode, the EGR ratio is increased in the following cylinder in the engine operating region on the relatively high-load side, so that the amount of inert gases introduced into the following cylinder increases and combustion temperature decreases. Consequently, it is possible to suppress the occurrence of knocking.

Unless otherwise mentioned specifically, the expression "EGR ratios" as used in the present Specification means the ratio of the amount of exhaust gas, or EGR gas, recirculated back into a cylinder by the EGR to the amount of fresh air introduced into the cylinder. Particularly in the special operation mode of this invention, a major part of the EGR gas is that portion of the burned gas supplied from the preceding cylinder to the following cylinder which corresponds to an inert gas portion contributory to EGR operation. (This contributory inert gas portion is referred to as "internal EGR gas" in this invention.) According to the invention, exhaust gases recirculated through an EGR passage branched out from the exhaust passage (i.e., external EGR) and/or exhaust gases recirculated as a result of valve overlap and gas flows between intake and exhaust strokes (i.e., conventional internal EGR) may be added to the aforementioned "internal EGR gas" of the invention.

In the control device of the aforementioned fourth principal form of the invention, the ignition controller performs the firing assist operation by retarding the firing assist ignition point as necessary. If the firing assist ignition point is retarded, the timing of the compression ignition is also retarded and, as a consequence, the anti-knock performance of the engine is enhanced due to a decrease in combustion temperature. The ignition controller may begin to retard the firing assist ignition point when engine knock has occurred (i.e., when the knocking detector has detected engine knock). Alternatively, the ignition controller may retard the firing assist ignition point in advance under conditions where engine knock is likely to occur.

If engine knock still occurs, the air-fuel ratio controller performs control operation for enriching the mixture in the preceding cylinder by decreasing the air-fuel ratio. When the air-fuel ratio in the preceding cylinder is decreased to produce a richer mixture, the amount of fresh air consumed in the preceding cylinder increases while the amount of fresh air consumed in the following cylinder decreases. This means that an internal EGR ratio of the following cylinder increases. Consequently, the combustion temperature further decreases, making it possible to suppress the occurrence of knocking by a greater degree.

If engine knock still occurs while the control operation for enriching the mixture in the preceding cylinder is underway, the air-fuel ratio in the preceding cylinder is made equal to the stoichiometric air-fuel ratio and combustion in the following cylinder is interrupted. This makes it possible to completely prevent knocking of the following cylinder.

Since the anti-knock performance of the engine is enhanced in a step-by-step manner according to varying knocking conditions as stated above, it is possible to suppress the occurrence of knocking in a best possible manner even in relatively high-load regions. In other words, the operating range in which the engine can be operated in the special operation mode can be extended to toward the higher-load side as much as possible and achieve a significant reduction in fuel cost, because the anti-knock performance of the engine is progressively enhanced.

The control device of the fourth principal form of the invention may be constructed such that the gas flow paths can be connected to form an independent cylinder configuration in which fresh air is drawn through an intake passage to intake ports of the individual cylinders and the exhaust gas discharged through exhaust ports of the individual cylinders is led to the exhaust passage, the control device offers a normal operation mode as an additional engine operation mode in which combustion in the individual cylinders is produced with the gas flow paths connected to form the independent cylinder configuration, the ignition controller begins to retard the firing assist ignition point if the knocking detector detects engine knock, the air-fuel ratio controller performs control operation for enriching the mixture in the preceding cylinder by decreasing the air-fuel ratio if the knocking detector still detects engine knock while the firing assist ignition point of the following cylinder is being retarded, and the control device switches the engine from the special operation mode to the normal operation mode if the knocking detector still detects engine knock while the control operation for enriching the mixture in the preceding cylinder is underway.

In this construction, the engine is switched from the special operation mode to the normal operation mode to maximize its anti-knock performance. The normal operation mode is a conventionally known ordinary mode of combustion in which the mixture is combusted by introducing fresh air at about the ambient temperature into the individual cylinders. Accordingly, the normal operation mode makes it possible to sufficiently enhance the anti-knock performance of the engine as the temperature in the cylinders is made lower than in the special operation mode. It is possible to prevent engine knock in the most reliable fashion if the ignition point is retarded in the normal operation mode.

In a fifth principal form of the invention, a control device for a multicylinder spark-ignition engine of which individual cylinders go through successive cycles of intake, compression, expansion and exhaust strokes with specific phase delays includes an air-fuel ratio controller, an ignition controller and a knocking detector. In the multicylinder spark-ignition engine provided with this control device, gas flow paths can be connected to form a two-cylinder interconnect configuration in which a pair of preceding and following cylinders of which exhaust and intake strokes overlap is connected in such a way that burned gas discharged from the preceding cylinder which is currently in the exhaust stroke is introduced directly into the following cylinder which is currently in the intake stroke through an intercylinder gas channel and exhaust gas discharged from the following cylinder is led to an exhaust passage. The control device of the fifth principal form of the invention offers at least a special operation mode as an engine operation mode in which the gas flow paths are connected to form the two-cylinder interconnect configuration so that a lean mixture having an air-fuel ratio higher than the stoichiometric air-fuel ratio by a specific amount is combusted in the preceding cylinder while homogeneous charge combustion is produced in the following cylinder by firing a mixture produced by supplying fuel to the burned gas having a high air-fuel ratio introduced from the preceding cylinder into the following cylinder. The air-fuel ratio controller sets the air-fuel ratio in each of the cylinders, the ignition controller sets an ignition point of a spark plug disposed in each of the cylinders, and the knocking detector detects engine knock. The EGR ratio is increased in the following cylinder in an engine operating region on a relatively high-load side and the ignition controller retards a firing assist ignition point in a case where the mixture in the following cylinder is fired by compression ignition by performing a firing assist operation while the engine is operated in the special operation mode. The air-fuel ratio in the preceding cylinder is made equal to the stoichiometric air-fuel ratio and combustion in the following cylinder is interrupted if the knocking detector detects engine knock at least a predetermined number of times in succession while the firing assist ignition point of the following cylinder is being retarded.

The control device of the aforementioned fifth principal form of the invention also produces a significant fuel economy improvement effect due to an improvement in thermal efficiency and a reduction in pumping loss in the special operation mode. Also, as the air-fuel ratio in the following cylinder is made substantially equal to the stoichiometric air-fuel ratio in the special operation mode, it is not necessary to provide the lean NOx catalyst, resulting in a cost reduction and a further improvement in fuel economy. The fuel economy improvement effect is further enhanced as the mixture in the following cylinder is fired by the compression ignition by performing the firing assist operation while the engine is operated in the special operation mode.

It is possible to enhance the anti-knock performance of the engine as the EGR ratio is increased in the following cylinder in the engine operating region on the relatively high-load side and the ignition controller retards the firing assist ignition point in a case where the mixture in the following cylinder is fired by the compression ignition by performing the firing assist operation while the engine is operated in the special operation mode.

Known as one form of engine knock is so-called single-stroke knocking in which the engine knocks only once or just a few successive times. The single-stroke knocking tends to occur when the engine load has increased relatively rapidly. According to the construction of the aforementioned fifth principal form, the air-fuel ratio in the following cylinder is made equal to the stoichiometric air-fuel ratio and combustion in the following cylinder is interrupted when knocking has occurred the predetermined number of times or more in succession. This means that the control device of the aforementioned fifth principal form continues to perform ordinary control operation when the single-stroke knocking has occurred, without taking any special action against the single-stroke knocking. Thus, the aforementioned control device helps prevent frequent changes in the mode of suppressing engine knock. Nevertheless, when knocking has occurred the predetermined number of successive times, the control device suppresses it in a reliable fashion by setting the air-fuel ratio in the following cylinder to the stoichiometric air-fuel ratio and interrupting combustion in the following cylinder.

In a sixth principal form of the invention, a control device for a multicylinder spark-ignition engine of which individual cylinders go through successive cycles of intake, compression, expansion and exhaust strokes with specific phase delays includes an air-fuel ratio controller, and an ignition controller. In the multicylinder spark-ignition engine provided with this control device, gas flow paths can be connected to form either of a two-cylinder interconnect configuration, in which a pair of preceding and following cylinders of which exhaust and intake strokes overlap is connected in such a way that burned gas discharged from the preceding cylinder which is currently in the exhaust stroke is introduced directly into the following cylinder which is currently in the intake stroke through an intercylinder gas channel and exhaust gas discharged from the following cylinder is led to an exhaust passage, and an independent cylinder configuration, in which fresh air is drawn through an intake passage to intake ports of the individual cylinders and the exhaust gas discharged through exhaust ports of the individual cylinders is led to the exhaust passage. The control device of the sixth principal form of the invention offers as engine operation modes a special operation mode to be selected in a low-load, low-speed operating range in which the gas flow paths are connected to form the two-cylinder interconnect configuration so that a lean mixture having an air-fuel ratio higher than the stoichiometric air-fuel ratio by a specific amount is combusted in the preceding cylinder while homogeneous charge combustion is produced in the following cylinder by firing a mixture produced by supplying fuel to the burned gas having a high air-fuel ratio introduced from the preceding cylinder into the following cylinder, and a normal operation mode to be selected in a high-load, high-speed operating range, in which combustion in the individual cylinders is produced with the gas flow paths connected to form the independent cylinder configuration. The air-fuel ratio controller sets the air-fuel ratio in each of the cylinders, and the ignition controller sets an ignition point of a spark plug disposed in each of the cylinders. The EGR ratio is increased in the following cylinder in an engine operating region on a relatively high-load side in a case where the mixture in the following cylinder is fired by compression ignition by performing a firing assist operation while the engine is operated in the special operation mode. This control device performs a special control operation to make the air-fuel ratio in the preceding cylinder equal to the stoichiometric air-fuel ratio and to interrupt combustion in the following cylinder for a predetermined period of time before the engine is completely transferred to the normal operation mode when the engine has reached the operating range in which the normal operation mode should be selected at a load increasing rate higher than a predetermined rate.

The control device of the aforementioned sixth principal form of the invention also produces a significant fuel economy improvement effect due to an improvement in thermal efficiency and a reduction in pumping loss in the special operation mode. Also, as the air-fuel ratio in the following cylinder is made substantially equal to the stoichiometric air-fuel ratio in the special operation mode, it is not necessary to provide the lean NOx catalyst, resulting in a cost reduction and a further improvement in fuel economy. The fuel economy improvement effect is further enhanced as the mixture in the following cylinder is fired by the compression ignition by performing the firing assist operation while the engine is operated in the special operation mode.

It is possible to enhance the anti-knock performance of the engine as the EGR ratio is increased in the following cylinder in the engine operating region on the relatively high-load side and the ignition controller retards the firing assist ignition point in a case where the mixture in the following cylinder is fired by the compression ignition by performing the firing assist operation while the engine is operated in the special operation mode.

When the engine has reached the operating range in which the normal operation mode should be selected at a load increasing rate higher than the predetermined rate (in which case the single-stroke knocking is likely to occur), the control device causes the engine to transfer to the normal operation mode after performing the special control operation to make the air-fuel ratio in the preceding cylinder equal to the stoichiometric air-fuel ratio and to interrupt combustion in the following cylinder for the predetermined period of time. This control operation makes it possible to instantly suppress the single-stroke knocking without the need to wait until the engine is completely set to the normal operation mode.

This control operation to be carried out for the aforementioned specific period of time may be performed when any temporary knocking has occurred, or regardless of whether knocking of this kind has occurred or not. If the control operation is performed regardless of the occurrence of temporary knocking, the transfer from the special operation mode to the normal operation mode is once suspended when the engine load rapidly increases for a moment. Thus, when there is a spikelike momentary change in engine load which would cause the engine to return to the operating range in which the special operation mode should be selected immediately after the momentary change due to a rapid decrease in engine load, the gas flow paths may be left in the two-cylinder interconnect configuration. The specific period of time during which the aforementioned special control operation is performed may either be predetermined or variable depending on the severity or duration of knocking.

As explained in the foregoing, the control device of the present invention performs the EGR control operation to regulate the temperature in the combustion chamber as well as the firing assist operation in the compression ignition combustion range. It is therefore possible to properly produce combustion by compression ignition in the compression ignition combustion range. In particular, it is possible to produce combustion by the compression ignition while preventing engine knock even in an engine operating region on a relatively high-load side, whereby the compression ignition combustion range can be broadened.

These and other objects, features and advantages of the invention will become more apparent upon reading the following detailed description along with the accompanying drawings.

BRIEF DESCRIPTION OF THE DRAWINGS

FIG. 24 is a perspective diagram showing the specific construction of a center tappet and a side tappet;

DETAILED DESCRIPTION OF THE PREFERRED EMBODIMENTS OF THE INVENTION

Specific embodiments of the present invention are now described with reference to the appended drawings.

First Embodiment

Figure 1:
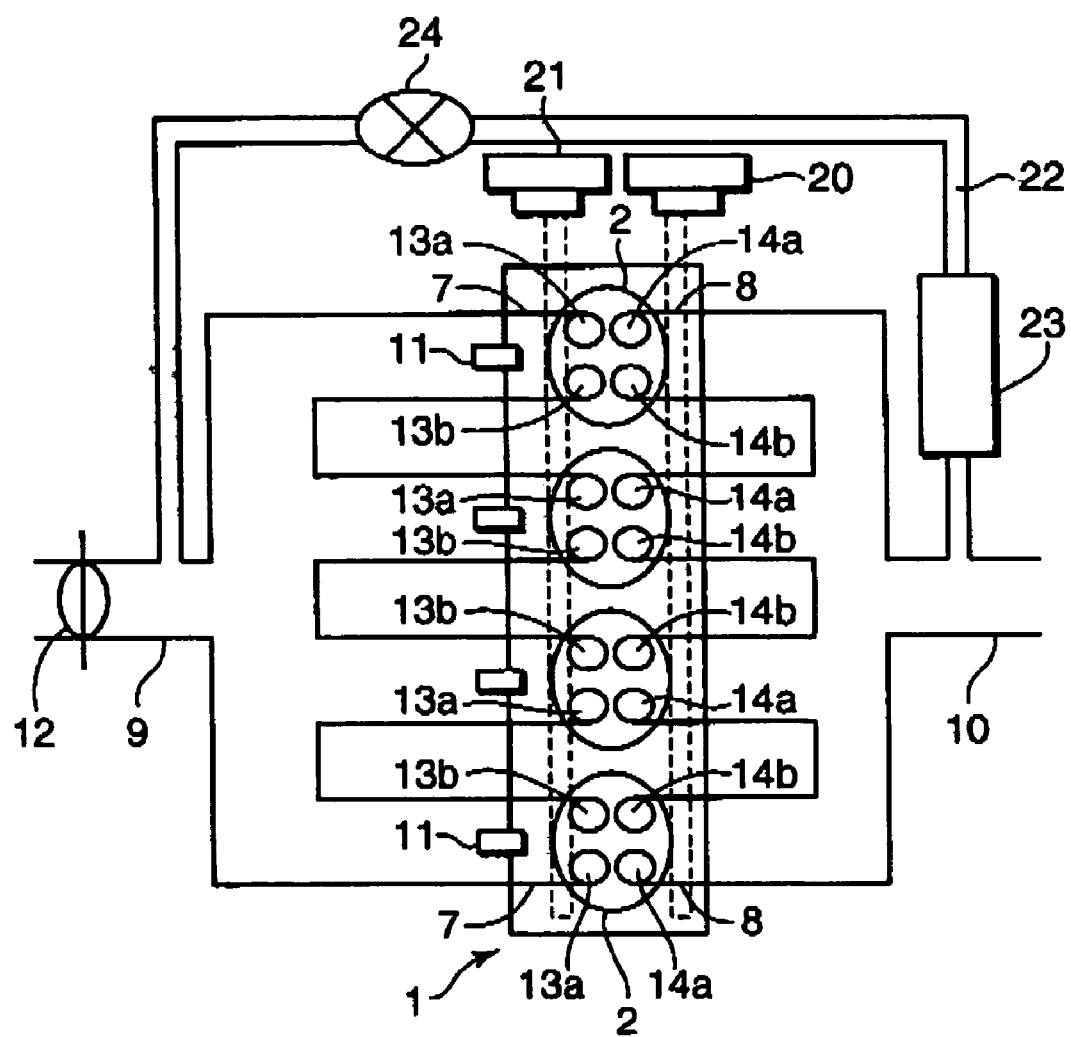
FIG. 1 is a schematic plan view showing an entire engine provided with a control device according to a first embodiment of the invention.
Figure 2:
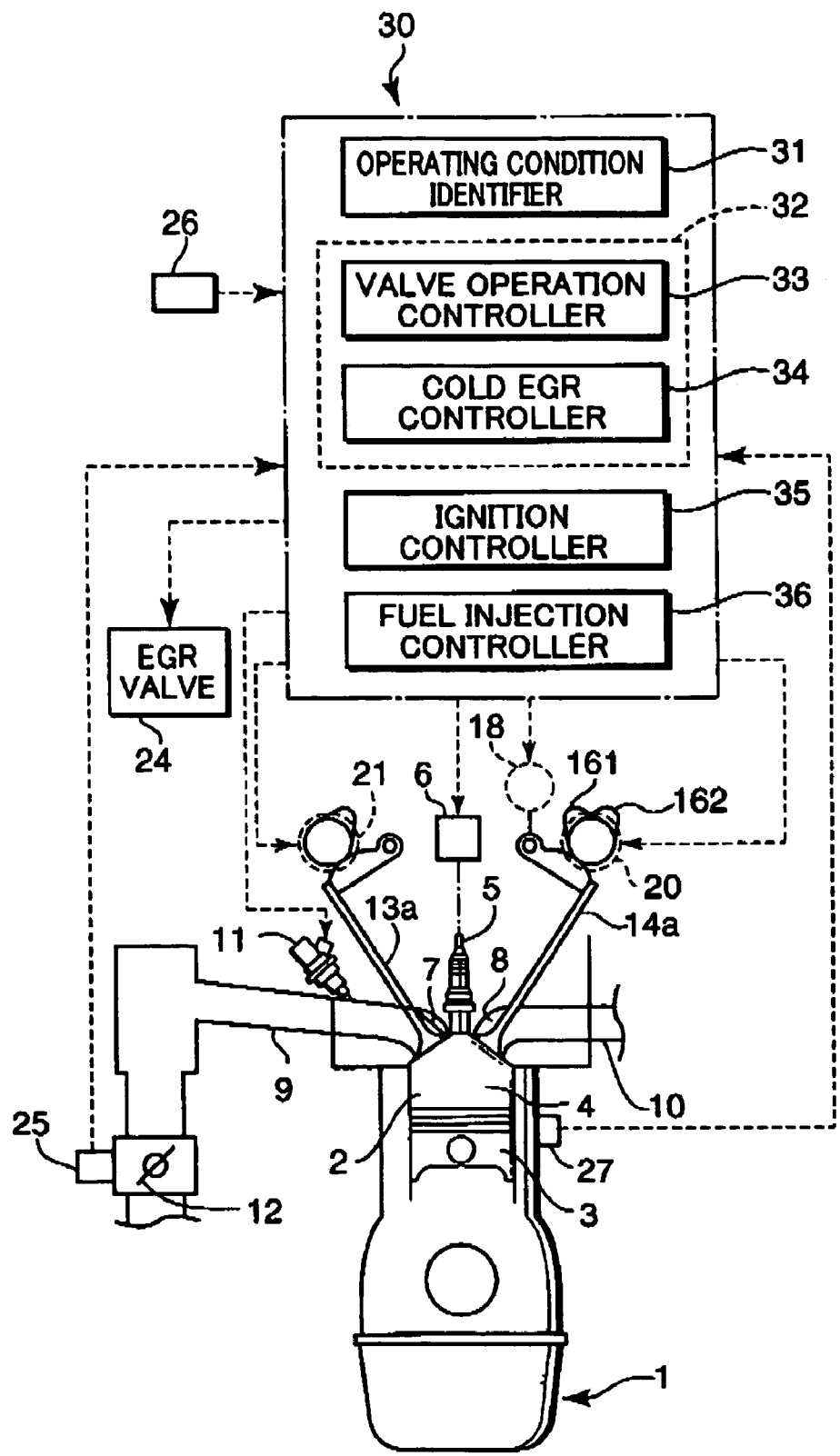
FIG. 2 is a schematic cross-sectional view of the engine and its peripheral elements.

FIGS. 1 and 2 are diagrams schematically showing a spark-ignition engine incorporating a control device according to a first embodiment of the invention. As shown in these Figures, an engine body 1 has four cylinders 2 in which one each piston 3 is fitted, forming a combustion chamber 4 above the piston 3.

There is disposed a spark plug 5 at the top of the combustion chamber 4 in each cylinder 2 in such a way that a far end of the spark plug 5 is located inside the combustion chamber 4. The spark plug 5 is connected to an ignition circuit 6 which permits electronic control of ignition timing.

An intake port 7 and an exhaust port 8 open to the combustion chambers 4 of each cylinder 2, and an intake passage 9 and an exhaust passage 10 are connected to these ports 7, 8. There is provided a fuel injector 11 in each intake port 7 for injecting fuel, the fuel injector 11 incorporating a needle valve and a solenoid which are not illustrated. Driven by a later-described pulse signal input, the fuel injector 11 causes its needle valve to open at pulse input timing during a period corresponding to the pulselength of the pulse signal and injects a specific amount of fuel corresponding to the valve open period. A throttle valve 12 for controlling the amount of intake air is disposed in the intake passage 9.

The intake ports 7 and the exhaust ports 8 are opened and closed by intake valves and exhaust valves, respectively. In the illustrated example (FIGS. 1 and 2), each cylinder 2 is provided with two each intake valves 13a, 13b and exhaust valves 14a, 14b.

Opening and closing points of at least the intake valves 13a, 13b or the exhaust valves 14a, 14b are made variable to enable adjustment of the amount of hot burned gas left in the combustion chambers 4 due to internal EGR operation. Specifically, the exhaust valve 14a among the two exhaust valves 14a, 14b of each cylinder 2 is provided with a valve lift varying mechanism 15 and both of the exhaust valves 14a, 14b are provided with a phase-type valve timing varying mechanism 20 in this embodiment.

The valve lift varying mechanism 15 has a first cam 161 and a pair of second cams 162 which operate together to switch the engine between a valve operating pattern for producing combustion by compression ignition, in which the exhaust valve 14a is activated (opened) not only in an exhaust stroke but also in an intake stroke, and a valve operating pattern for producing normal combustion, in which the exhaust valve 14a is activated (opened) only in the exhaust stroke and not in the intake stroke.

Figure 3:
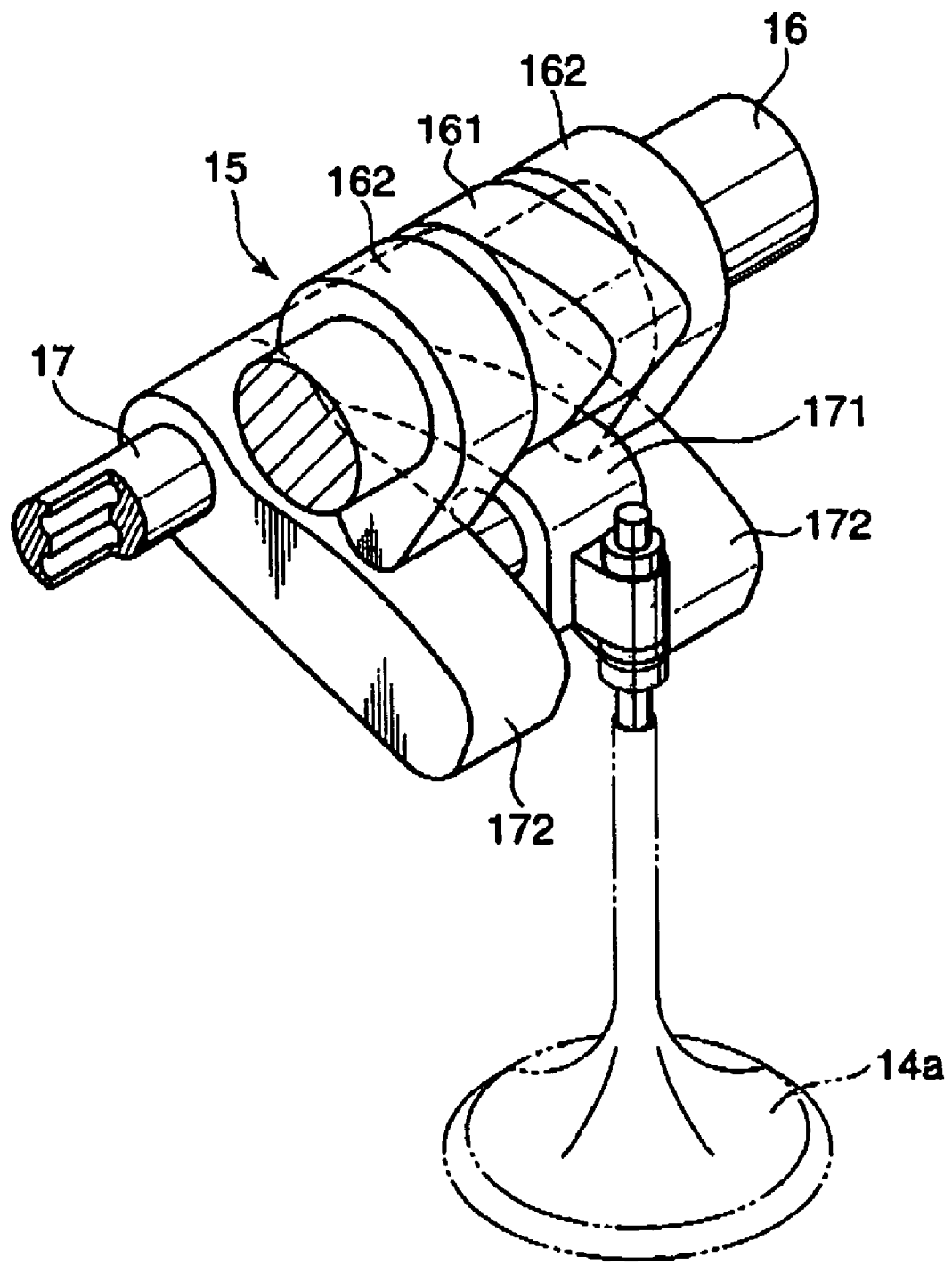
FIG. 3 is a perspective view showing the construction of a valve lift varying mechanism.
Figure 4:
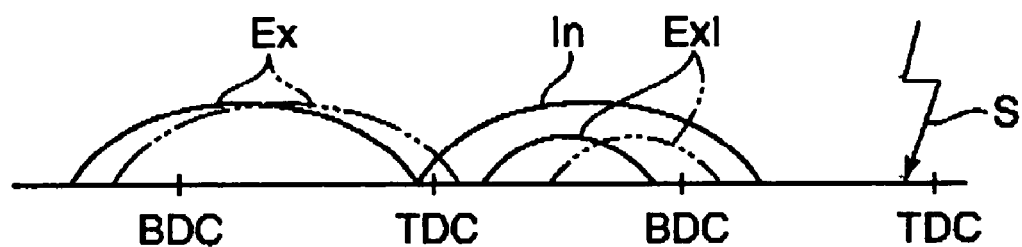
FIG. 4 is an explanatory diagram showing an example of a valve operating pattern.

FIG. 3 is a perspective view showing the specific construction of the valve lift varying mechanism 15, and FIG. 4 is an explanatory diagram showing an example of a valve operating pattern. The construction and working of the valve lift varying mechanism 15 are explained below referring to these Figures.

As shown in FIG. 3, the aforementioned first and second cams 161, 162 of the valve lift varying mechanism 15 are disposed on a camshaft 16. A cam nose of the first cam 161 is offset from cam noses of the second cams 162 by approximately 90° in terms of angular position of the camshaft 16 (approximately 180° in terms of crank angle) such that the first cam 161 opens the exhaust valve 14a in the exhaust stroke and the second cams 162 open the exhaust valve 14a in the intake stroke. Referring to FIG. 4, designated by "Ex" is a period of time during which the exhaust valve 14a is opened by the first cam 161, designated by "ExI" is a period of time during which the exhaust valve 14a is opened by the second cams 162, and designated by "In" is a period of time during which the intake valves 13a, 13b are opened. As can be seen from FIG. 4, the first cam 161 keeps the exhaust valve 14a open (opening period Ex) almost through the entire exhaust stroke. The second cams 162 keep the exhaust valve 14a open during part of the intake stroke, the opening period ExI during which the exhaust valve 14a is kept open by the second cams 162 being shorter than the opening period in of the intake valves 13a, 13b.

The first and second cams 161, 162 are associated with a first rocker arm 171 and a pair of second rocker arms 172, respectively, which are swingably mounted on a rocker shaft 17 with root portions of the rocker arms 171, 172 fixed to the rocker shaft 17. The first and second cams 161, 162 go into contact with middle portions of the first and second rocker arms 171, 172, respectively, as illustrated. The exhaust valve 14a is connected to a far end of the first rocker arm 171. The valve lift varying mechanism 15 is provided with a switching mechanism which enables the second rocker arms 172 to be engaged with and disengaged from the first rocker arm 171.

Although not illustrated, the aforementioned switching mechanism includes plungers which are made movable through plunger holes formed in the first and second rocker arms 171, 172. Actuated by hydraulic pressure, these plungers move back and force to switch the valve lift varying mechanism 15 between an engaged state in which the first and second rocker arms 171, 172 swing together as a single structure and a disengaged state in which the first rocker arm 171 swings independently of the second rocker arms 172. In the engaged state of the first and second rocker arms 171, 172, swing motion of the first rocker arm 171 caused by rotation of the first cam 161 and swing motion of the second rocker arms 172 caused by rotation of the second cams 162 are transmitted to the exhaust valve 14a so that the exhaust valve 14a opens in the exhaust stroke (opening period Ex) and in the intake stroke (opening period ExI). In the disengaged state of the first and second rocker arms 171, 172, on the other hand, the swing motion of the second rocker arms 172 caused by the rotation of the second cams 162 is not transmitted to the exhaust valve 14a so that the exhaust valve 14a opens only in the exhaust stroke (opening period Ex). The exhaust valve 14b which is not provided with the valve lift varying mechanism 15 is always caused to open only in the exhaust stroke.

The aforementioned switching mechanism is provided with a control valve 18 (FIG. 2) which determines whether to supply the hydraulic pressure or to withdraw the same from the aforementioned switching mechanism.

The valve timing varying mechanism 20 shown in FIGS. 1 and 2 varies on-off timing of the individual exhaust valves 14a, 14b by varying the phase of rotation of the camshaft 16 with respect to that of a crankshaft. In the engine of this embodiment, the intake valves 13a, 13b are also provided with a valve timing varying mechanism 21.

The engine is further provided with an EGR passage 22 connecting the exhaust passage 10 to the intake passage 9 to introduce cold EGR gas cooled by external EGR into the combustion chambers 4 as illustrated in FIG. 1. There are disposed an EGR cooler 23 serving as a cooling unit for cooling the EGR gas and an EGR valve 24 for controlling the amount of EGR gas in the EGR passage 22.

Referring to FIG. 2, the ignition circuit 6, the fuel injectors 11, the control valve 18 of the valve lift varying mechanism 15, the valve timing varying mechanisms 20, 21 and the EGR valve 24 are controlled by an electronic control unit (ECU) 30. Sensing signals output from various sensors, such as a throttle opening sensor 25 for detecting the opening of the throttle valve 12, an engine speed sensor 26 for detecting engine speed and a water temperature sensor 27 for detecting the temperature of engine cooling water, are input into the ECU 30.

The ECU 30 incorporates such functional units as an operating condition identifier 31, an EGR controller 32 including a valve operation controller 33 and a cold EGR controller 34, an ignition controller 35 and a fuel injection controller 36.

Figure 6:
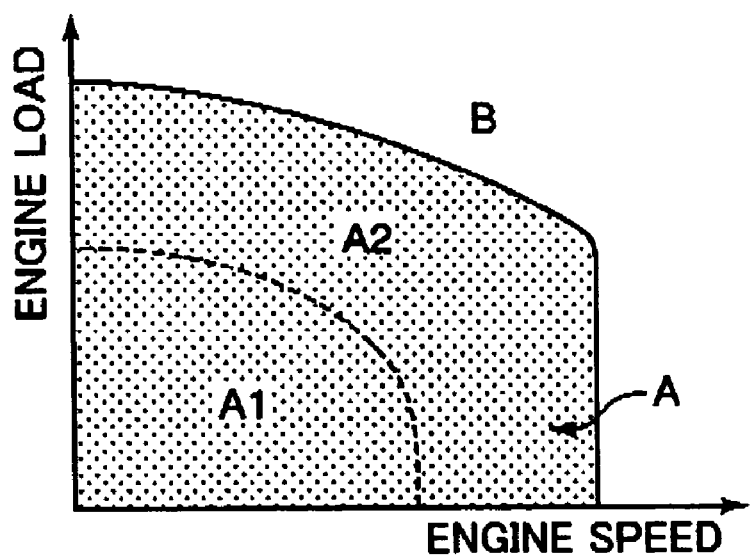
FIG. 6 is an explanatory diagram showing a map of different operating ranges of the engine.

The operating condition identifier 31 judges whether or not the engine is in a warm-running state in which the temperature of the cooling water is equal to or higher than a predefined value based on the signal output from the water temperature sensor 27. When the engine is judged to be in the warm-running state, the operating condition identifier 31 examines operating condition of the engine based on an engine load determined from the signal output from the throttle opening sensor 25 and the engine speed determined from the signal output from the engine speed sensor 26 and determines in which one of operating ranges shown in a map of FIG. 6 the engine is currently operated. In the map of FIG. 6, the symbol "A" represents a range of combustion initiated by compression ignition and the symbol "B" represents a range of normal combustion. The compression ignition combustion range A is a part-load range covering low-to-medium-load, low-to-medium-speed regions while the normal combustion range B covers regions of higher load and higher speed than the part-load range (range A). The compression ignition combustion range A is divided into two subranges. These are a hot EGR subrange A1 corresponding to lower-load, lower-speed regions (within the range A) in which the hot burned gas is left in the combustion chambers 4 by the internal EGR and a cold EGR subrange A2 corresponding to higher-load, higher-speed regions (within the range A) in which the cold EGR gas is introduced into the combustion chambers 4 by the external EGR in addition to the hot burned gas (hot EGR gas) left in the combustion chambers 4 by the internal EGR.

The valve operation controller 33 controls the valve lift varying mechanism 15 by controlling the control valve 18 as well as the valve timing varying mechanism 20 according to the operating condition of the engine determined by the operating condition identifier 31 to control the amount of hot EGR gas (internal EGR gas).

When the engine is judged to be in the compression ignition combustion range A, the valve operation controller 33 controls the valve lift varying mechanism 15 to produce the valve operating pattern shown in FIG. 4 for causing the compression ignition. Since the exhaust valve 14*a* is opened in the intake stroke in this case, a large amount of burned gas (hot EGR gas) flows back through the exhaust port 8 and returns into each combustion chamber 4. In this case, the more the opening period ExI (FIG. 4) of the exhaust valve 14*a* is delayed within the intake stroke, the greater amount of fresh air flows earlier into the combustion chamber 4 so that the ratio of the amount of hot EGR gas (or the hot EGR ratio) decreases. Under this circumstance, the valve timing varying mechanism 20 is controlled to relatively advance valve timing as shown by solid lines in FIG. 4 on a lower-load side within the compression ignition combustion range A and retard the valve timing (opening periods Ex and ExI) as shown by alternate long and two short dashed lines in FIG. 4 to decrease the hot EGR ratio toward a higher-load side within the compression ignition combustion range A.

Figure 5:
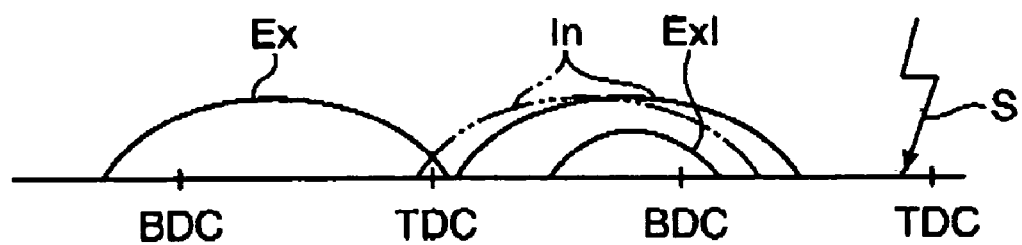
FIG. 5 is an explanatory diagram showing anther example of a valve operating pattern.

As an alternative, the hot EGR ratio can be adjusted by varying the opening period in of the intake valves 13*a*, 13*b* by means of the valve timing varying mechanism 21 without varying the valve timing (opening periods Ex and ExI) of the exhaust valve 14*a* as shown in FIG. 5. In this case, the opening period in of the intake valves 13*a*, 13*b* should be relatively retarded as shown by solid lines in FIG. 5 on the lower-load side within the compression ignition combustion range A, and the opening period in of the intake valves 13*a*, 13*b* should be advanced as shown by alternate long and two short dashed lines in FIG. 5 to decrease the hot EGR ratio toward the higher-load side within the compression ignition combustion range A. Here, retardation of the opening period in on the lower-load side is also advantageous for reducing pumping loss.

The cold EGR controller 34 controls the amount of cold EGR gas (external EGR gas) by controlling the EGR valve 24 according to the operating condition of the engine determined by the operating condition identifier 31. When the engine is judged to be in the hot EGR subrange A1 within the compression ignition combustion range A, the cold EGR controller 34 closes the EGR valve 24. When the engine is judged to be in the cold EGR subrange A2 within the compression ignition combustion range A, the cold EGR controller 34 opens the EGR valve 24 in such a manner that the opening of the EGR valve 24 progressively increases with an increase in engine load.

Figure 7:
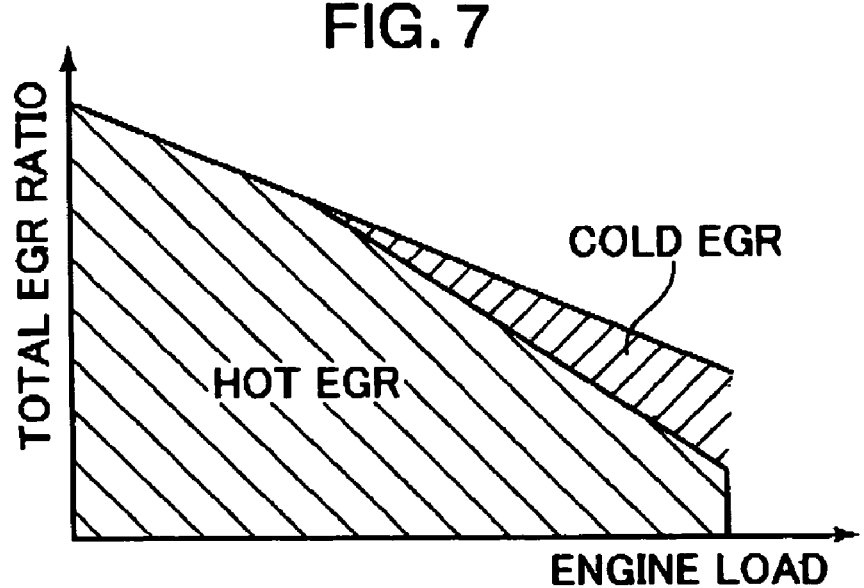
FIG. 7 is a chart showing the relationship between engine load and the ratio of the amount of recirculated exhaust gases including hot EGR gas and cold EGR gas.

Accordingly, the ratio of the amount of recirculated exhaust gases including the hot EGR gas and the cold EGR gas (or the EGR ratio) varies with changes in engine load within the compression ignition combustion range A as shown in FIG. 7. Specifically, only the hot EGR gas is recirculated on the lower-load side (corresponding to the hot EGR subrange A1 of FIG. 6) of the compression ignition combustion range A with the EGR ratio decreasing with an increase in engine load, whereas the cold EGR gas is recirculated in addition to the hot EGR gas on the higher-load side (corresponding to the cold EGR subrange A2 of FIG. 6) of the compression ignition combustion range A with the hot EGR ratio decreasing and the ratio of the amount of cold EGR gas (or the cold EGR ratio) increasing with an increase in engine load.

Referring again to FIG. 2, the ignition controller 35 of the ECU 30 controls the ignition timing of the spark plug 5 of each cylinder 2 according to the operating condition of the engine. Particularly in the compression ignition combustion range A, the ignition controller 35 serves as an firing assist unit for inducing the compression ignition. Specifically, the ignition controller 35 causes the spark plug 5 to ignite an air-fuel mixture at a point immediately preceding a top dead center in the compression stroke (as shown the symbol "S" in FIG. 4).

The fuel injection controller 36 controls the amount of fuel injected from the fuel injector 11 of each cylinder 2 as well as fuel injection timing according to the operating condition of the engine. Air-fuel ratio is controlled as the amount of injected fuel is regulated by the fuel injection controller 36 and the amount of intake air is regulated by controlling an unillustrated throttle valve driving motor, for instance. Specifically, the air-fuel ratio is set to a value larger than the stoichiometric air-fuel ratio to obtain an excess-air factor $\lambda$ larger than 1 ($\lambda > 1$) in the aforementioned compression ignition combustion range A.

While a fuel injection point is set within the intake stroke, the fuel injection timing is controlled such that the fuel is reliably injected with the same timing as the intake air flows into the combustion chamber 4, such as within and beyond the opening period ExI of the exhaust valve 14*a* in the intake stroke, particularly in the compression ignition combustion range A in which the exhaust valve 14*a* is opened during part of the intake stroke as shown in FIG. 4. Alternatively, the fuel may be injected prior to the opening period ExI of the exhaust valve 14*a* in the intake stroke, or at multiple points before and after the opening period ExI of the exhaust valve 14*a* in the intake stroke.

With the control device thus constructed of the present embodiment, the exhaust valve 14*a* is controlled to open also in the intake stroke as shown in FIG. 4 in the compression ignition combustion range A which is a specific part-load range. Consequently, a large amount of hot EGR gas is left in each combustion chamber 4, causing a temperature increase in the combustion chambers 4 and thereby producing the compression ignition therein in the compression ignition combustion range A.

When the compression ignition is produced in this fashion, the mixture rapidly burns as a result of simultaneous firing at multiple points in each combustion chamber 4 even under conditions where the air-fuel ratio is high or a large amount of EGR gas is introduced. This makes it possible to prevent too late combustion which does not produce effective work and to significantly improve fuel economy. Additionally, such rapid combustion produced by the compression ignition serves to prevent reaction between oxygen and nitrogen in a best possible manner. Therefore, the rapid combustion by the compression ignition is advantageous for decreasing the production of NOx, contributing thereby to an improvement in engine emissions.

In the cold HGR subrange A2 corresponding to the higher-load, higher-speed regions within the compression ignition combustion range A, the cold EGR gas is introduced into the combustion chamber 4 in addition to the hot EGR gas. Since the hot EGR ratio decreases and the cold EGR ratio increases with an increase in engine load in the cold EGR subrange A2, the temperature in the combustion chamber 4 is adjusted by the cold EGR gas such that knocking would not occur as a result of an excessive temperature increase in the combustion chamber 4 caused by the hot EGR ratio.

Although introduction of the cold EGR gas into the combustion chamber 4 in addition to the hot EGR gas effectively prevents the knocking, the compression ignition may become less likely to occur as the temperature increase in the combustion chamber 4 is suppressed by the cold EGR gas. Nevertheless, the ignition controller 35 serving as the firing assist unit properly controls the ignition timing in a manner that the compression ignition is accelerated.

Specifically, as the mixture is ignited immediately before the top dead center in the compression stroke in each combustion chamber 4, the pressure around the spark plug 5 rapidly increases. Although an excessive temperature increase in the combustion chamber 4 is avoided by the introduction of the cold EGR gas, the temperature in the combustion chamber 4 is increased to a considerable level by the introduction of the hot EGR gas. A combined effect of this temperature increase and the rapid increase in the pressure in the combustion chamber 4 caused by the ignition immediately before the top dead center in the compression stroke makes it possible to produce the compression ignition in a desirable fashion.

It is possible to effectively produce the compression ignition while preventing knocking by suppressing the excessive temperature increase with the introduction of the cold EGR gas and by performing a firing assist operation with the aid of the spark plug 5 even in the higher-load, higher-speed regions in which knocking is likely to occur by the introduction of the hot EGR gas alone. Thus, the present embodiment makes it possible to broaden the compression ignition combustion range to regions of higher load and higher speed and offer an enhanced effect of improving fuel economy and the quality of engine emissions.

In the hot EGR subrange A1 corresponding to the lower-load, lower-speed regions within the compression ignition combustion range A, the temperature in the combustion chamber 4 is low by nature. Accordingly, the capability of the engine to produce the compression ignition is increased by introducing only the hot EGR gas with the EGR ratio progressively increased toward the lower-load side in the hot EGR subrange A1. As the firing assist operation is performed with the aid of the spark plug 5 in the hot EGR subrange A1 as well according to the present embodiment, the compression ignition is produced in a desirable fashion even in an extremely low-load, low-speed region in which the temperature in the combustion chamber 4 does not sufficiently increase by the introduction of the hot-EGR gas alone.

In the normal combustion range B corresponding to a full-throttle load condition and higher-load, higher-speed regions (within the range B) close to the full-throttle load condition, on the other hand, the valve lift varying mechanism 15 is switched to the aforementioned disengaged state in which the exhaust valve 14a is opened only in the exhaust stroke (opening period Ex) so that the introduction of the hot EGR gas is interrupted. In this state, the EGR valve 24 is closed and normal combustion is produced by forced ignition.

It is to be noted that the aforementioned first embodiment can be varied in various way. Some examples of such variations are given below:

(1) Among the two intake valves 13a, 13b of each combustion chamber 4, the intake valve 13a may be provided with a valve stop mechanism for stopping actuation of the intake valve 13a (or for reducing the lift of the intake valve 13a to a minimum level) to produce a swirl of intake air under low-load conditions. If the intake valve 13a of which actuation is stopped (or of which lift is reduced to the minimum level) is disposed face to face with the exhaust valve 14a which is opened even under the low-load conditions in this variation, it is possible to ensure smooth flow of the intake air swirl and the internal EGR gas.

Figure 8:
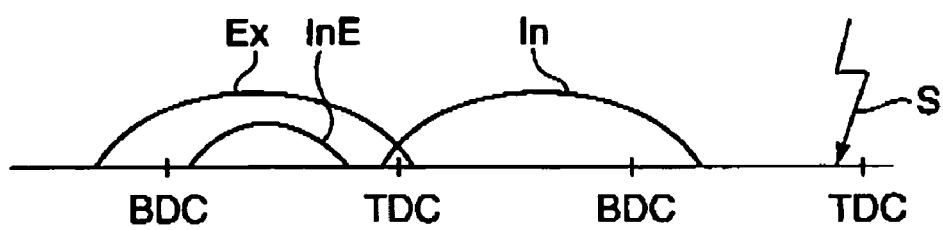
FIG. 8 is an explanatory diagram showing a valve operating pattern according to a variation of the first embodiment.

(2) In the aforementioned first embodiment, the exhaust valve 14a among the two exhaust valves 14a, 14b of each cylinder 2 is provided with the valve lift varying mechanism 15. Instead of this arrangement, the intake valve 13a among the two intake valves 13a, 13b may be provided with a valve lift varying mechanism which opens the intake valve 13a not only in the intake stroke (opening period In) but also in the exhaust stroke (opening period InE) as shown in FIG. 8 in the compression ignition combustion range A. According to this variation, part of exhaust gas is caused to flow back through the exhaust port 8 in the exhaust stroke and return into each combustion chamber 4 in a succeeding intake stroke as the hot EGR gas (internal EGR gas).

(3) As an alternative to the aforementioned arrangement of the first embodiment for achieving the internal EGR, an intake valve may be opened after an exhaust valve is closed to establish a period of negative overlap during which both the intake valve and the exhaust valve are closed.

(4) Although the fuel injector 11 is disposed in the intake port 7 of each cylinder 2 in the first embodiment, the fuel injector 11 may be so located as to inject the fuel directly into the combustion chamber 4 of each cylinder 2. This variation serves to increase the degree of freedom in setting the fuel injection timing.

(5) Although the firing assist operation is always performed with the aid of the spark plug 5 in the compression ignition combustion range A in the first embodiment, this arrangement may be modified such that the firing assist operation is performed at least in the cold EGR subrange A2 in which the cold EGR gas is introduced. For example, the arrangement of the first embodiment may be modified such that the firing assist operation is performed in the cold EGR subrange A2 and in an extremely low-load portion of the hot EGR subrange A1 and the firing assist operation is not performed in operating regions in which the compression ignition is properly produced by the introduction of the hot EGR gas.

Second Embodiment

A spark-ignition engine incorporating a control device according to a second embodiment of the invention is now described referring to FIGS. 9 to 12. The engine of the second embodiment has generally the same construction as that of the first embodiment including the aforementioned valve lift varying mechanism 15. Therefore, reference should be made to FIGS. 1 to 3 for the general engine construction and those elements which are identical or similar to those of the first embodiment.

Figure 9:
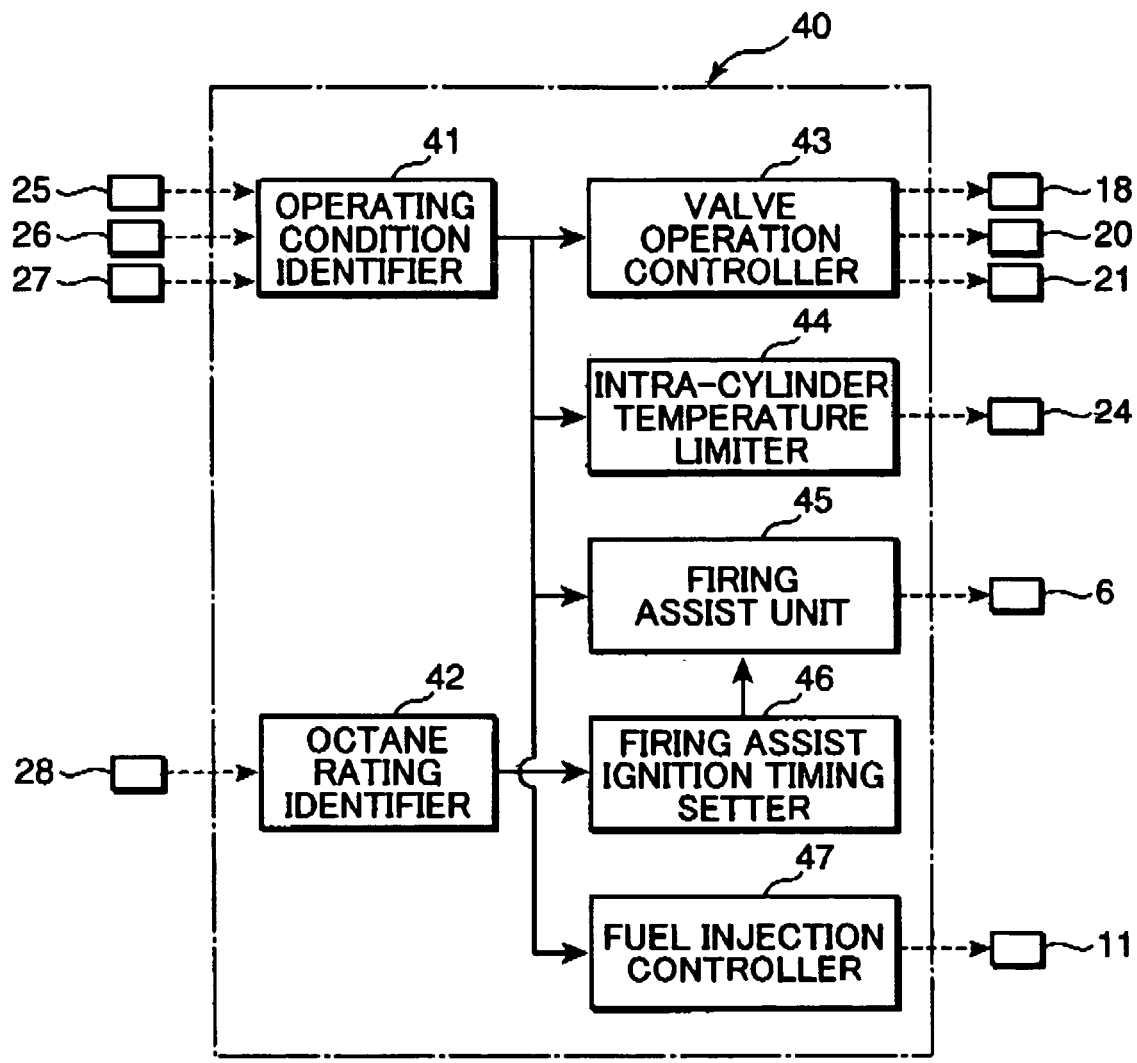
FIG. 9 is a functional block diagram showing the configuration a control device of an engine according to a second embodiment of the invention.

Referring to FIG. 9, the ignition circuit 6, the fuel injectors 11, the control valve 18 of the valve lift varying mechanism 15, the valve timing varying mechanisms 20, 21 and the EGR valve 24 are controlled by an ECU 40. Sensing signals output from various sensors, such as the throttle opening sensor 25 for detecting the opening of the throttle valve 12, the engine speed sensor 26 for detecting engine speed, the water temperature sensor 27 for detecting the temperature of engine cooling water and ion current sensors 28, are input into the ECU 40. The ion current sensors 28 are fitted to the individual spark plugs 5 for detecting an ion current (a flow of ions) occurring as a result of combustion in each combustion chamber 4.

The ECU 40 incorporates such functional units as an operating condition identifier 41, an octane rating identifier 42, a valve operation controller 43, an intra-cylinder temperature limiter 44, an firing assist unit 45, an firing assist ignition timing setter 46 and a fuel injection controller 47.

The operating condition identifier 41 judges whether or not the engine is in the warm-running state in which the temperature of the cooling water of the engine is equal to or higher than a predefined value based on the signal output from the water temperature sensor 27. When the engine is judged to be in the warm-running state, the operating condition identifier 41 examines operating conditions of the engine based on an engine load determined from the signal output from the throttle opening sensor 25 and the engine speed determined from the signal output from the engine speed sensor 26 and determines in which one of the operating ranges shown in the map of FIG. 6 the engine is currently operated.

The octane rating identifier 42 makes a judgment on the octane number of the fuel based on a combustion pattern determined from the signals output from the ion current sensors 28.

Figure 10:
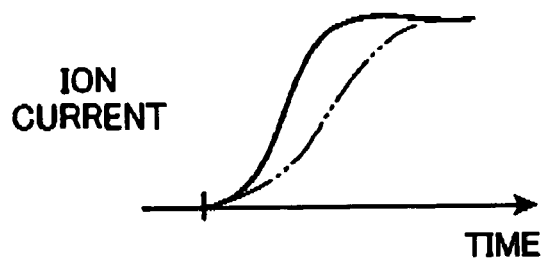
FIG. 10 is a diagram depicting how an ion current varies with the progress of combustion used when a combustion pattern is detected by an ion current sensor.

Generally, the ion current increases with the progress of combustion from the beginning of combustion. FIG. 10 shows a comparison of combustion patterns produced when combustion is made by the compression ignition by using fuel having a low octane number (e.g., regular gasoline) and fuel having a high octane number (e.g., high-octane gasoline) under the same conditions. When combustion is made by the compression ignition by using the low-octane fuel, the ion current increases relatively rapidly as shown by a solid line in FIG. 10. When combustion is made by the compression ignition by using the high-octane fuel, on the other hand, the ion current increases relatively slowly as shown by an alternate long and two short dashed line in FIG. 10 because the high-octane fuel has a low degree of capability to produce the compression ignition. It is therefore possible to determine the octane number by examining the rate of increase of the ion current immediately after the beginning of combustion.

As an alternative to the aforementioned ion current sensor 28, pressure sensors may be used to detect a crank angle at which a maximum combustion pressure is reached or a knock sensor may be used to detect the magnitude of knocking for determining the combustion pattern to eventually determine the octane number.

The valve operation controller 43 controls the control valve 18 of the valve lift varying mechanism 15 and the valve timing varying mechanisms 20, 21 to control the amount of hot EGR gas (internal EGR gas) like the valve operation controller 33 of the first embodiment.

The intra-cylinder temperature limiter 44 controls the amount of cold EGR gas (external EGR gas) by controlling the EGR valve 24 like the cold EGR controller 34 of the first embodiment.

The firing assist unit 45 controls the ignition circuit 6 in such a manner that the mixture is ignited by the spark plug 5 at a point immediately preceding the top dead center in the compression stroke (as shown the symbol "S" in FIG. 5) to accelerate the compression ignition in the compression ignition combustion range A (refer to FIG. 6).

Figure 11:
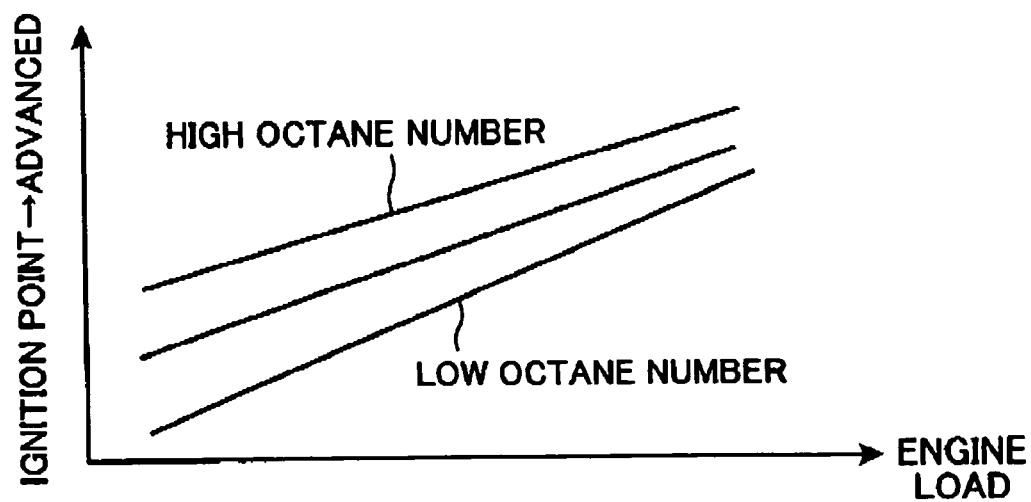
FIG. 11 is a diagram showing a map defining a relationship between the engine load and appropriate ignition points for fuels having different octane numbers.

The firing assist ignition timing setter 46 controls the ignition timing according to the operating condition of the engine and the octane number determined by the octane rating identifier 42 when the firing assist unit 45 controls the ignition in a manner to accelerate the compression ignition as stated above. Specifically, the firing assist ignition timing setter 46 has a map defining a relationship between the engine load and appropriate ignition points for fuels having different octane numbers as shown in FIG. 11. According to the relationship prescribed in the map of FIG. 11, the ignition point is progressively advanced as the engine load increases and as the octane number increases. The ignition point is determined using this map based on the octane number determined by the octane rating identifier 42 and the engine load determined by the operating condition identifier 41.

With the control device thus constructed of the present embodiment, the introduction of the hot EGR gas and the cold EGR gas and the firing assist operation in the compression ignition combustion range A are controlled in, the same manner as in the first embodiment. When the mixture is ignited by the spark plug 5 at the point immediately preceding the top dead center in the compression stroke by performing the firing assist operation to increase the capability of the engine to produce the compression ignition in the compression ignition combustion range A, however, the ignition timing is varied depending on the octane number in the second embodiment. Therefore, the combustion initiated by the compression ignition is produced in a preferable manner according to the present embodiment even when the octane number of the fuel supplied to the combustion chambers 4 is changed.

Figure 12:
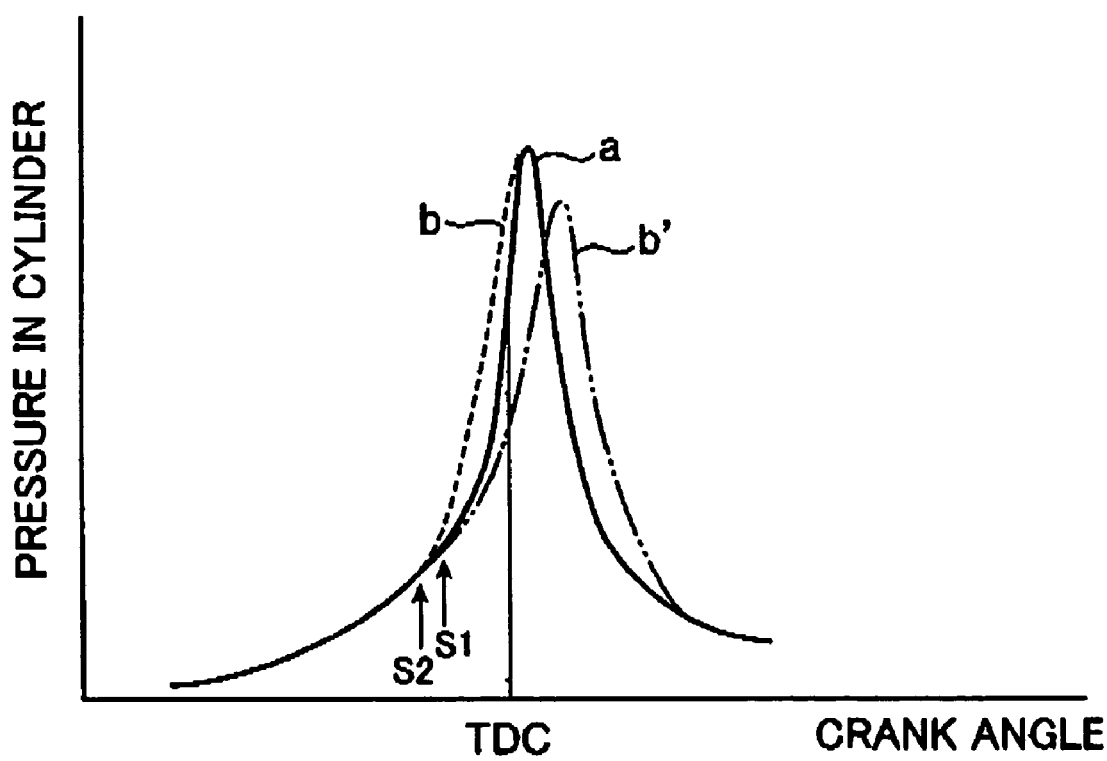
FIG. 12 is a diagram showing variations in pressure in cylinders caused by compression ignition.

This effect is explained in detail with reference to FIG. 12. When the low-octane fuel is used, rapid combustion is produced by the compression ignition as shown by a solid line a in FIG. 12 as the firing assist unit 45 causes the spark plug 5 to ignite the mixture by performing the firing assist operation. In this case, the ignition point is set to a relatively late point S1 (close to the top dead center TDC in the compression stroke) so that the maximum combustion pressure is reached immediately after the top dead center TDC in the compression stroke and combustion is made by the compression ignition in a highly efficient manner. The high-octane fuel has a lower capability to produce the compression ignition compared to the low-octane fuel. Thus, the increase in combustion pressure tends to be delayed as shown by an alternate long and two short dashed line b' in FIG. 12 if the high-octane fuel is ignited at the same ignition point S1 as the low-octane fuel. This tendency is corrected by progressively advancing the ignition point as shown by S2 with an increase in the octane number, so that the combustion pressure properly increases as shown by a broken line b in FIG. 12 and combustion is made by the compression ignition in a highly efficient manner.

The ignition point at which the firing assist unit 45 causes the spark plug 5 to ignite the mixture by performing the firing assist operation is adjusted according to the engine load as well. As the engine load increases, the amount of injected fuel increases and the time needed for combustion lengthens. As the ignition point is correspondingly advanced with an increase in engine load in this embodiment, combustion is made by the compression ignition in an efficient manner.

Like the first embodiment, the second embodiment can be varied in the same way as discussed earlier with reference to the aforementioned variations (1) to (5).

Third Embodiment

Figure 13:
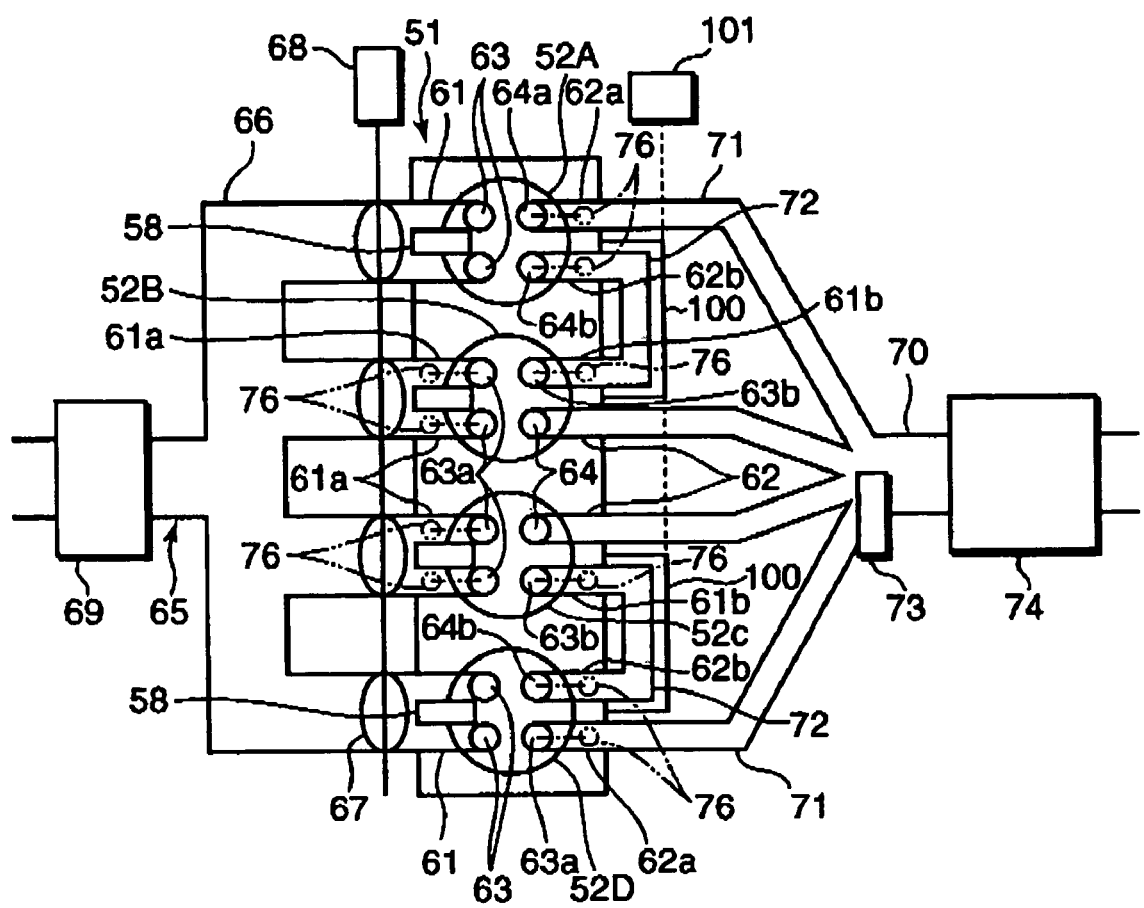
FIG. 13 is a general plan view of an entire engine provided with a control device according to a third embodiment of the invention.
Figure 14:
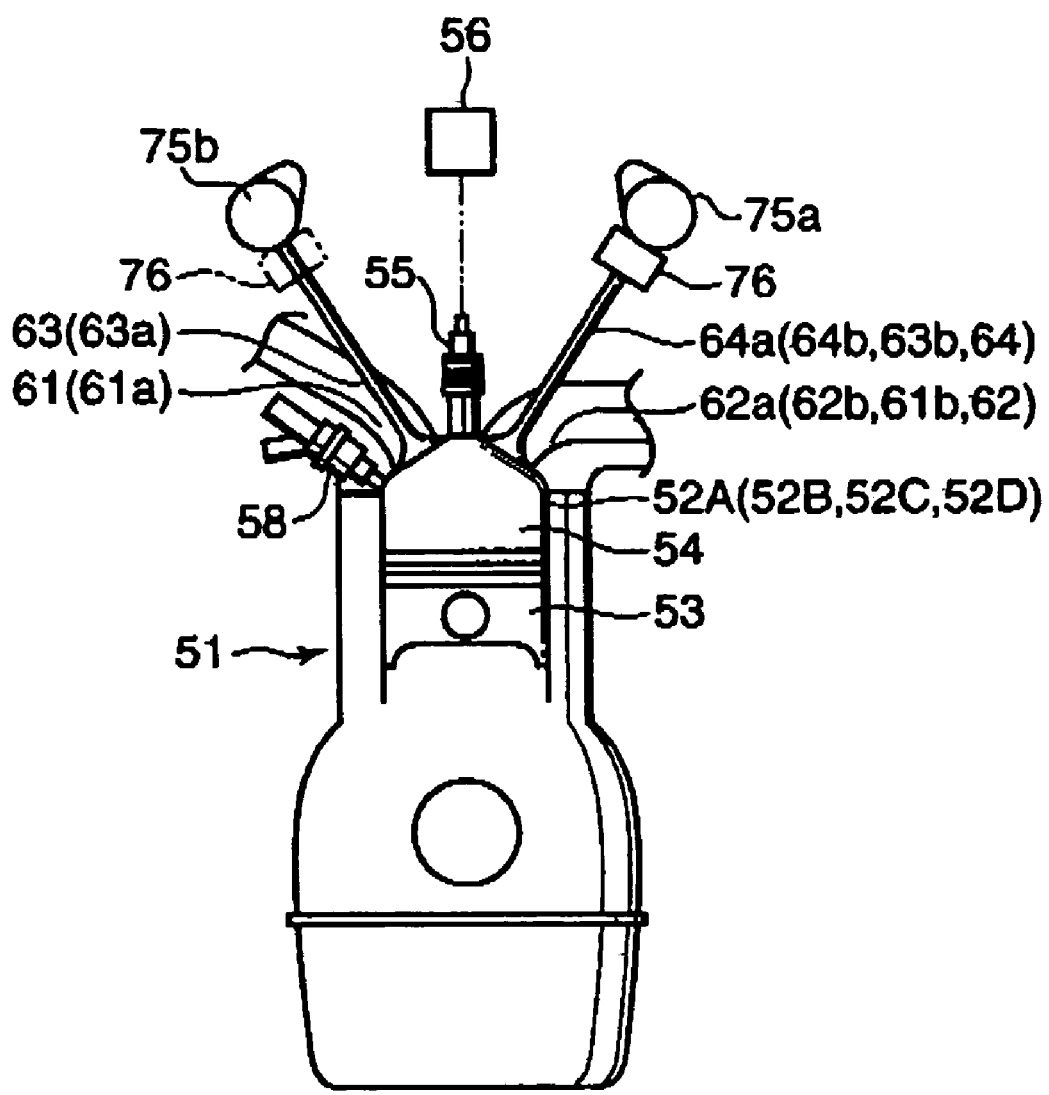
FIG. 14 is a schematic cross-sectional view of the engine of the third embodiment.

A spark-ignition engine incorporating a control device according to a third embodiment of the invention is now described referring to FIGS. 13 to 19. FIGS. 13 and 14 show the general construction of the engine of this embodiment, in which an engine body 51 has a plurality of cylinders. Like the foregoing first and second embodiments, the engine body 51 has four cylinders designated 52A to 52D in this embodiment, with one each piston 53 fitted in the individual cylinders 52A–52D and a combustion chamber 54 formed above the piston 53. There is disposed a spark plug 55 at the top of the combustion chamber 54 in each cylinder 52 and the spark plug 55 is connected to an ignition circuit 56.

On one side of the combustion chamber 54 of each cylinder 52, there is provided a fuel injector 58 for injecting fuel directly into the combustion chamber 54. Although not illustrated, the fuel is supplied from a fuel pump to the fuel injector 58 through a fuel-feeding passage, a fuel-feeding system being so constructed as to provide a fuel pressure higher than the internal pressure of the combustion chamber 54 in each compression stroke.

Intake ports 61, 61a, 61b and exhaust ports 62, 62a, 62b open to the combustion chambers 54 of the individual cylinders 52A–52D. An intake passage 65 and an exhaust passage 70 are connected to these ports which are opened and closed by intake valves 63, 63a, 63b and exhaust valves 64, 64a, 64b, respectively.

Figure 17:
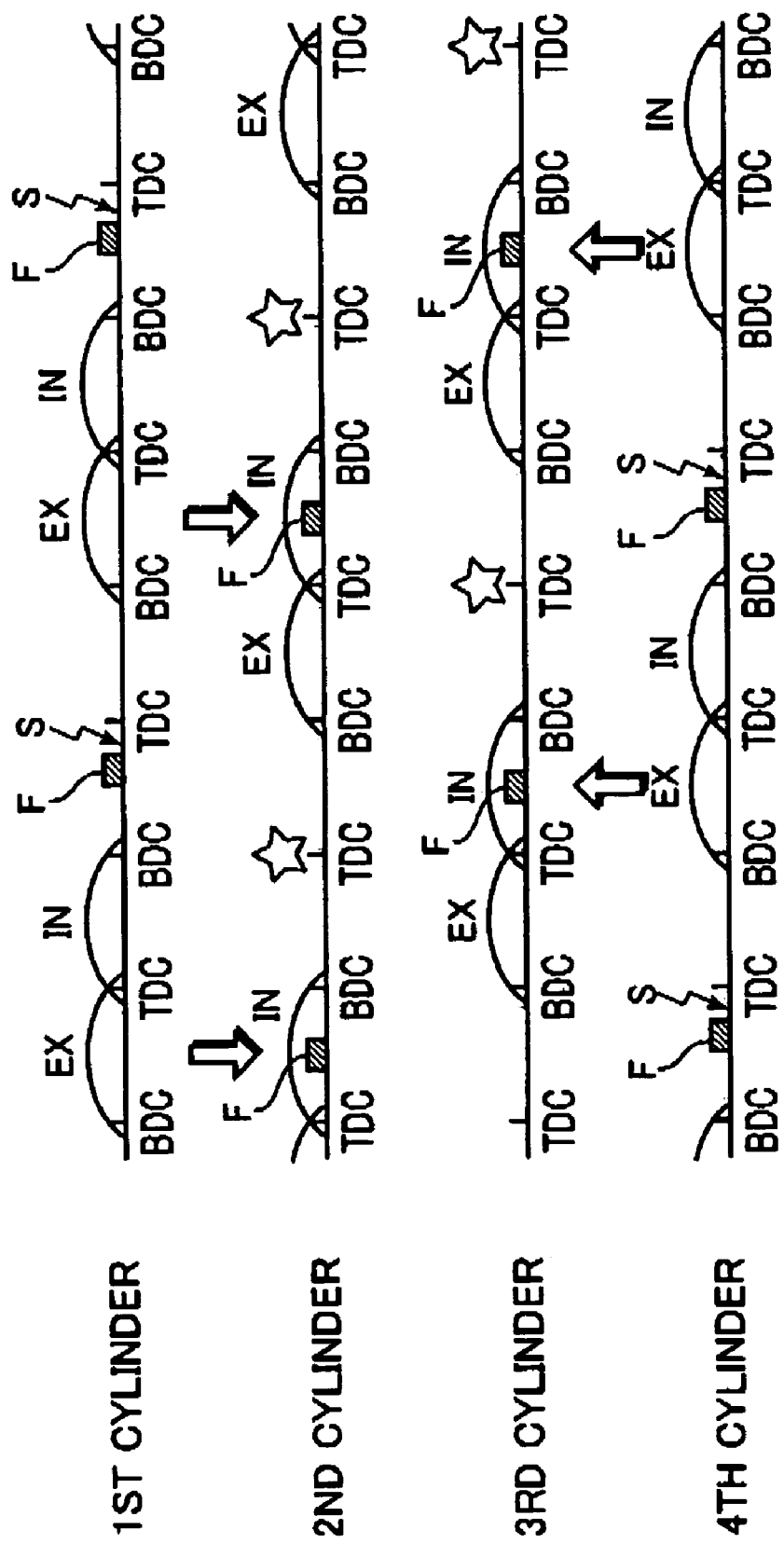
FIG. 17 is a diagram showing timing of intake and exhaust strokes as well as fuel injection timing and ignition timing of individual cylinders.

The individual cylinders 52A–52D go through successive cycles of intake, compression, expansion and exhaust strokes with specific phase delays. In the four-cylinder engine of this embodiment, of which cylinders 52A–52D are hereinafter referred to as the first cylinder 52A, the second cylinder 52B, the third cylinder 52C and the fourth cylinder 52D as viewed from one end of cylinder bank, the aforementioned cycles are carried out in the order of the first cylinder 52A, the third cylinder 52C, the fourth cylinder 52D and the second cylinder 52B with a successive phase delay of 180° as shown in FIG. 17. In FIG. 17, "EX" designates exhaust strokes, "IN" designates intake strokes, "F" designates fuel injection, "S" designates forced ignition, and each star-shaped symbol indicates a point where the compression ignition is produced.

There is provided an intercylinder gas channel 72 between two cylinders of which exhaust and intake strokes overlap so that already burned gas can be drawn from the cylinder in the exhaust stroke (hereinafter referred to as the preceding cylinder) into the cylinder in the intake stroke (hereinafter referred to as the following cylinder) during a period of overlap of the exhaust and intake strokes. In the four-cylinder engine of this embodiment, the exhaust stroke (EX) of the first cylinder 52A overlaps the intake stroke (IN) of the second cylinder 52B and the exhaust stroke (EX) of the fourth cylinder 52D overlaps the intake stroke (IN) of the third cylinder 52C as shown in FIG. 17. Therefore, the first cylinder 52A and the second cylinder 52B constitute one cylinder pair while the fourth cylinder 52D and the third cylinder 52C constitute another cylinder pair, the first cylinder 52A and the fourth cylinder 52D being the preceding cylinders and the second cylinder 52B and the third cylinder 52C being the following cylinders.

Specifically, the intake and exhaust ports 61, 61a, 61b, 62, 62a, 62b of the individual cylinders 52A–52D, the intake and exhaust passages 65, 70 and the intercylinder gas channels 72 connected to the cylinders 52A–52D are configured as described in the following.

The intake ports 61 for introducing fresh air, the first exhaust ports 62a for letting out burned gas (exhaust gas) into the exhaust passage 70 and the second exhaust ports 62b for delivering the burned gas to the respective following cylinders are provided in the first cylinder 52A and the fourth cylinder 52D which are the preceding cylinders. In the second cylinder 52B and the third cylinder 52C which are the following cylinders, there are provided the first intake ports 61a for introducing fresh air, the second intake ports 61b for introducing the burned gas from the preceding cylinders 52A, 52D and the exhaust ports 62 for letting out the burned gas into the exhaust passage 70 are provided.

In the example shown in FIG. 13, two each intake ports 61 are provided in the first and fourth cylinders 52A, 52D and two each first intake ports 61a are provided in the second and third cylinders 52B, 52C in parallel arrangement on left half sides of the respective combustion chambers 54 as illustrated. Also, one each first exhaust port 62a and second exhaust port 62b are provided in the first and fourth cylinders 52A, 52D and one each second intake port 61b and exhaust port 62 are provided in the second and third cylinders 52B, 52C in parallel arrangement on right half sides of the respective combustion chambers 54 as illustrated.

Downstream ends of individual intake channels 66 branched out from the intake passage 65 are connected to the intake ports 61 of the first and fourth cylinders 52A, 52D or to the first intake ports 61a of the second and third cylinders 52B, 52C. Close to the downstream ends of the individual branched intake channels 66, there are provided multiple throttle valves 67 which are interlocked by a common shaft. The multiple throttle valves 67 are driven by an actuator 68 according to a control signal to regulate the amount of intake air. An airflow sensor 69 for detecting the amount of intake air is provided in the common intake passage 65 upstream of its joint portion.

Upstream ends of individual exhaust channels 71 branched from the exhaust passage 70 are connected to the first exhaust ports 62a of the first and fourth cylinders 52A, 52D or to the exhaust ports 62 of the second and third cylinders 52B, 52C. The intercylinder gas channels 72 are provided between the first cylinder 52A and the second cylinder 52B and between the third cylinder 52C and the fourth cylinder 52D. Upstream ends of the intercylinder gas channels 72 are connected to the second exhaust ports 62b of the first and fourth cylinders 52A, 52D which are the preceding cylinders while downstream ends of the intercylinder gas channels 72 are connected to the second intake ports 61b of the second and third cylinders 52B, 52C which are the following cylinders.

An O₂ sensor 73 for determining the air-fuel ratio by detecting the concentration of oxygen in the exhaust gas is disposed at a joint portion of the exhaust passage 70, downstream of the individual branched exhaust channels 71. A catalyst 74 is disposed in the exhaust passage 70 further downstream of the O₂ sensor 73.

There is provided a water jacket 100 covering the intercylinder gas channels 72 for cooling the burned gas flowing through the intercylinder gas channels 72. A water pump 101 is connected to the water jacket 100 for circulating engine cooling water.

The intake and exhaust valves for opening and closing the aforementioned intake and exhaust ports of the individual cylinders 52A–52D and a valve actuating mechanism for controlling the intake and exhaust valves are constructed as follows.

The intake ports 61, the first exhaust ports 62a and the second exhaust ports 62b of the first and fourth cylinders 52A, 52D are provided with the intake valves 63, the first exhaust valves 64a and the second exhaust valves 64b, respectively. Similarly, the first intake ports 61a, the second intake ports 61b and the exhaust ports 62 of the second and third cylinders 52B, 52C are provided with the first intake valves 63a, the second intake valves 63b and the exhaust valves 64, respectively. The valve actuating mechanism including respective camshafts 75a, 75b drives these intake and exhaust valves to open and close them with specific timing such that the exhaust and intake strokes of the individual cylinders 52A–52D are performed with the earlier-mentioned specific phase delays.

Among the aforementioned intake and exhaust valves, the first exhaust valves 64a, the second exhaust valves 64b and the first intake valves 63a are individually provided with switching mechanisms 76 for switching the respective valves between activated and deactivated states. The construction of these switching mechanisms 76 is not illustrated in detail as the same is conventional. As an example, the switching mechanisms 76 are provided on the camshafts 75a, 75b, and a tappet disposed between a cam and a valve stem is provided with a hydraulic chamber to and from which hydraulic oil can be supplied and withdrawn. When the hydraulic oil is supplied to the hydraulic chamber, the motion of the cam is transmitted to the relevant valve so that the valve is caused to open and close. When the hydraulic oil is withdrawn from the hydraulic chamber, the motion of the cam is not transmitted to the relevant valve so that the valve becomes immovable.

Figure 15:
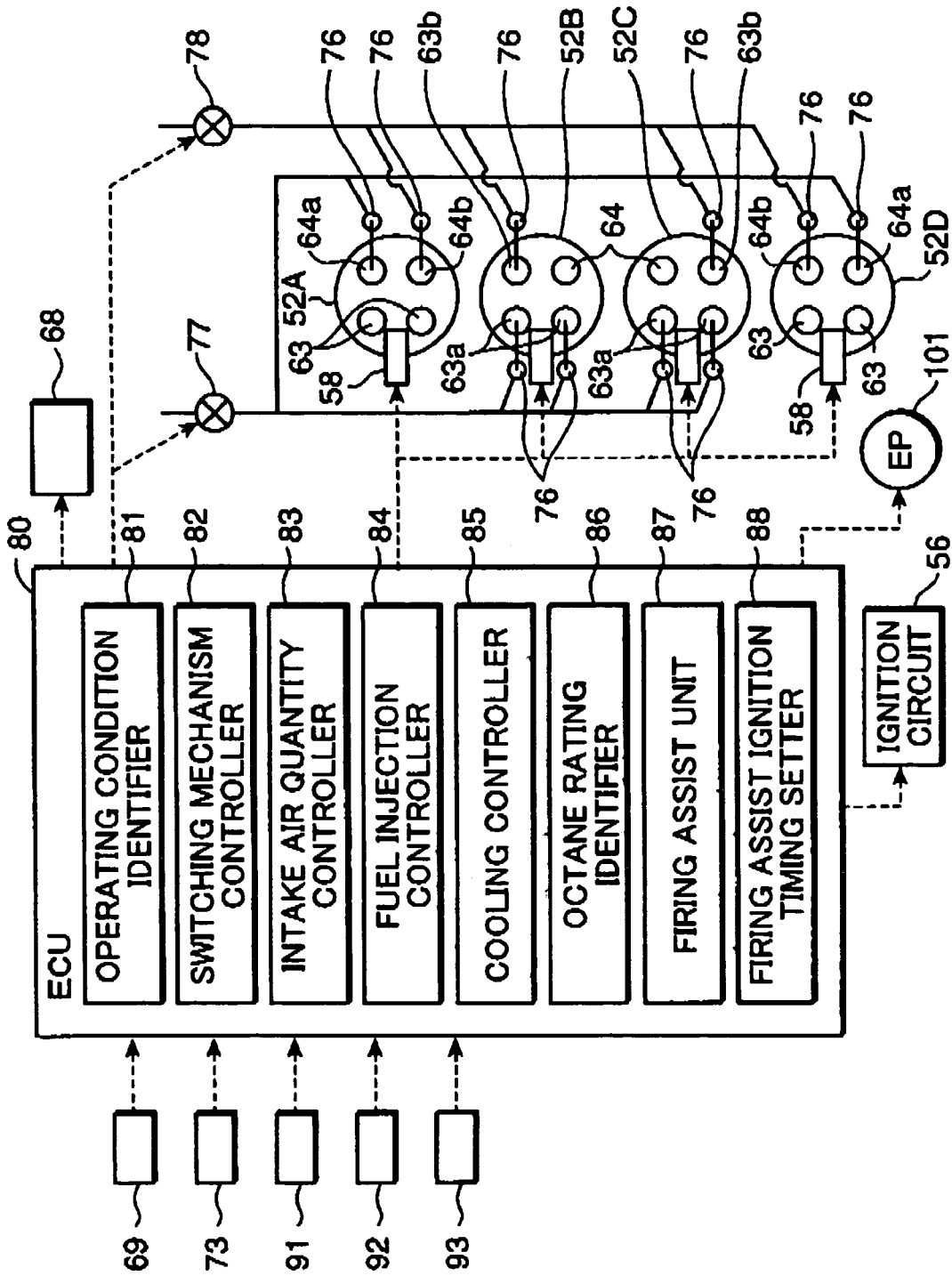
FIG. 15 is a block diagram of a control system of the engine of the third embodiment.

A first control valve 77 is provided in a fluid channel for supplying and withdrawing the hydraulic oil to and from the switching mechanisms 76 of the first exhaust valves 64a and those of the first intake valves 63a, while a second control valve 78 is provided in a fluid channel for supplying and withdrawing the hydraulic oil to and from the switching mechanisms 76 of the second exhaust valves 64b and those of the second intake valves 63b (see FIG. 15).

FIG. 15 shows the configuration of a drive/control system of the engine of the third embodiment. Referring to this Figure, signals output from the airflow sensor 69 and the O₂ sensor 73 are input into an ECU 80 for controlling the engine. Also input into the ECU 80 are signals output from an engine speed sensor 91 for detecting engine speed used for judging operating condition of the engine, a throttle opening sensor 92 for detecting throttle opening (the amount of depression of an accelerator), and ion current sensors (pressure sensors or a knock sensor) 93 used for detecting the octane number of fuel.

On the other hand, the ECU 80 outputs control signals to the individual fuel injectors 58, the actuator 68 of the multiple throttle valves 67 as well as to the first and second control valves 77, 78.

The ECU 80 includes an operating condition identifier 81, a switching mechanism controller 82, an intake air quantity controller 83, a fuel injection controller 84, a cooling controller 85, an octane rating identifier 86, a firing assist unit 87 and a firing assist ignition timing setter 88.

Figure 16:
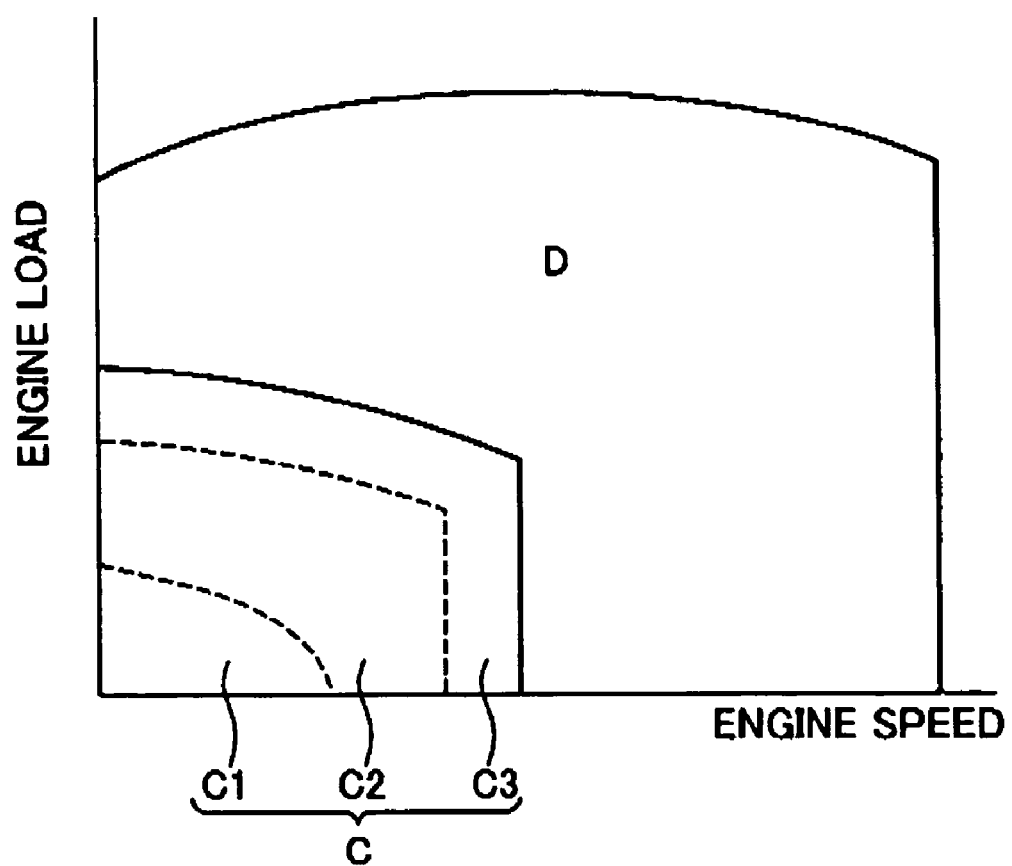
FIG. 16 is an explanatory diagram showing a map of different operating ranges of the engine of the third embodiment.

The operating condition identifier 81 has a map used for engine control as shown in FIG. 16, in which the symbol "C" represents an engine operating range on a low-load, low-speed side (part-load range) and the symbol "D" represents an engine operating range on a high-load, high-speed side. In this embodiment, the engine is operated in a special operation mode in the operating range C on the low-load, low-speed side while the engine is operated in a normal operation mode in the operating range D on the high-load, high-speed side. The operating condition identifier 81 examines the operating condition of the engine (engine speed and load) based on the signals fed from the engine speed sensor 91 and the throttle opening sensor 92 and judges whether the engine operating condition falls in the operating range C or in the operating range D The aforementioned special operation mode range C is divided into three subranges. These are a low-load, low-speed subrange C1 in which the engine speed and the engine load are the lowest, a medium-load, medium-speed subrange C2 in which the engine speed and the engine load are higher than those in the low-load, low-speed subrange C1, and a high-load, high-speed subrange C3 in which the engine speed and the engine load are higher than those in the medium-load, medium-speed subrange C2.

The switching mechanism controller 82 controls the individual switching mechanisms 76 as follows by controlling each of the aforementioned control valves 77, 78 depending on whether the engine operating condition falls within the special operation mode range C on the low-load, low-speed side or in the normal operation mode range D on the high-load, high-speed side.

Operating range C (special operation mode):
　The first exhaust valves 64a and the first intake valves 63a are set to the deactivated state while the second exhaust valves 64b and the second intake valves 63b are set to the activated state.

Operating range D (normal operation mode):
　The first exhaust valves 64a and the first intake valves 63a are set to the activated state while the second exhaust valves 64b and the second intake valves 63b are set to the deactivated state.

The intake air quantity controller 83 controls the opening of each throttle valve 67 (throttle opening) by controlling the actuator 68. The intake air quantity controller 83 determines a target intake air quantity from a map, for instance, based on the engine operating condition and controls the throttle opening according to the target intake air quantity obtained.

In the special operation mode range C, introduction of intake air into the following cylinders (second and third cylinders 52B, 52C) through the branched intake channels 66 is interrupted and excess air in the gas introduced from the preceding cylinders (first and fourth cylinders 52A, 52D) is used for burning newly supplied fuel. Therefore, the throttle opening is regulated in such a manner that air necessary for burning a quantity of fuel corresponding to the amount of torque to be produced by a pair of preceding and following cylinders is supplied to the preceding cylinders (first and fourth cylinders 52A, 52D).

The aforementioned fuel injection controller 84 controls the amounts of fuel to be injected from the fuel injectors 58 provided in the individual cylinders 52A–52D as well as injection timing according to the engine operating condition. In particular, the fuel injection controller 84 differently controls the amounts of injected fuel and injection timing depending on the selected operation mode.

When the engine is judged to be in the special operation mode range C, the fuel injection controller 84 performs a control operation for the special operation mode. Specifically, the fuel injection controller 84 controls the amounts of fuel injected into the preceding cylinders (first and fourth cylinders 52A, 52D) such that the air-fuel ratio becomes significantly higher than the stoichiometric air-fuel ratio, e.g., approximately equal to twice or higher than the stoichiometric air-fuel ratio, to create a lean mixture, and sets injection timing to inject the fuel during the compression stroke to thereby produce stratified charge combustion in the preceding cylinders 52A, 52D. The stratified charge combustion is produced as the mixture is ignited near the top dead center in the compression stroke. On the other hand, the fuel injection controller 84 controls the amounts of fuel injected into the following cylinders (second and third cylinders 52B, 52C) such that the air-fuel ratio becomes substantially equal to or higher than the stoichiometric air-fuel ratio at the time of combustion in the following cylinders (second and third cylinders 52B, 52C) by feeding the fuel into burned gas of a "lean" air-fuel ratio introduced from the preceding cylinders 52A, 52D, and sets injection timing to inject the fuel in the intake stroke into the following cylinders (second and third cylinders 52B, 52C) so that a uniform mixture is produced and combustion is made by the compression ignition in a highly efficient manner.

When the engine is judged to be in the normal operation mode range D, the fuel injection controller 84 performs a control operation for the normal operation mode. Specifically, the fuel injection controller 84 controls the amounts of fuel injected into the individual cylinders 52A–52D such that the air-fuel ratio becomes equal to or smaller than the stoichiometric air-fuel ratio. For example, the fuel injection controller 84 controls the amounts of injected fuel in such a manner that the air-fuel ratio becomes equal to the stoichiometric air-fuel ratio in most regions within the normal operation mode range D and becomes smaller than the stoichiometric air-fuel ratio in a maximum-load region and the vicinity thereof within the normal operation mode range D. In this case, the fuel injection controller 84 sets injection timing to inject the fuel in the intake stroke into the individual cylinders 52A–520 so that a uniform mixture is produced therein.

The cooling controller 85 serves to prevent knocking of the following cylinders 52B, 52C in the high-load, high-speed subrange C3 within the special operation mode range C. To achieve this, the cooling controller 85 serves as an intra-cylinder temperature limiter for preventing a temperature increase in the following cylinders 52B, 52C due to the introduction of the burned gas into the following cylinders 52B, 52C. More specifically, the cooling controller 85 activates the water pump 101 to circulate the cooling water through the water jacket 100 covering the intercylinder gas channels 72 so that the cooling controller 85 can perform a control operation for cooling the burned gas to such a temperature level that would prevent the occurrence of knocking of the following cylinders 52B, 52C in the high-load, high-speed subrange C3 within the special operation mode range C.

Like the octane rating identifier 42 of the second embodiment, the octane rating identifier 86 makes a judgment on the octane number of the fuel based on a combustion pattern determined from the signals output from the ion current sensors (pressure sensors or a knock sensor) 93.

The firing assist unit 87 is so constructed as to accelerate compression ignition in the following cylinders 52B, 52C by igniting the mixture in the following cylinders 52B, 52C immediately before the top dead center in the compression stroke when the engine is in the low-load, low-speed subrange C1 within the special operation mode range C or when the engine is in the high-load, high-speed subrange C3 within the special operation mode range C and the cooling controller 85 is operated. More specifically, the firing assist unit 87 outputs an ignition command signal to the ignition circuit 56 to ignite the mixture when the pistons 53 of the following cylinders 52B, 52C have approached to the top dead center in the compression stroke so that the pressure around the spark plug 55 rapidly increases, thereby producing the compression ignition.

Like the firing assist ignition timing setter 46 of the second embodiment, the firing assist ignition timing setter 88 determines the ignition timing according to the operating condition of the engine and the octane number using a map like the one shown in FIG. 11 when the firing assist unit 87 controls the ignition in a manner to accelerate the compression ignition as stated above.

Figure 18:
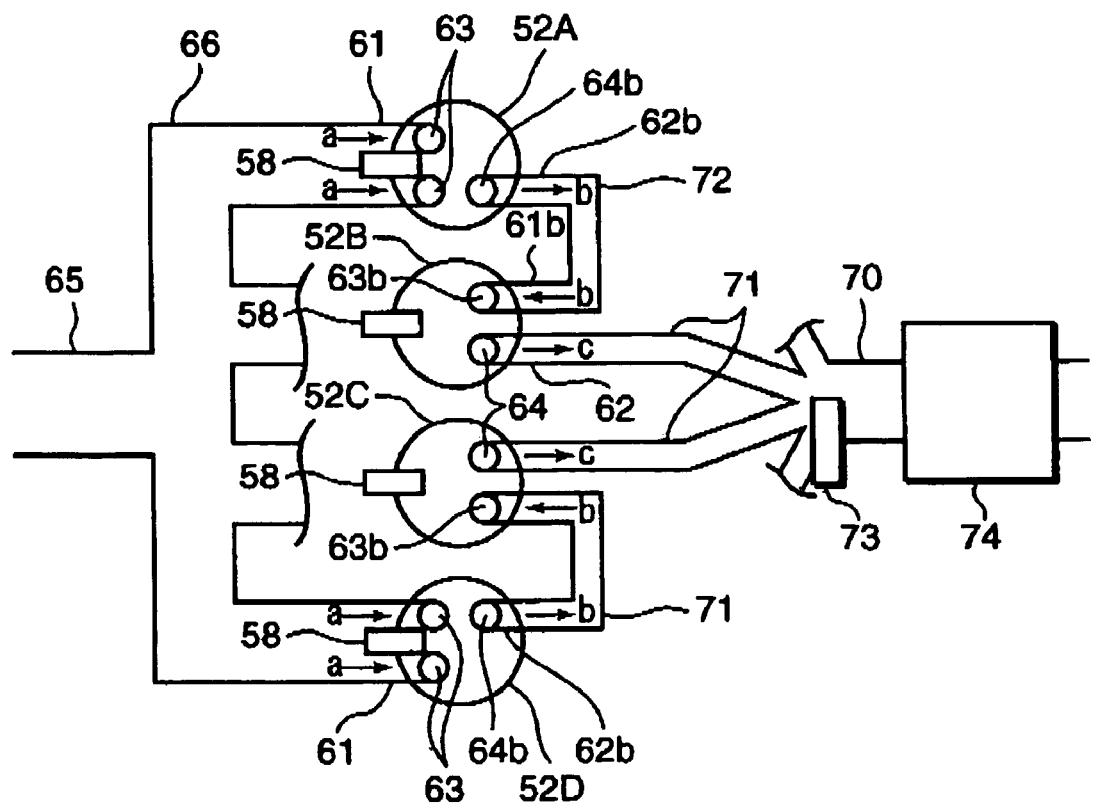
FIG. 18 is an explanatory diagram showing substantial gas flow paths formed in a low-load, low-speed operating range.
Figure 19:
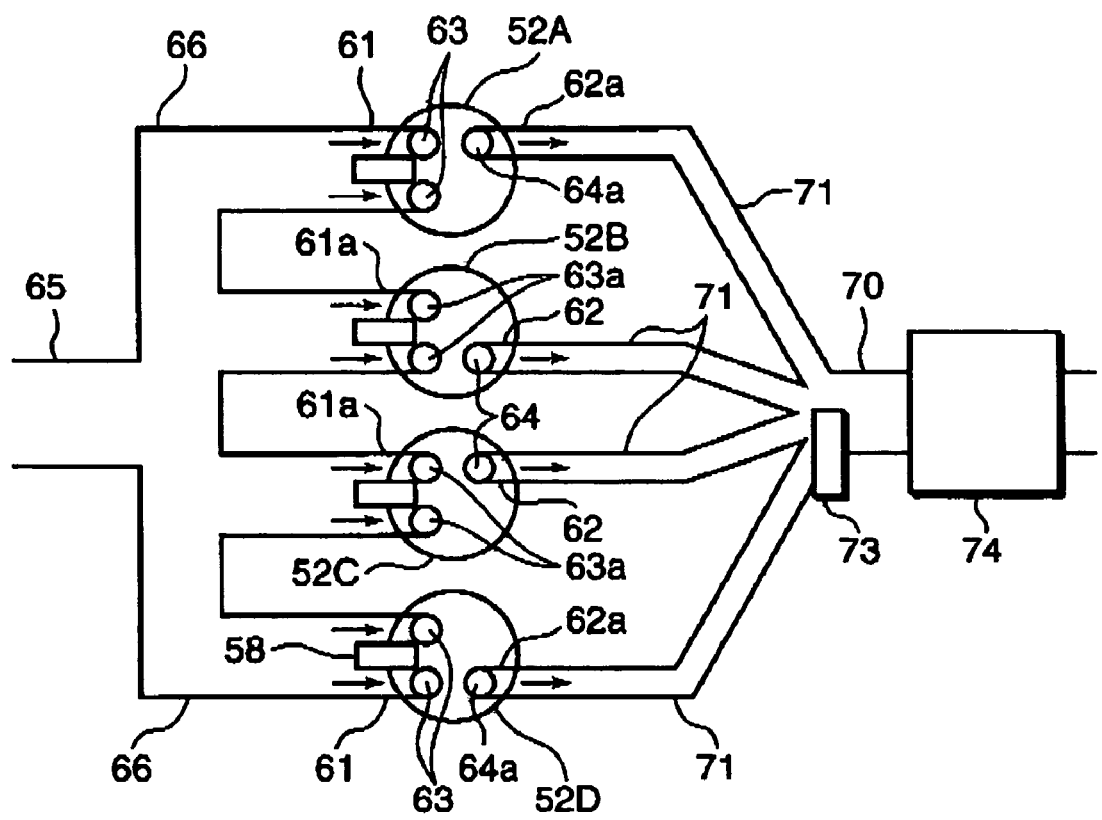
FIG. 19 is an explanatory diagram showing substantial gas flow paths formed in a high-load or high-speed operating range.

The working of the aforementioned third embodiment is now explained referring to FIGS. 17 to 19.

In the special operation mode range C which is the operating range on the low-load, low-speed side, the first exhaust valves 64a and the first intake valves 63a are in the deactivated state while the second exhaust valves 64b and the second intake valves 63b are in the activated state as stated above, so that substantial gas flow paths shown in FIG. 18 form a dual two-cylinder interconnect configuration. In the dual two-cylinder interconnect configuration, the burned gas discharged from the preceding cylinders 52A, 52D is introduced directly into the respective following cylinders 52B, 52C through the intercylinder gas channels 72 and the burned gas discharged from only the following cylinders 52B, 52C is led to the exhaust passage 70.

In this condition, fresh air is introduced through the intake passage 65 (arrows "a" in FIG. 18) into the preceding cylinders 52A, 52D in their intake stroke, the fuel is injected into the preceding cylinders 52A, 52D in the compression stroke with the amounts of injected fuel feedback-controlled to produce an extremely lean mixture of which air-fuel ratio is approximately equal to twice or higher than the stoichiometric air-fuel ratio, and the mixture is ignited at specific ignition points to produce stratified charge combustion in the preceding cylinders 52A, 52D under extremely lean conditions (refer to FIG. 17).

Subsequently, the burned gas discharged from the preceding cylinders 52A, 52D is introduced into the respective following cylinders 52B, 52C through the intercylinder gas channels 72 during periods when the exhaust stroke of the preceding cylinders 52A, 52D overlaps the intake stroke of the following cylinders 52B, 52C (open arrows in FIG. 17 and arrows "b" in FIG. 18). The fuel is supplied to the burned gas having a high air-fuel ratio introduced from the preceding cylinders 52A, 52D into the following cylinders 52B, 52C and the fuel is injected into the following cylinders 52B, 52C in the intake stroke with the amounts of fuel controlled such that the air-fuel ratio becomes substantially equal to or higher than the stoichiometric air-fuel ratio. As the pressure and the temperature in the combustion chambers 54 of the following cylinders 52B, 52C increase near the top dead center in the compression stroke after the temperature in the combustion chambers 54 has been increased by the hot burned gas introduced from the preceding cylinders 52A, 52D, the compression ignition is produced in the following cylinders 52B, 52C.

Since the stratified charge combustion is performed under the extremely lean conditions in the preceding cylinders 52A, 52D as stated above, thermal efficiency is improved and pumping loss is reduced in the preceding cylinders 52A, 52D. In the following cylinders 52B, 52C, on the other hand, rapid combustion is produced as a result of simultaneous firing at multiple points in each combustion chamber 54 under conditions of a uniformly dispersed mixture at an increased air-fuel ratio. Therefore, the thermal efficiency is improved and pumping loss is reduced in the following cylinders 52B, 52C as in the preceding cylinders 52A, 52D. Fuel economy is remarkably improved as a result of a combined effect of the improvement in thermal efficiency and the reduction in pumping loss.

Furthermore, NOx emission is sufficiently decreased in this embodiment. This is because the air-fuel ratio in the preceding cylinders 52A, 52D is made approximately equal to twice or higher than the stoichiometric air-fuel ratio to keep the amount of NOx generated in these cylinders 52A, 52D to a relatively low level, and the burned gas is introduced from the preceding cylinders 52A, 52D into the following cylinders 52B, 52C to create a condition equivalent to what would occur when a great deal of exhaust gas is introduced by EGR operation. The arrangement of the embodiment is therefore advantageous for improving the quality of emissions.

In the operating range D on the high-load, high-speed side, on the other hand, the first exhaust valves 64a and the first intake valves 63a are in the activated state while the second exhaust valves 64b and the second intake valves 63b are in the deactivated state as stated above, so that substantial gas flow paths as shown in FIG. 19 are formed. As a result, the intake ports 61, 61a and the exhaust ports 62, 62a of the individual cylinders 52A–52D work substantially independently of one another, so that fresh air is introduced through the intake passage 65 and the intake ports 61, 61a into the respective cylinders 52A–52D and the burned gas is discharged from the cylinders 52A–52D into the exhaust passage 70 through the respective exhaust ports 62, 62a. In this operating range D, the amount of intake air and the amounts of injected fuel are so controlled that the air-fuel ratio becomes equal to or smaller than the stoichiometric air-fuel ratio to produce a rich mixture to maintain satisfactory engine output performance.

Since the special operation mode or the normal operation mode is selected depending on the operating range of the engine as thus far discussed, the quality of emissions is improved in the operating range C on the low-load, low-speed side whereas the engine output performance is ensured in the operating range D on the high-load, high-speed side.

In the low-load, low-speed subrange C1 within the operating range C in which combustion is made in the special operation mode, there is a general tendency for the compression ignition to become difficult as a result of an insufficient temperature increase of the burned gas introduced from the preceding cylinders 52A, 52D into the following cylinders 52B, 52C. In this embodiment, the firing assist unit 87 helps fire the mixture in the following cylinders 52B, 52C immediately before the top dead center in the compression stroke to accelerate the compression ignition when the engine is in the low-load, low-speed subrange C1. It is therefore possible to properly produce the compression ignition in the following cylinders 52B, 52C.

In the high-load, high-speed subrange C3 within the operating range C in which combustion is made in the special operation mode, there is a general tendency for knocking to occur as a result of an excessively high temperature of the burned gas supplied from the preceding cylinders 52A, 52D to the following cylinders 52B, 52C. In this embodiment, the performs the aforementioned control operation for properly cooling the burned gas introduced from the preceding cylinders 52A, 52D into the following cylinders 52B, 52C through the intercylinder gas channels 72, wherein the firing assist unit 87 activates the water pump 101 to circulate the cooling water through the water jacket 100 covering the intercylinder gas channels 72 so that the occurrence of knocking due to an excessive increase in the temperature of the burned gas into the following cylinders 52B, 52C is effectively prevented. At the same time, the firing assist unit 87 performs a control operation for inducing the compression ignition in the following cylinders 52B, 52C so that the mixture in the following cylinders 52B, 52C can be fired by the compression ignition at an appropriate point in time near the top dead center in the compression stroke.

When the mixture is fired before the top dead center in the compression stroke by performing the firing assist operation for inducing the compression ignition in the low-load, low-speed subrange C1 or in the high-load, high-speed subrange C3 within the operating range C in which combustion is made in the special operation mode, the ignition timing is varied depending on the octane number as in the second embodiment. Therefore, the combustion by the compression ignition is properly produced in the present embodiment as well even when the octane number of the fuel supplied to the combustion chambers 54 is changed.

While the fuel injectors 58 for supplying the fuel to the preceding cylinders 52A, 52D and the following cylinders 52B, 52C are of a direct injection type that inject the fuel directly into their combustion chambers 54 in the aforementioned third embodiment, the fuel injectors for the following cylinders 52B, 52C are not necessarily limited to the direct injection type. As an example, the third embodiment may be modified in such a way that fuel injectors for the following cylinders 52B, 52C are disposed in the intake ports 61a and in the intercylinder gas channels 72, and the fuel injectors disposed in the intake ports 61a are activated in the normal operation mode while the fuel injectors disposed in the intercylinder gas channels 72 are activated in the special operation mode.

The foregoing third embodiment employs the cooling controller 85 for cooling the burned gas supplied from the preceding cylinders 52A, 52D into the following cylinders 52B, 52C, the cooling controller 85 serving as the intracylinder temperature limiter for preventing an excessive temperature increase in the following cylinders 52B, 52C in the high-load, high-speed subrange C3 within the special operation mode range C. The embodiment may be modified in such a way that the effective compression ratio of the following cylinders 52B, 52C is reduced by controlling closing points of the second intake valves 63b of the following cylinders 52S, 52C instead of using the cooling controller 85.

Fourth Embodiment

Figure 20:
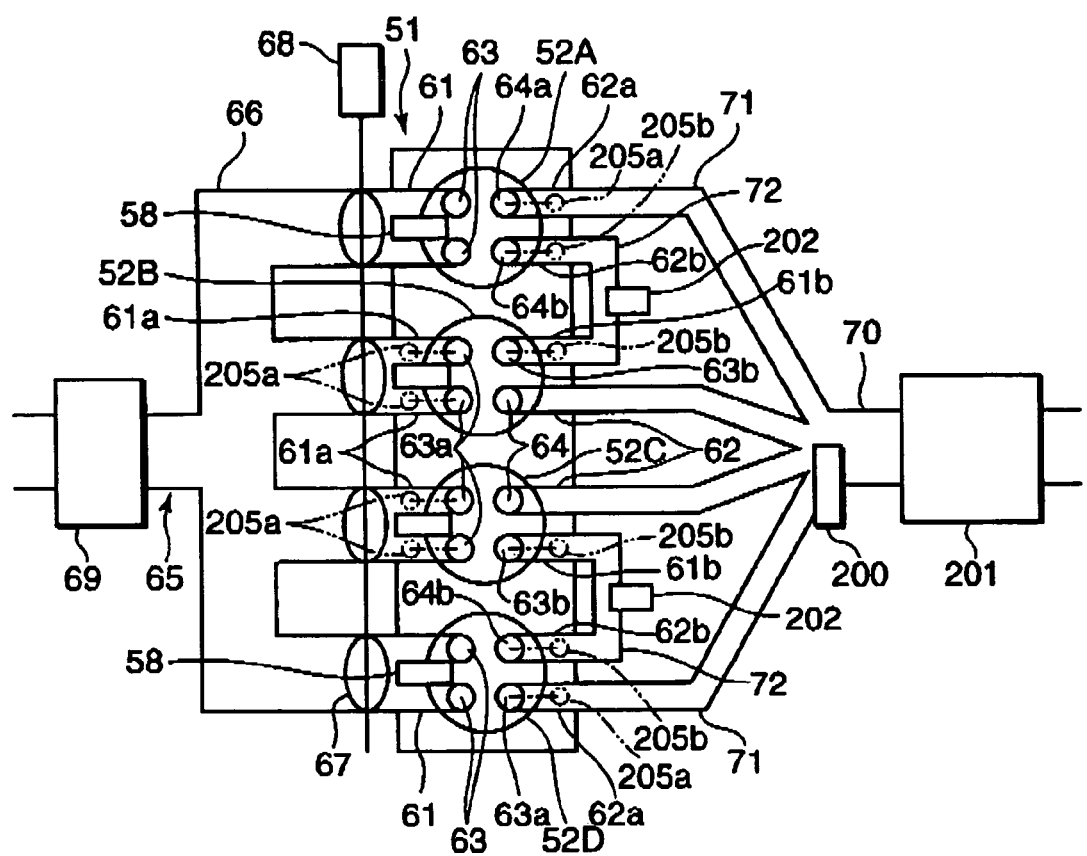
FIG. 20 is a general plan view of an entire engine provided with a control device according to a fourth embodiment of the invention.
Figure 21:
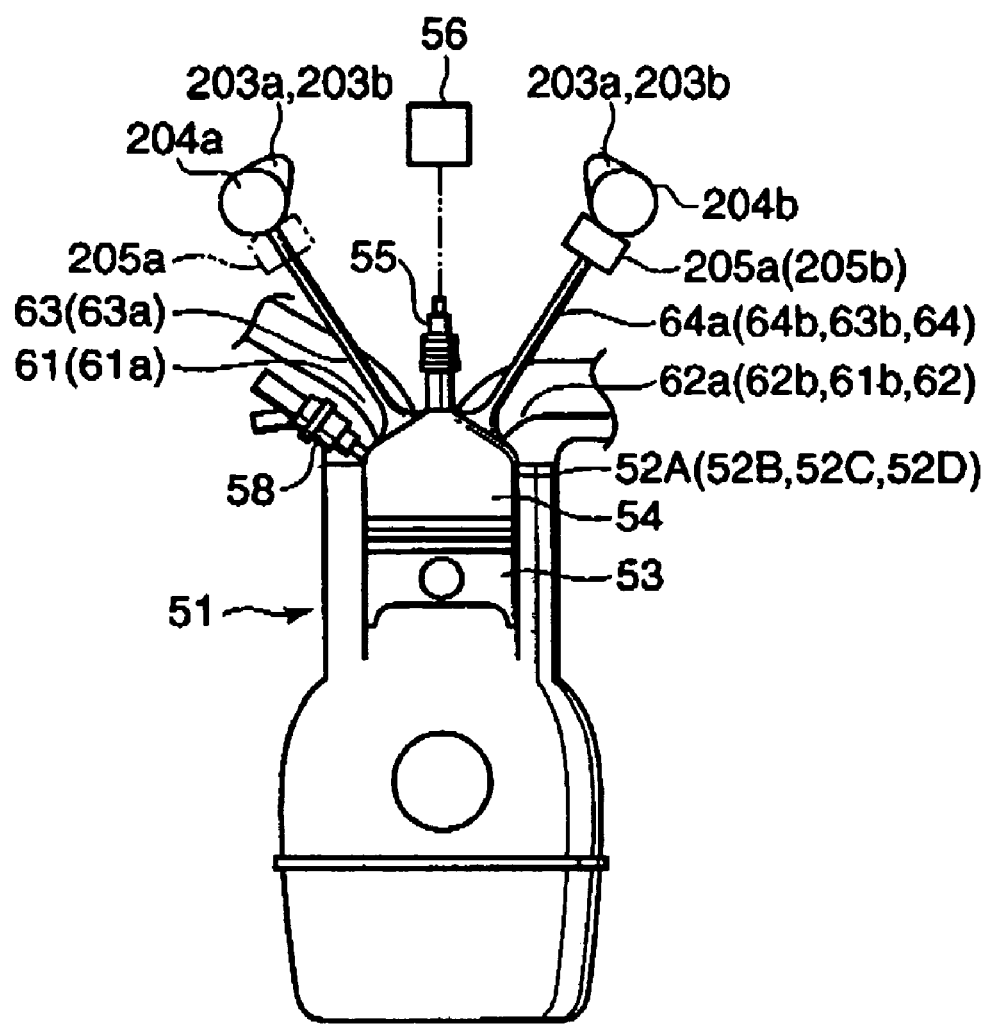
FIG. 21 is a schematic cross-sectional view of the engine of the fourth embodiment.

A spark-ignition engine incorporating a control device according to a fourth embodiment of the invention is now described referring to FIGS. 20 to 35. The engine of the fourth embodiment has generally the same construction as the third embodiment. In FIGS. 20 and 21, elements identical to those of the third embodiment are designated by the same reference numerals and those elements are not described in detail here.

The engine of the fourth embodiment has the same engine body 51 and intake system as the third embodiment. While the engine has an exhaust system similar to that of the third embodiment, there is disposed an $O_2$ sensor 200 at a joint portion of the exhaust passage 70, downstream of the individual branched exhaust channels 71, and a three-way catalyst 201 further downstream of the $O_2$ sensor 200. As is commonly known, the three-way catalyst 201 is a catalyst which exhibits high converting performance with respect to hydrocarbons (HC), carbon monoxide (CO) and NOx when the air-fuel ratio of the exhaust gas is approximately equal to the stoichiometric air-fuel ratio (i.e., excess-air factor $\lambda=1$). Provided for detecting the air-fuel ratio by measuring the concentration of oxygen in the exhaust gas, the aforementioned $O_2$ sensor 200 is formed of a $\lambda O_2$ sensor of which output suddenly changes particularly at around the stoichiometric air-fuel ratio.

A linear $O_2$ sensor 202 of which output linearly varies with changes in oxygen concentration in the exhaust gas is provided in each of the intercylinder gas channels 72.

Each of camshafts 204a, 204b of valve actuating mechanisms for controlling the intake and exhaust valves of the individual cylinders 52A–52D is provided with a first cam 203a for opening and closing the intake or exhaust valve by lifting it and a pair of second cams 203b for retaining the intake or exhaust valve in a closed state by preventing it from being lifted.

Among the aforementioned intake and exhaust valves, the first exhaust valves 64a of the preceding cylinders 52A, 52D and the first intake valves 63a of the following cylinders 52B, 52C are individually provided with first switching mechanisms 205a for switching these valves 63a, 64a between an activated state and a deactivated (closed) state while the second exhaust valves 64b of the preceding cylinders 52A, 52D and the second intake valves 63b of the following cylinders 52B, 52C are individually provided with second switching mechanisms 205b for switching these valves 63b, 64b between an activated state and a deactivated (closed) state. The first and second switching mechanisms 205a, 205b together constitute a switching mechanism for switching intake and exhaust flow paths between a dual two-cylinder interconnect configuration and an independent cylinder configuration which will be described later.

Figure 22:
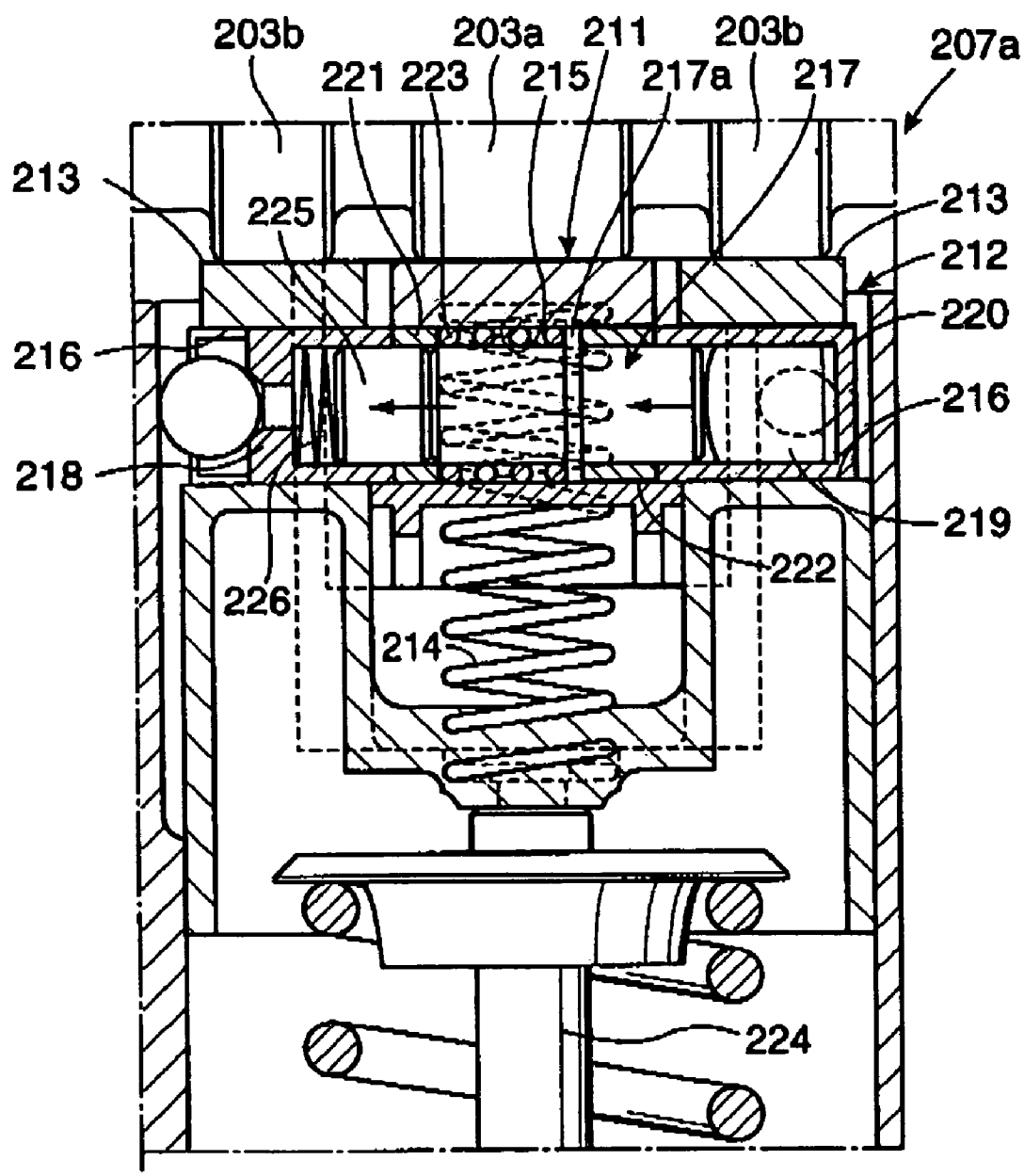
FIG. 22 is a cross-sectional front view showing a specific construction of a first switching mechanism.
Figure 23:
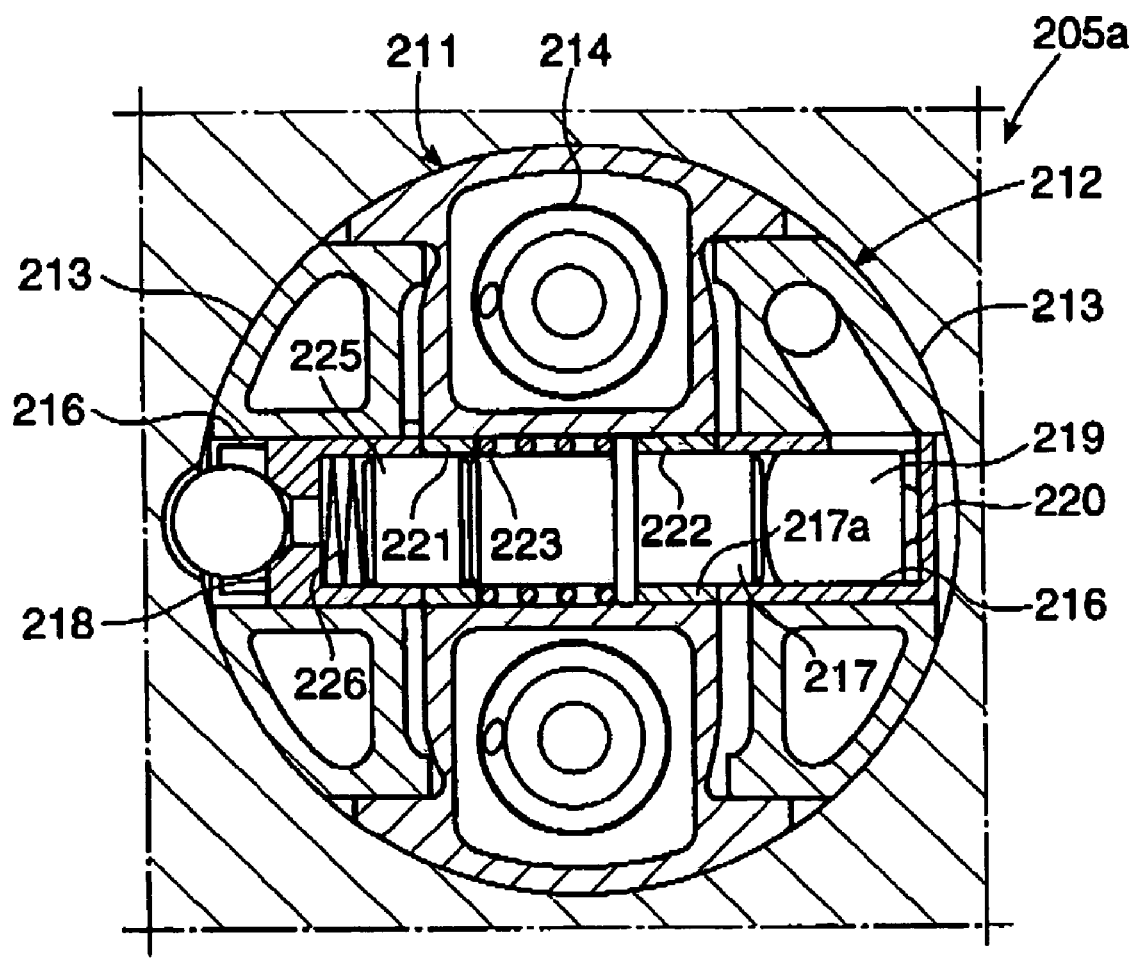
FIG. 23 is a cross-sectional plan view showing the specific construction of the first switching mechanism.

As shown in FIGS. 22 to 24, the first switching mechanism 205a includes a center tappet 211 provided at a position corresponding to the first cam 203a of the valve actuating mechanism, a side tappet 212 having a pair of projecting parts 213 located at positions corresponding to the second cams 203b, and a pair of compression coil springs 214 located between the bottom of the side tappet 212 and the bottom of the center tappet 211 for pushing the center tappet 211 in a direction to keep its top surface in tight contact with the first cam 203a.

In the center tappet 211 and the two projecting parts 213 of the side tappet 212, there are formed lock holes 215, 66 at corresponding positions so that these lock holes 215, 66 align to form a single through hole when the center tappet 211 is in its upper position shown in FIG. 22. A lock pin 217 having a flange 217a is fitted slidably in its axial direction in the lock hole 215 of the center tappet 211. A first holder 218 having a cavity for accommodating a first plunger 225 and a pusher 226 formed of a compression coil spring for forcing the first plunger 225 against the lock pin 217 is fitted in the lock holes 216 formed in one of the projecting parts 213 of the side tappet 212, while a second holder 220 for retaining a second plunger 219 is fitted in the lock holes 216 formed in the other projecting part 213.

First and second bushes 221, 222 for holding both ends of the lock pin 217 and a pusher 223 formed of a compression coil spring for forcing the lock pin 217 in the direction of its root end (toward the second plunger 219) are fitted in the lock hole 215 of the center tappet 211. Under normal conditions, the flange 217a of the lock pin 217 is supported at Its home position where the flange 217a is in contact with a far end of the second bush 222 due to pushing forces of the pushers 223, 226 as shown in FIGS. 22 and 23, so that the lock pin 217 is accommodated bridging a gap between the lock hole 215 of the center tappet 211 and the second holder 220, and the first plunger 225 is accommodated bridging the first holder 218 and the first bush 221, whereby the center tappet 211 and the side tappet 212 are held in an interlocked condition. As a result, a driving force of the center tappet 211 which is activated by the first cam 203a is transmitted to a stem end 224 of the first intake valve 63a (first exhaust valve 64a) through the side tappet 212, thereby causing the first intake valve 63a (first exhaust valve 64a) to open and close.

When hydraulic oil is supplied from a later-described fluid channel 206 for supplying and withdrawing the hydraulic oil to and from the a line between a root end of the second plunger 219 and the bottom of the second holder 220, the lock pin 217 forced toward the first plunger 225 moves in a direction shown by an arrow in FIG. 22 up to an activated position where the lock pin 217 is accommodated in the lock hole 215 of the center tappet 211 overwhelming the pushing force of the pusher 223, and the first plunger 225 forced toward the first holder 218 moves in a direction shown by an arrow in FIG. 22 up to an activated position where the first plunger 225 is accommodated in the first holder 218 overwhelming the pushing force of the pusher 226, whereby the center tappet 211 is disengaged from the side tappet 212. As a result, transmission of a driving force of the first cam 203a to the stem end 224 of the first intake valve 63a (first exhaust valve 64a) through the side tappet 212 is interrupted, thereby holding the first intake valve 63a (first exhaust valve 64a) in its closed state.

Figure 25:
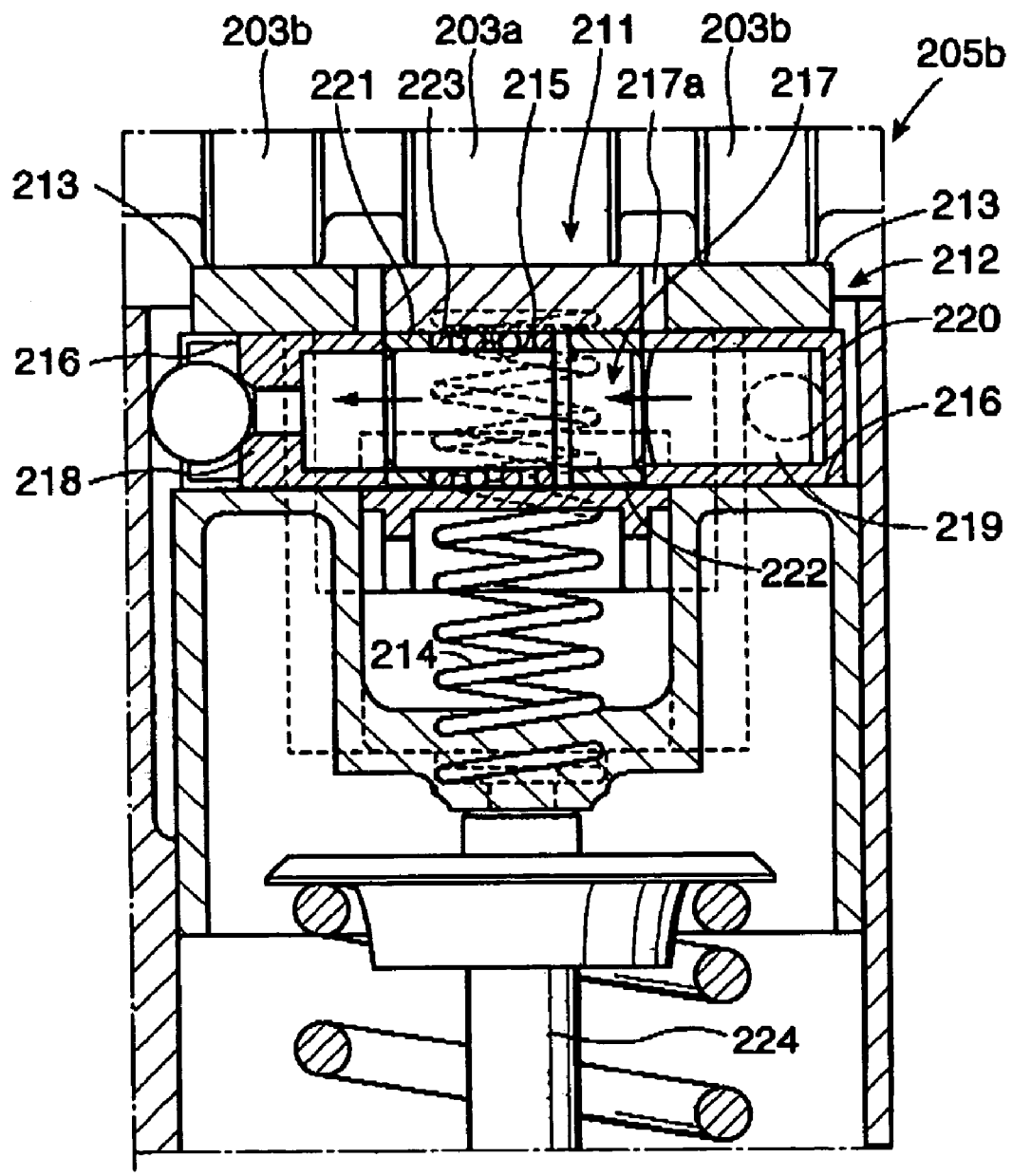
FIG. 25 is a cross-sectional front view showing a specific construction of a second switching mechanism.

The second switching mechanism 205b provided as part of the valve actuating mechanism of the second intake valve 63b and the second exhaust valve 64b is constructed in a similar fashion as the first switching mechanism 205a except that the center tappet 211 is disengaged from the side tappet 212 under normal conditions with the lock pin 217 accommodated in the lock hole 215 of the center tappet 211 and the second plunger 219 held at its home position where it is accommodated in the second holder 220 as shown in FIG. 25.

Under normal conditions, supply of the hydraulic oil to the second switching mechanism 205b is interrupted so that the second intake valve 63b (second exhaust valve 64b) is held in its closed state. Also, as the hydraulic oil is supplied from a later-described fluid channel 208 for supplying and withdrawing the hydraulic oil to and from the line between the root end of the second plunger 219 and the bottom of the second holder 220, a far end of the second plunger 219 goes into the lock hole 215 of the center tappet 211, and the lock pin 217 forced by the second plunger 219 is pushed toward the first holder 218 overwhelming the pushing force of the pusher 223 and moves up to the activated position where a far end of the lock pin 217 is located within the first holder 218 as shown in FIG. 25, whereby the center tappet 211 and the side tappet 212 are joined together. As a result, the driving force of the first cam 203a is transmitted to the stem end 224 of the second intake valve 63b (second exhaust valve 64b) through the side tappet 212, thereby causing the second intake valve 63b (second exhaust valve 64b) to open and close.

Figure 26:
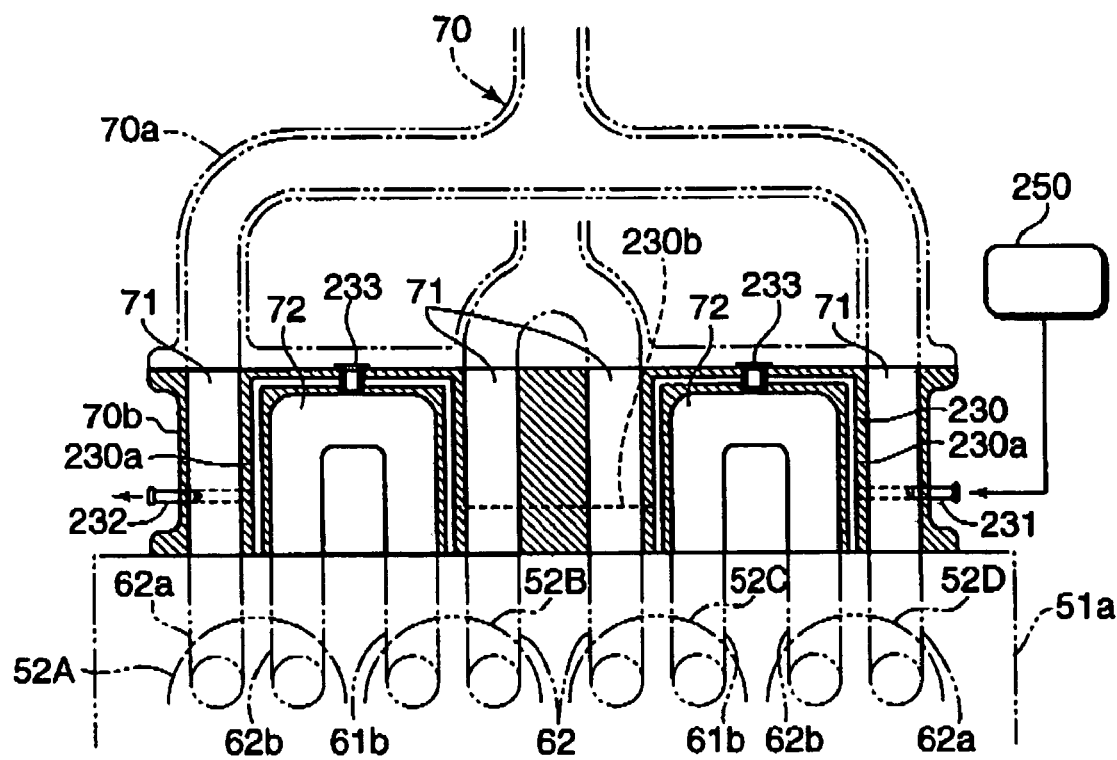
FIG. 26 is a cross-sectional plan view showing the construction of part of an exhaust manifold where intercylinder gas channels are a water jacket surrounding the intercylinder gas channels are formed.
Figure 27:
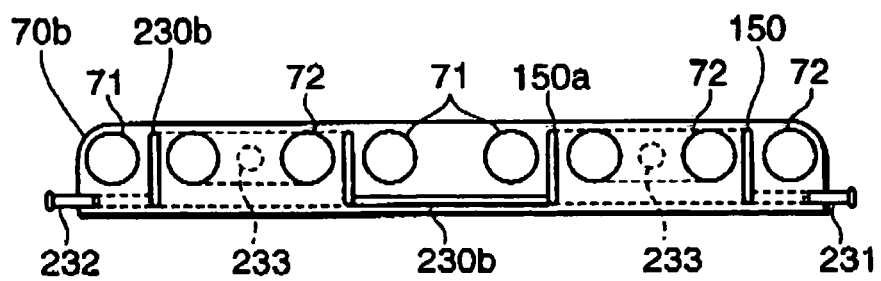
FIG. 27 is a front view showing the construction of the same part of the exhaust manifold where the intercylinder gas channels and the water jacket surrounding the intercylinder gas channels are formed.

The construction of a water jacket 230 which provides fluid channels for circulating a cooling medium for cooling the intercylinder gas channels 72 is now described referring to FIGS. 26 to 32. FIGS. 26 and 27 are diagrams showing the construction of part of an exhaust manifold where the intercylinder gas channels 72 and the water jacket 230 surrounding the intercylinder gas channels 72 are formed. As illustrated in these Figures, the exhaust manifold constituting an upstream part of the exhaust passage 70 is made up of a main portion 70a and an upstream portion 70b, the main portion 70a including most part of the branched exhaust channels 71 and their downstream joint portion and the upstream portion 70b including part of the branched exhaust channels 71 and the intercylinder gas channels 72. The main portion 70a and the upstream portion 70b of the exhaust manifold are together connected to a cylinder head 51a of the engine with the upstream portion 70b located between the cylinder head 51a and the main portion 70a.

Upstream portions of the four branched exhaust channels 71 connecting to the first exhaust ports 62a of the preceding cylinders 52A, 52D and to the exhaust ports 62 of the following cylinders 52B, 52C are formed in the upstream portion 70b of the exhaust manifold. The two U-shaped intercylinder gas channels 72 connecting to the second exhaust ports 62b of the preceding cylinders 52A, 52D and to the second intake ports 61b of the following cylinders 52B, 52C are also formed in the upstream portion 70b of the exhaust manifold. Further, the aforementioned water jacket (cooling medium channel) 230 for circulating the cooling medium (engine cooling water) around the intercylinder gas channels 72 is also formed in the upstream portion 70b of the exhaust manifold.

The water jacket 230 is shaped in such a way that the intercylinder gas channels 72 can be efficiently cooled by circulating the cooling medium and the upstream portion 70b of the exhaust manifold including the water jacket 230 can be easily formed by a casting process. Specifically, the water jacket 230 includes a pair of flow path portions 230a having a longitudinally elongate narrow cross section bending along the outside of the intercylinder gas channels 72 and a flow path portion 230b having a transversely elongate narrow cross section passing below the branched exhaust channels 71 at about the middle of the upstream portion 70b of the exhaust manifold along the cylinder bank to interconnect the flow path portions 230a on both sides.

The water jacket 230 has a cooling water inlet 231 provided at one end of the upstream portion 70b of the exhaust manifold and a cooling water outlet 232 provided at the other end of the upstream portion 70b of the exhaust manifold, the cooling water inlet 231 being connected to the cooling water outlet 232 by the flow path portion 230a. The cooling water inlet 231 is connected to an electrically-driven auxiliary water pump 250. Designated by the numeral 233 in FIGS. 26 and 27 are plugs filling holes formed by core supports in the casting process.

Figure 28:
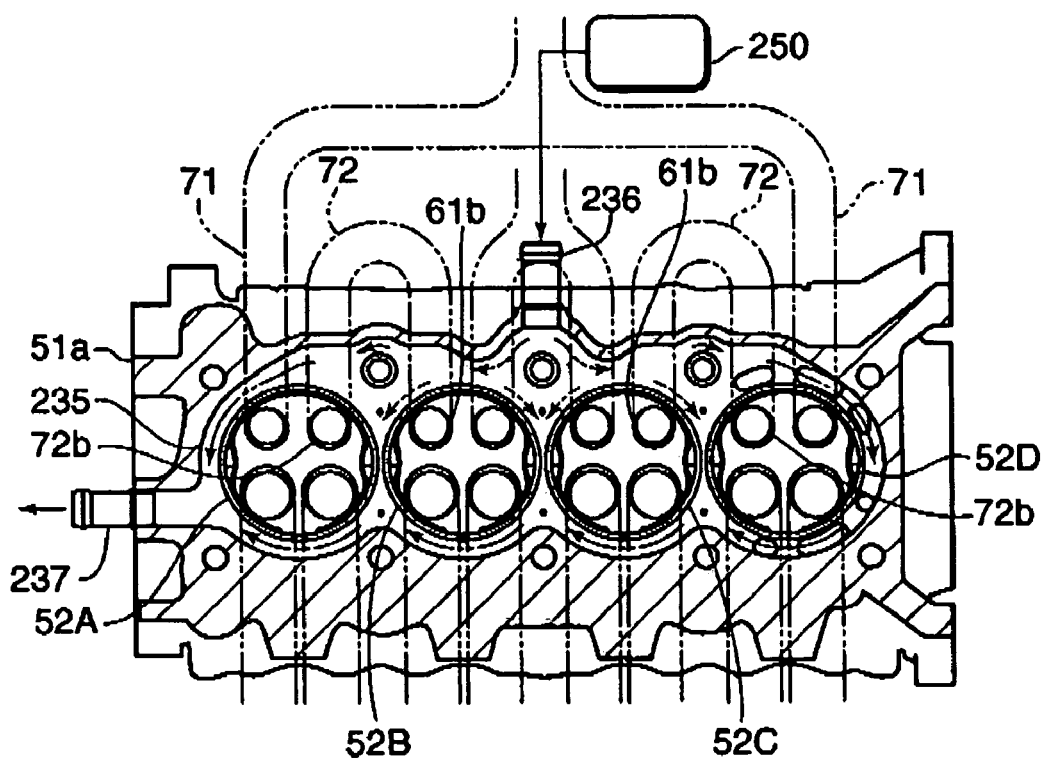
FIG. 28 is a cross-sectional plan view showing the construction of a water jacket forming portion of a cylinder head.
Figure 29:
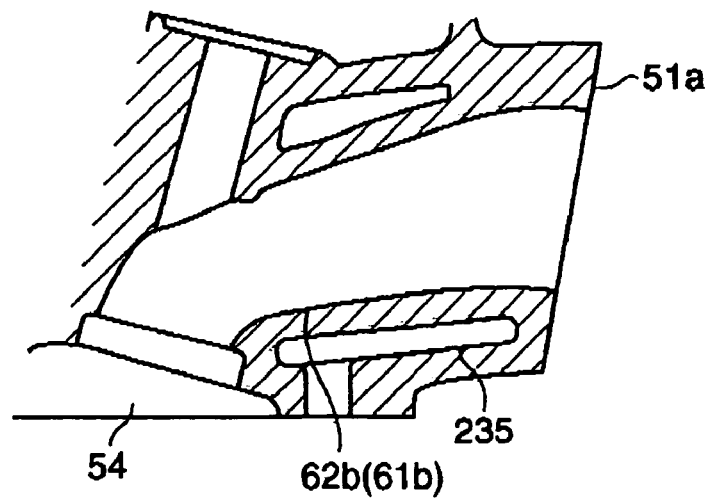
FIG. 29 is an enlarged fragmentary cross-sectional view of the water jacket forming portion of the cylinder head.

FIGS. 28 and 29 show the construction of a water jacket forming portion of the cylinder head 51a. Referring to these Figures, the second exhaust ports 62b of the preceding cylinders 52A, 52D and the second intake ports 61b of the following cylinders 52B, 52C are formed in the cylinder head 51a in such a manner that one end of each of these ports 61b, 62b opens into the combustion chamber 54 while the other end of each of the ports 61b, 62b reaches an outer side surface of the cylinder head 51a and connects to the relevant intercylinder gas channel 72, forming part of the intercylinder gas channel 72. A water jacket 235 is formed in the cylinder head 51a in such a way that the cooling water is circulated around the second exhaust ports 62b and the second intake ports 61b. Specifically, the water jacket 235 is formed around the cylinder bank. In particular, since fluid channels of the water jacket 235 broaden near the ports 61b, 62b which form part of the intercylinder gas channels 72, sufficient quantities of cooling water can be circulated around those ports 61b, 62b.

To further enhance the effect of cooling the cooling water passing through the intercylinder gas channels 72, there is formed another cooling water inlet 236 connecting to the water jacket 235 at a position on a exhaust manifold side close to the ports 61b, 62b which form part of the intercylinder gas channels 72. With this arrangement, relatively low-temperature cooling water introduced through the cooling water inlet 236 can be quickly led to surrounding areas of the ports 61b, 62b. The cooling water inlet 236 is also connected to the electrically-driven auxiliary water pump 250. The cooling water introduced through the cooling water inlet 236 is let out through a cooling water outlet 237 formed at one end of the cylinder head 51a along the cylinder bank.

Figure 30:
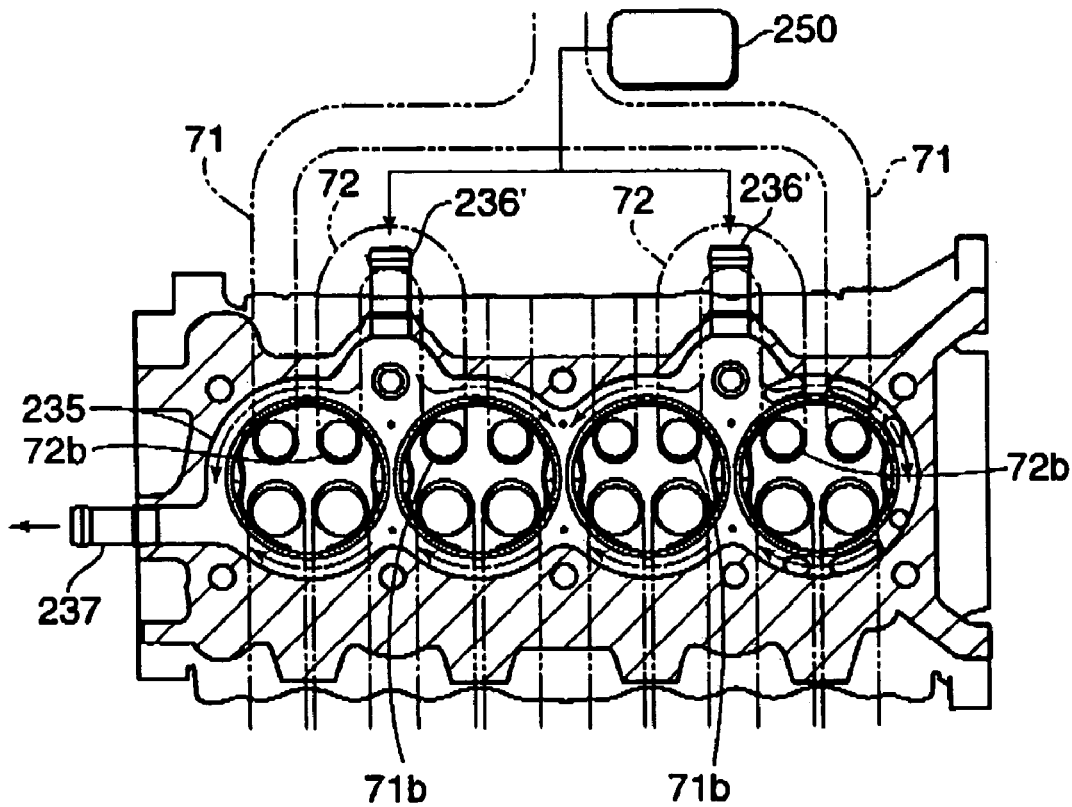
FIG. 30 is a cross-sectional plan view showing the construction of another example of a water jacket forming portion formed in the cylinder head.
Figure 31:
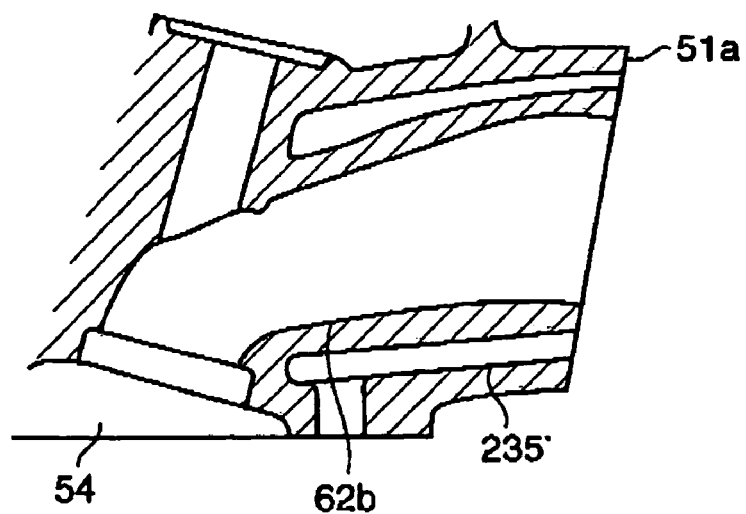
FIG. 31 is an enlarged fragmentary cross-sectional view showing the construction of still another example of a water jacket forming portion formed in the cylinder head.

While the cooling water inlet 236 is located at a position at about the middle of the water jacket 235 along the cylinder bank on the exhaust manifold side in the example shown in FIG. 28, a pair of cooling water inlets 236' may be formed at positions closer to the two intercylinder gas channels 72 instead of the single cooling water inlet 236 as shown in FIG. 30. While the water jacket 235 is formed such that its fluid channels extend up to the proximity of side ends of the cylinder head 51a in the surrounding areas of the ports 61b, 62b which form part of the intercylinder gas channels 72 in the examples of FIGS. 28 and 30, there may be formed a water jacket 235' opening to a side surface of the cylinder head 51a facing the exhaust manifold as shown in FIG. 31, the water jacket 235' connecting to the water jacket 230 formed in the upstream portion 70b of the exhaust manifold.

Figure 32:
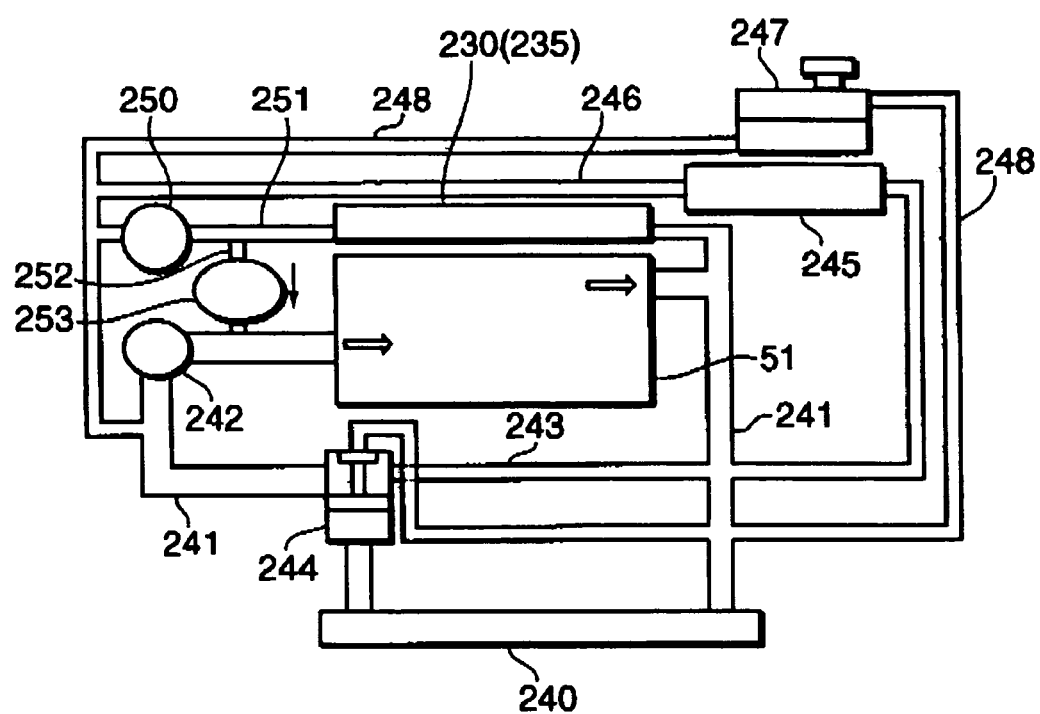
FIG. 32 is a schematic diagram showing the general configuration of an engine cooling system.

FIG. 32 is a schematic diagram showing the general configuration of an engine cooling system. As shown in this Figure, there is formed a cooling water passage 241 for circulating the cooling water between the engine body 51 and a radiator 240 and a main water pump 242 and a thermostat 244 are disposed in the cooling water passage 241. A bypass channel 243 branching out from the thermostat 244 is connected to the thermostat 244, bypassing the radiator 240. Further, there are provided a channel 246 for conducting the cooling water to a heater 245 and a channel 248 connecting to a sub-tank 247 in the engine cooling system. The main water pump 242 is a mechanically-driven pump which is driven by an engine output shaft through a transmission mechanism.

While the aforementioned configuration is conventional, the engine cooling system of this embodiment further includes the aforementioned auxiliary water pump (electric pump) 250 and a channel 251 for conducting the cooling water supplied by the auxiliary water pump 250 to the water jacket 230 formed in the upstream portion 70b of the exhaust manifold and to the water jacket 235 formed in the surrounding areas of the ports 61b, 62b in the cylinder head 51a. The engine cooling system further includes a channel 252 branching out from the channel 251 at a point downstream of the auxiliary water pump 250 and connected to the cooling water passage 241 at a point downstream of the EGR valve 24 such that part of the cooling water supplied by the auxiliary water pump 250 can be added to the cooling water supplied by the main water pump 242 as necessary and supplied to the water jacket 235 for cooling the cylinders 52A–52D of the engine body 51, as well as a control valve 253 disposed in the channel 252.

Figure 33:
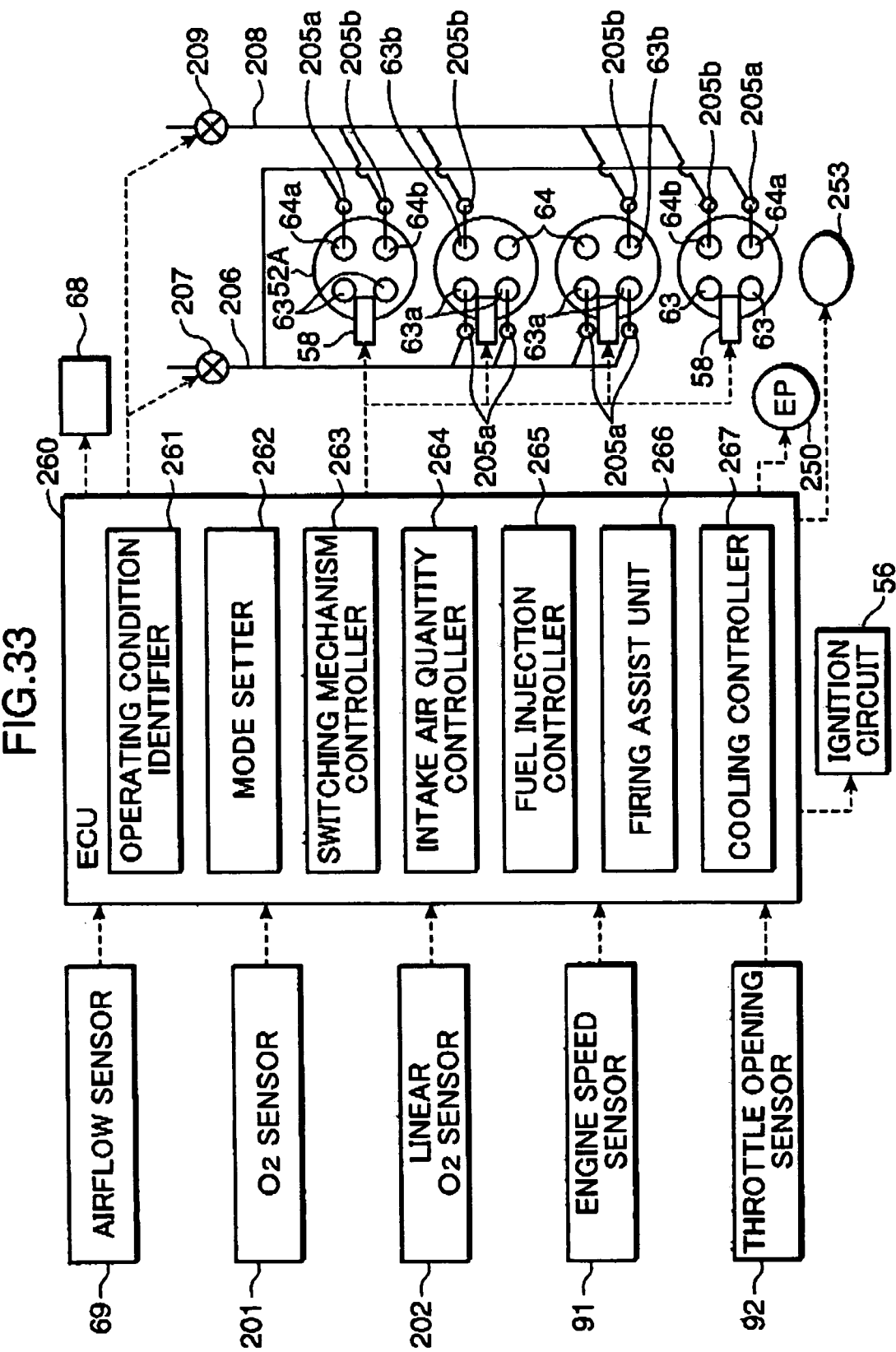
FIG. 33 is a block diagram of a control system of the engine of the fourth embodiment.

FIG. 33 shows the construction of a drive/control system of the engine of the fourth embodiment. As shown in this Figure, a first control valve 207 is provided in the previously-mentioned fluid channel 206 for supplying and withdrawing the hydraulic oil to and from the first switching mechanisms 205a of the first exhaust valves 64a and those of the first intake valves 63a, while a second control valve 209 is provided in the previously-mentioned fluid channel 208 for supplying and withdrawing the hydraulic oil to and from the second switching mechanisms 205b of the second exhaust valves 64b and those of the second intake valves 63b.

Referring to FIG. 33, signals output from the airflow sensor 69, the $O_2$ sensor 200 and the linear $O_2$ sensors 202 are input into an ECU 260 for controlling the engine. Also input into the ECU 260 are signals output from the engine speed sensor 91 for detecting engine speed used for judging operating condition of the engine and the throttle opening sensor 92 for detecting throttle opening (the amount of depression of an accelerator). On the other hand, the ECU 260 outputs control signals to the individual fuel injectors 58, the actuator 68 of the multiple throttle valves 67, the first and second control valves 207, 208, as well as to the electrically-driven auxiliary water pump 250 and the control valve 253.

The ECU 260 includes an operating condition identifier 261, a mode setter 262, a switching mechanism controller 263, an intake air quantity controller 264, a fuel injection controller 265, a firing assist unit 266 and a cooling controller 267.

Like the operating condition identifier 81 of the third embodiment shown in FIG. 15, the operating condition identifier 261 judges in which operating range the engine is currently operated using the same map for engine control as shown in FIG. 16.

Based on the result of judgment made by the operating condition identifier 261, the mode setter 262 selects the special operation mode in the part-load operating range C in which the burned gas discharged from the preceding cylinders 52A, 52D which are currently in the exhaust stroke is introduced directly into the following cylinders 52B, 52C which are currently in the intake stroke and burned therein, whereas the mode setter 262 selects the normal operation mode in the full-load operating range D to combust the mixture in the individual cylinders 52A–52D independently of one another.

The switching mechanism controller 263 controls the first and second switching mechanisms 205a, 205b and the aforementioned intake and exhaust valves 63a, 63b, 64a, 64b as follows by controlling the control valves 207, 209 depending on whether the engine operating condition falls in the operating range C or D.

Operating range C (special operation mode):
A hydraulic pressure is supplied to the first and second switching mechanisms 205a, 205b. The first exhaust valves 64a and the first intake valves 63a are set to the deactivated state while the second exhaust valves 64b and the second intake valves 63b are set to the activated state.

Operating range D (normal operation mode):
The supply of the hydraulic pressure to the first and second switching mechanisms 205a, 205b is interrupted. The first exhaust valves 64a and the first intake valves 63a are set to the activated state while the second exhaust valves 64b and the second intake valves 63b are set to the deactivated state.

The intake air quantity controller 264 and the fuel injection controller 265 perform generally the same control operations as the intake air quantity controller 83 and the fuel injection controller 84 of the third embodiment (refer to FIG. 15). In the special operation modes, the amount of injected fuel is so controlled as to produce an air-fuel ratio substantially equal to the stoichiometric air-fuel ratio at the time of combustion in the following cylinders 52B, 52C.

The firing assist unit 266 also performs generally the same control operation as the firing assist unit 87 of the third embodiment (refer to FIG. 15). The firing assist unit 266 performs the firing assist operation with the aid of ignition near the top dead center in the compression stroke when the engine is in the low-load, low-speed subrange C1 within the part-load operating range C or in the high-load, high-speed subrange C3 within the operating range C in which the compression ignition is produced.

The cooling controller 267 serves as an anti-knock unit for preventing knocking of the following cylinders 52B, 52C in the high-load, high-speed subrange C3 within the part-load operating range C in which the engine is controlled in the special operation mode. Specifically, the cooling controller 267 activates the auxiliary water pump 250 provided in the engine cooling system to supply the cooling water into the water jacket 230 formed in the upstream portion 70b of the exhaust manifold and into the water jacket 235 formed in the surrounding areas of the ports 61b, 62b in the cylinder head 51a, whereby the cooling controller 267 performs a control operation for cooling the burned gas down to a temperature capable of preventing knocking of the following cylinders 52B, 52C without jeopardizing the aforementioned function of the firing assist unit 266 to accelerate the compression ignition in the following cylinders 52B, 52C.

The aforementioned control device of the fourth embodiment performs the same advantageous effects as that of the third embodiment. Specifically, the special operation mode is selected in the part-load operating range C in which the mixture is combusted under extremely lean conditions in the preceding cylinders 52A, 52D, and the mixture is combusted by the compression ignition in the following cylinders 52B, 52C, so that fuel economy and the quality of engine emissions are significantly improved. On the other hand, the normal operation mode is selected in the operating range D on the high-load, high-speed side to ensure satisfactory engine output performance.

With the control device of the embodiment, it is possible to properly produce the compression ignition in the following cylinders 52B, 52C while effectively preventing the occurrence of knocking of the following cylinders 52B, 52C. This is because the air-fuel ratio in the preceding cylinders 52A, 52D is made approximately equal to twice or higher than the stoichiometric air-fuel ratio in the low-load, low-speed subrange C1 within the part-load operating range C in which combustion is made in the special operation mode and the mixture in the following cylinders 52B, 52C is fired before the top dead center in the compression stroke with the aid of the firing assist unit 266 to accelerate the compression ignition in the following cylinders 52B, 52C.

More specifically, when the air-fuel ratio in the preceding cylinders 52A, 52D is made approximately equal to twice or higher than the stoichiometric air-fuel ratio in the low-load, low-speed subrange C1, in which the total amount of injected fuel is small, to produce an effect of improving the fuel economy by lean burn operation as stated above, it is possible to effectively prevent the occurrence of knocking of the following cylinders 52B, 52C by preventing the temperature of the burned gas introduced into the following cylinders 52B, 52C from becoming excessively high. On the other hand, there is a tendency for the compression ignition to become difficult if no countermeasures are employed, because the temperature of the burned gas introduced into the following cylinders 52B, 52C is decreased. However, since the pressure around the spark plugs 55 is rapidly increased by firing the mixture in the following cylinders 52B, 52C immediately before the top dead center in the compression stroke as stated above with the aid of the firing assist unit 266, it is possible to produce the compression ignition at a proper point in time following the firing of the mixture.

Figure 34:
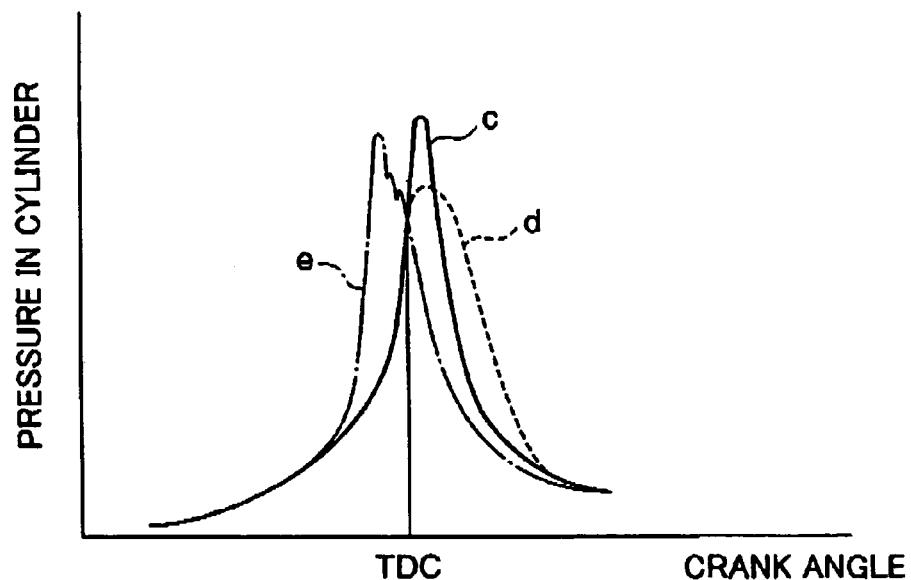
FIG. 34 is a diagram showing the relation between crank angle and pressure in cylinders of the engine.

It is possible to rapidly increase the pressure in the following cylinders 52B, 52C as shown by a solid line c in FIG. 34 when the mixture in the following cylinders 52B, 52C is rapidly combusted in the entire combustion chamber 54 of each of the following cylinders 52B, 52C by performing the firing assist operation in the low-load, low-speed subrange C1 within the part-load operating range C to accelerate the compression ignition in the following cylinders 52B, 52C. By comparison, in an ordinary engine in which the mixture is forcibly ignited by spark plugs under conditions where low-temperature fresh air or a small amount of exhaust gas is recirculated as EGR gas from an exhaust passage into an intake passage without making combustion in the aforementioned special operation mode, the mixture is combusted so slowly that a large proportion of energy produced by combustion inevitably becomes useless without producing effective work. According to this embodiment, the mixture is combusted by the compression ignition in the following cylinders 52B, 52C by performing the firing assist operation in the low-load, low-speed subrange C1 within the part-load operating range C in which combustion is made in the special operation mode, so that the fuel economy can be efficiently improved. In addition, it is possible to prevent reaction between oxygen and nitrogen in the following cylinders 52B, 52C in a best possible manner and, as a consequence, NOx emissions can be sufficiently suppressed.

Particularly when the engine is so constructed as to accelerate the compression ignition by firing the mixture immediately before the top dead center in the compression stroke in the following cylinders 52B, 52C with the aid of the firing assist unit 266 made of a spark ignition controller in the low-load, low-speed subrange C1 within the part-load operating range C in which combustion is made in the special operation mode, there are such advantages that the fuel economy can be improved by producing the compression ignition in the following cylinders 52B, 52C with proper timing in a reliable fashion and that NOx emissions can be sufficiently suppressed.

According to the embodiment, the air-fuel ratio in the following cylinders 52B, 52C is made approximately equal to the stoichiometric air-fuel ratio in the special operation mode and only such exhaust gases that are produced by combustion at the stoichiometric air-fuel ratio are discharged from the following cylinders 52B, 52C into the exhaust passage 70. It is therefore possible to attain sufficient exhaust gas converting performance with only the three-way catalyst 201 without the need for a lean NOx catalyst in the exhaust passage 70. As it is not necessary to provide the lean NOx catalyst, there is no need to temporarily lower the air-fuel ratio for release and reduction of NOx when the amount of NOx adsorbed by the lean NOx catalyst has increased, whereby a decrease in fuel economy improvement effect can be avoided. The embodiment is also advantageous in that it makes it possible to avoid a problem that the lean NOx catalyst becomes poisonous as a result of sulfurization.

Furthermore, if the engine is so constructed as to produce stratified charge combustion in the preceding cylinders 52A, 52D in the aforementioned firing assist range (i.e., the low-load, low-speed subrange C1 within the part-load operating range C) in which the compression ignition in the following cylinders 52B, 52C is induced (accelerated) by the firing assist unit 266 as in the present embodiment, it is possible to attain a significant fuel economy improvement effect by producing combustion with an extremely lean mixture of which air-fuel ratio is approximately equal to or higher than three times the stoichiometric air-fuel ratio, for example, in the following cylinders 52B, 52C. Moreover, even when the air-fuel ratio in the preceding cylinders 52A, 52D is set to an extremely high value to produce an extremely lean mixture in the low-load, low-speed subrange C1 and the temperature of the burned gas introduced into the following cylinders 52B, 52C has greatly decreased, the firing assist unit 266 performs the control operation for producing the compression ignition with proper timing in the following cylinders 52B, 52C by inducing the compression ignition therein. Therefore, the aforementioned arrangement of the embodiment offers such advantages that the fuel economy can be effectively improved and NOx emissions can be sufficiently suppressed.

The control device of this embodiment may be so constructed as to make the air-fuel ratio in the preceding cylinders 52A, 52D approximately equal to twice or higher than the stoichiometric air-fuel ratio from idling operation and accelerate the compression ignition with the aid of the firing assist unit 266 when the engine is warm. If the control device is so constructed, the control device performs a control operation in the aforementioned special operation mode from engine idle when the engine is warm. Consequently, it is possible to effectively prevent the occurrence of knocking of the following cylinders 52B, 52C by preventing the temperature of the burned gas introduced into the following cylinders 52B, 52C from becoming excessively high while ensuring that the fuel economy improvement effect is obtained as a result of an improvement in thermal efficiency achieved by the lean burn operation and a reduction in pumping loss in the individual preceding cylinders 52A, 52D. Also, the control device of the embodiment makes it possible to properly a control operation for inducing the compression ignition in the following cylinders 52B, 52C with the aid of the firing assist unit 266.

Furthermore, if the control device is so constructed as to prevent knocking of the following cylinders 52B, 52C by means of the anti-knock unit formed essentially of the cooling controller 267 and to accelerate the compression ignition in the following cylinders 52B, 52C with the aid of the firing assist unit 266 in the high-load, high-speed subrange C3 beyond a medium-load, medium-speed C2 within the part-load operating range C of the engine as shown in the aforementioned fourth embodiment, it is possible to widen to range in which the compression ignition can be produced in the following cylinders 52B, 52C while avoiding the occurrence of knocking of the following cylinders 52B, 52C to the high-load, high-speed subrange C3 within the part-load operating range C. This makes it possible to further improve the fuel economy in an efficient manner More specifically, since the burned gas of an appropriate temperature introduced from the preceding cylinders 52A, 52D into the following cylinders 52B, 52C in the medium-load, medium-speed C2 within the part-load operating range C, it is possible to increase the pressure in the following cylinders 52B, 52C by producing the compression ignition therein immediately after the top dead center TDC in the compression stroke without inducing the compression ignition by the firing assist unit 266. In the high-load, high-speed subrange C3 within the part-load operating range C, on the other hand, there is a tendency for knocking to occur more easily as the mixture in the following cylinders 52B, 52C is fired by the compression ignition before the top dead center in the compression stroke as shown by an alternate long and two short dashed line e in FIG. 34, for instance, because the temperature of the burned gas introduced into the following cylinders 52B, 52C is so high in the high-load, high-speed subrange C3.

Therefore, when the engine is in the high-load, high-speed subrange C3 within the part-load operating range C, the cooling controller 267 performs the control operation for cooling the burned gas introduced from the preceding cylinders 52A, 52D into the following cylinders 52B, 52C through the intercylinder gas channels 72 by supplying the cooling water from the auxiliary water pump 250 to the water jacket 230 formed around the intercylinder gas channels 72 and to the water jacket 235 formed in the cylinder head 51a. Due to this control operation of the cooling controller 267, the firing assist unit 266 can properly perform the compression ignition for inducing the compression ignition in the following cylinders 52B, 52C while effectively preventing the occurrence of knocking of the following cylinders 52B, 52C caused by an excessive increase of the temperature of the burned gas introduced into the following cylinders 52B, 52C. It is therefore possible to fire the mixture in the following cylinders 52B, 52C by the compression ignition at an appropriate point in time near the top dead center in the compression stroke as shown by the solid line c in FIG. 34.

Instead of the aforementioned anti-knock unit of the embodiment which prevents knocking of the following cylinders 52B, 52C by properly cooling the burned gas introduced from the preceding cylinders 52A, 52D into the following cylinders 52B, 52C through the intercylinder gas channels 72 when the engine is in the high-load, high-speed subrange C3 within the part-load operating range C, there may be provided a different type of anti-knock unit which prevents knocking by reducing the effective compression ratio.

Figure 35:
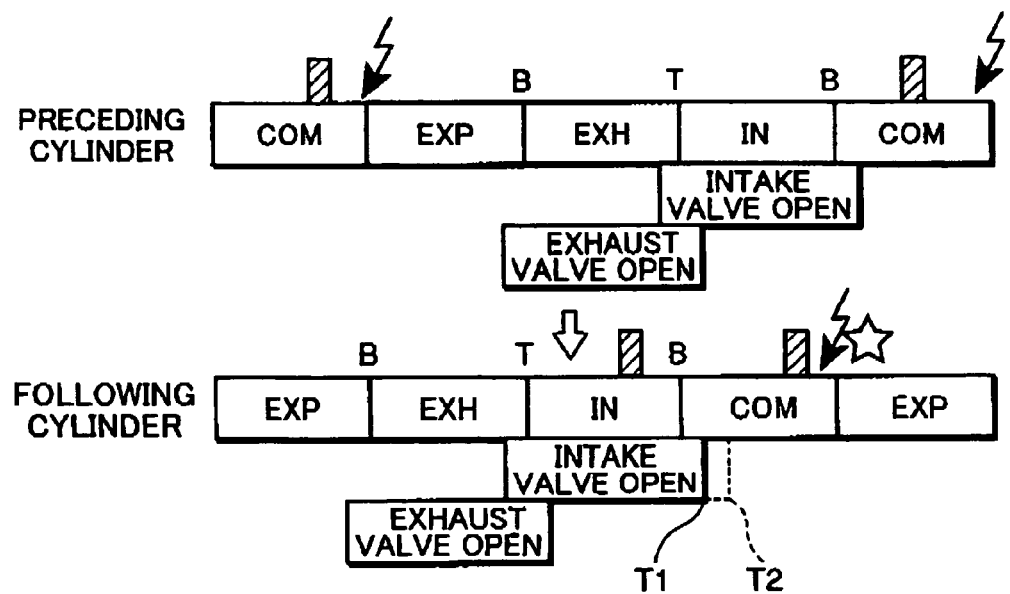
FIG. 35 is an explanatory diagram showing how a period of introducing burned gas into following cylinders is varied.

Specifically, the aforementioned alternative anti-knock unit is constructed such that it selectively uses multiple cams provided on the camshafts 204a, 204b in such a manner that closing time T of each second intake valve 63b through which the burned gas is introduced via the intercylinder gas channels 72 into the following cylinders 52B, 52C is set to a point in time T1 immediately after a bottom dead center B as shown by solid lines in FIG. 35 in a normal range including the low-load, low-speed subrange C1 and to a point in time T2 retarded from the point in time T1 for the aforesaid normal range as shown by broken lines in FIG. 35 in the high-load, high-speed subrange C3, for example. With this alternative arrangement, the mixture in the following cylinders 52B, 52C is led into the intercylinder gas channels 72 as the piston 53 in each of these cylinders 52B, 52C goes beyond the bottom dead center B and ascends in the high-load, high-speed subrange C3, so that the effective compression ratio of the following cylinders 52B, 52C is reduced and the occurrence of knocking therein is effectively suppressed. Instead of providing the aforementioned cam mechanism, there may be provided an electromagnetic valve actuating mechanism including solenoid actuators for opening and closing the second intake valves 63b such that their closing time T to varied by controlling operation of the valve actuating mechanism with the anti-knock unit.

The fourth embodiment may be modified in such a way that the fuel to be supplied to the following cylinders 52B, 52C is injected at multiple points in the intake and compression strokes and the ratio of the amount of fuel injected in the compression stroke is increased as the engine speed and/or the engine load increases when the engine is in the high-load, high-speed subrange C3 within the part-load operating range C (refer to FIG. 35). If the engine is so constructed, the temperature in the following cylinders 52B, 52C decreases as the fuel injected thereinto in a final part of the compression stroke of the cylinders 52B, 52C evaporates and activation of the mixture formed in the following cylinders 52B, 52C is accelerated, so that the occurrence of knocking of the following cylinders 52B, 52C can be effectively suppressed. This arrangement is advantageous in that the part-load operating range C in which operation for controlling combustion in the special operation mode is performed can be broadened to a higher-load, higher-speed side.

Furthermore, the ECU 260 used in the control device of the present embodiment for the spark-ignition engine may further include an octane rating identifier for determining the octane number of the currently used fuel based on the crank angle of a maximum combustion pressure detected by means of ion current sensors for detecting the value of an ion current flowing in each combustion chamber 54, pressure sensors for detecting the pressure in each combustion chamber 54 or a knock sensor including a piezoelectric element for detecting vibrations produced at the occurrence of knocking, as well as on the severity of knocking or existence or non-existence of misfire, for instance. With this arrangement, the larger the octane number of the fuel determined by the octane rating identifier, the more the low-load, low-speed subrange (firing assist subrange) C1 in which the firing assist unit 266 accelerates the compression ignition in the following cylinders 52B, 52C can be broadened to the higher-load, higher-speed side of the part-load operating range C.

According to the aforementioned arrangement, the firing assist subrange C1 in which the firing assist unit 266 accelerates the compression ignition in the following cylinders 52B, 52C is broadened to a range on the higher-load, higher-speed side of the part-load operating range C and the firing assist unit 266 performs the control operation for inducing the compression ignition in the following cylinders 52B, 52C in this broadened range as well. Accordingly, the aforementioned modified form of the embodiment is advantageous in that it produces a significant effect of improving the fuel economy and suppressing NOx emissions while preventing knocking of the following cylinders 52B, 52C when the fuel used is of a type which would not easily cause the compression ignition or knocking (e.g., high-octane fuel).

While the fuel injectors 58 for supplying the fuel to the preceding cylinders 52A, 52D and the following cylinders 52B, 52C are of a direct injection type that inject the fuel directly into their combustion chambers 54 in the aforementioned fourth embodiment, the fuel injectors for the following cylinders 52B, 52C are not necessarily limited to the direct injection type. As an example, the fourth embodiment may be modified in such a way that fuel injectors for the following cylinders 52B, 52C are disposed in the intake ports 61a and in the intercylinder gas channels 72, and the fuel injectors disposed in the intake ports 61a are activated in the normal operation mode while the fuel injectors disposed in the intercylinder gas channels 72 are activated in the special operation mode.

Also, although the exhaust manifold is formed in two separate parts, that is, the upstream portion 70b including the intercylinder gas channels 72 and the main portion 70a in the aforementioned embodiment, the exhaust manifold may be formed as a single structure including these two parts. Furthermore, although most parts of the intercylinder gas channels 72 are formed within the exhaust manifold in the aforementioned embodiment, the embodiment may be modified in such a way that the entirety of the intercylinder gas channels is formed in the cylinder head and water jackets are formed around the intercylinder gas channels formed in the cylinder head.

The control device of the fourth embodiment is applicable not only to four-cylinder engines but also to other types of multicylinder engines as well. In a six-cylinder engine, for example, the exhaust stroke of one cylinder does not perfectly coincide in timing with the intake stroke of another cylinder. In such a case, each pair of preceding and following cylinders should be such that the exhaust stroke of one cylinder precedes and coincides in part with the intake stroke of the other cylinder.

Fifth Embodiment

A spark-ignition engine incorporating a control device according to a fifth embodiment of the invention is now described referring to FIGS. 36 to 42. The engine of the fifth embodiment has generally the same construction as the above-described fourth embodiment with respect to the engine body, intake and exhaust systems and valve actuating mechanisms. Accordingly, FIGS. 20 and 21 should be referred to for the construction of those elements as they are not described in detail here.

Figure 36:
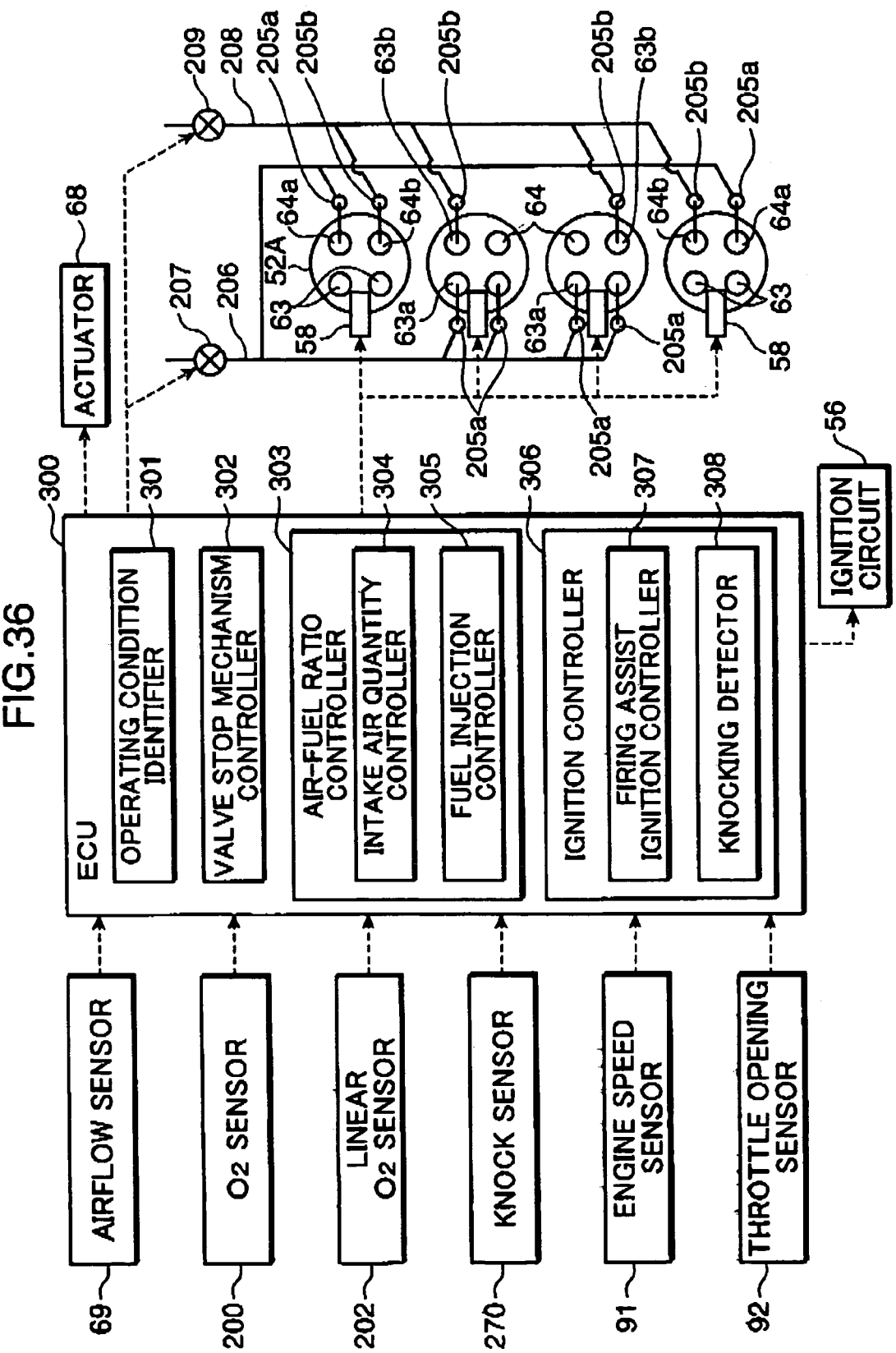
FIG. 36 is a block diagram of a control system of an engine according to a fifth embodiment of the invention.

FIG. 36 is a block diagram of the control system of the fifth embodiment of the invention. Referring to this Figure, signals output from an airflow sensor 69, an $O_2$ sensor 200, a linear $O_2$ sensor 202, a knock sensor 270, an engine speed sensor 91 and a throttle opening sensor 92 are input into an ECU 300 for controlling the engine. The knock sensor 270 made essentially of a piezoelectric element is mounted on the engine body 51 to detect vibrations produced at the occurrence of knocking. On the other hand, the ECU 300 outputs control signals to an ignition circuit 56, individual fuel injectors 58, an actuator 68 of multiple throttle valves 67 as well as to first and second control valves 207, 209.

The ECU 300 includes an operating condition identifier 301, a valve stop mechanism controller 302, an air-fuel ratio controller 303 and an ignition controller 306.

Figure 37:
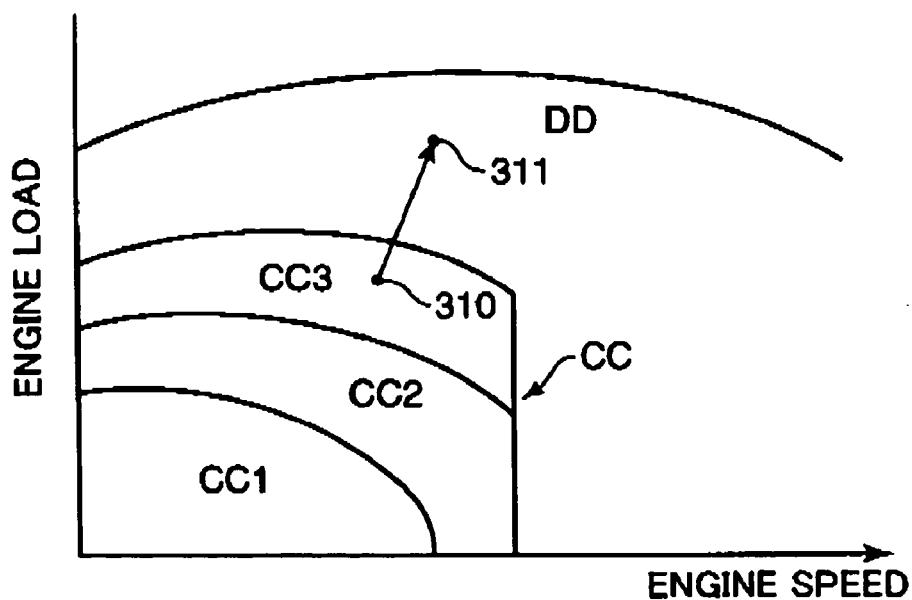
FIG. 37 is an explanatory diagram showing a map of different operating ranges of the engine according to the fifth embodiment.

The operating condition identifier 301 has a map used for engine control as shown in FIG. 37, in which the symbol "CC" represents an engine operating range on a low-load, low-speed side and the symbol "DD" represents an engine operating range on a high-load, high-speed side in mostly the same fashion as shown in FIG. 16. The operating condition identifier 301 examines the operating condition of the engine (engine speed and load) based on the signals fed from the engine speed sensor 91 and the throttle opening sensor 92 and judges whether the engine operating condition falls in the operating range CC or in the operating range DD.

Based on the result of this judgment, the operating condition identifier 301 selects the special operation mode in the operating range CC on the low-load, low-speed side in which the burned gas discharged from the preceding cylinders 52A, 52D which are currently in the exhaust stroke is introduced directly into the respective following cylinders 52B, 52C which are currently in the intake stroke and burned therein, whereas the operating condition identifier 301 selects the normal operation mode in the operating range DD on the high-load, high-speed side to combust the mixture in the individual cylinders 52A–52D independently of one another.

The aforementioned special operation mode range CC is divided into three subranges. These are a lower-load operating subrange CC1, a medium-load operating subrange CC2 and a higher-load operating subrange CC3 within the operating range CC. When the engine is judged to be in the special operation mode range CC, the operating condition identifier 301 further judges in which one of these subrange CC1, CC2, CC3 the engine is currently operated.

The valve stop mechanism controller 302 performs the same control operation as the switching mechanism controller 82 of the third embodiment (refer to FIG. 15).

The air-fuel ratio controller 303 including an intake air quantity controller 304 and a fuel injection controller 305 serves to properly set the air-fuel ratio in the individual cylinders 52A–52D according to the operation mode and operating conditions of the engine.

The intake air quantity controller 304 is for controlling the opening of each throttle valve 67 (throttle opening) by controlling the actuator 68. The intake air quantity controller 83 determines a target intake air quantity from a map, for instance, based on the engine operating condition and controls the throttle opening according to the target intake air quantity obtained.

Figure 38:
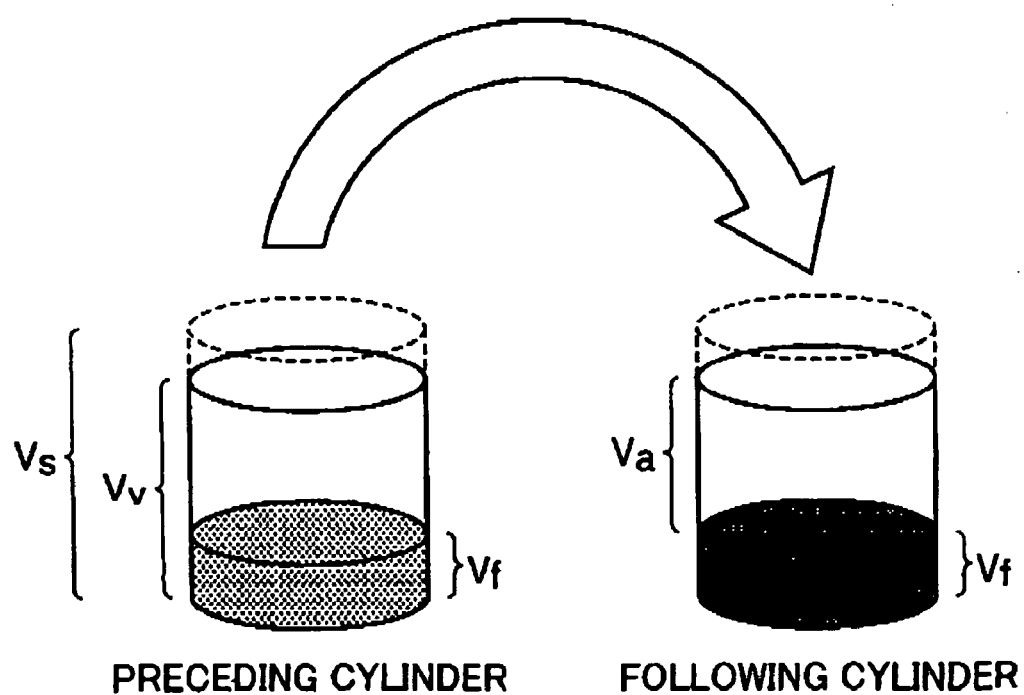
FIG. 38 is an explanatory diagram showing a relationship among a total fresh intake air quantity, a consumed fresh air quantity and a residual fresh air quantity.

Specifically, the intake air quantity controller 304 controls the engine in such a way that a specific amount of fresh air (fresh intake air) is introduced into the cylinders 52A–52D by controlling the throttle opening according to the engine operating condition. In the operating range CC in which the special operation mode is selected, the aforementioned amount of fresh air, or total fresh intake air quantity Vv, is the sum of the amount of fresh intake air (consumed fresh air quantity Vf) consumed for combustion in the preceding cylinders 52A, 52D and the amount of fresh intake air (residual fresh air quantity Va) consumed for combustion in the following cylinders 52B, 52C, the total fresh intake air quantity Vv being defined within stroke volume (a volume displaced by one stroke) Vs of each of the cylinders 52A–52D as illustrated in FIG. 38. This relationship is expressed by an equation (total fresh intake air quantity Vv)=(consumed fresh air quantity Vf) +(residual fresh air quantity Va). The total fresh intake air quantity Vv is set such that it produces the stoichiometric air-fuel ratio with the total amount of fuel injected into two (one of the preceding cylinders and one of the following cylinders, i.e. either 52A & 52B or 52D & 52C) of the preceding cylinders 52A, 52D and the following cylinders 52B, 52C. The total fresh intake air quantity Vv thus set is the quantity of fresh intake air necessary for burning the amount of fuel corresponding to a required engine output so that the total fresh intake air quantity Vv increases with an increase in engine load.

The fuel injection controller 305 controls the amounts of fuel to be injected from the fuel injectors 58 provided in the individual cylinders 52A–52D as well as fuel injection timing according to the engine operating condition. Specifically, the fuel injection controller 305 regulates the total amount of fuel injected into the two (one of the preceding cylinders and one of the following cylinders, i.e., either 52A & 52B or 52D & 52C) of preceding cylinders 52A, 52D and the following cylinders 52B, 52C such that the total amount of injected fuel would increase with an increase in engine load in the special operation mode. At the same time, the fuel injection controller 305 regulates the total amount of fuel injected into the two pairs of cylinders 52A, 52D and cylinders 52B, 52C in such a way that this total amount of injected fuel would produce the stoichiometric air-fuel ratio with the amount of intake air introduced into the preceding cylinders 52A, 52D, and controls the proportions of the amounts of fuel burned in the preceding cylinders 52A, 52D and the following cylinders 52B, 52C by properly distributing the total amount of fuel injected into the individual cylinders 52A–52D and thereby adjusting the amounts of fuel injected into the preceding cylinders 52A, 52D. This means that the fuel injection controller 305 regulates the amount of fresh intake air consumed in the preceding cylinders 52A, 52D by controlling the amount of fuel injected into the preceding cylinders 52A, 52D to thereby control the amount of fresh intake air (residual fresh air quantity Va) left in the burned gas introduced from the preceding cylinders 52A, 52D into the following cylinders 52B, 52C. In this embodiment, the amount of fresh air is expressed in terms of volume under standard atmospheric conditions, that is, the value obtained by dividing the weight of fresh air by the density of air under normal conditions.

The fuel injection controller 305 sets the air-fuel ratio in the preceding cylinders 52A, 52D in such a way that it becomes gradually high to produce a richer mixture as the engine load increases. More specifically, the fuel injection controller 305 sets the air-fuel ratio in the preceding cylinders 52A, 52D to produce an extremely lean mixture having an air-fuel ratio considerably higher than the stoichiometric air-fuel ratio, preferably approximately equal to or higher than three times the stoichiometric air-fuel ratio (i.e., air-fuel ratio A/F≈45, excess-air factor λ≈3), when the engine is judged to be in the lower-load operating subrange CC1. When the engine is judged to be in the medium-load operating subrange CC2, the fuel injection controller 305 sets the air-fuel ratio in the preceding cylinders 52A, 52D to produce a mixture richer than when the engine is in the lower-load operating subrange CC1, the air-fuel ratio preferably falling within a range of approximately twice to three times as high as the stoichiometric air-fuel ratio (i.e., air-fuel ratio A/F~30 to 45, excess-air factor λ~2 to 3). When the engine is judged to be in the higher-load operating subrange CC3, the fuel injection controller 305 sets the air-fuel ratio in the preceding cylinders 52A, 52D to produce a mixture richer than when the engine is in the medium-load operating subrange CC2, the air-fuel ratio preferably being smaller than approximately twice the stoichiometric air-fuel ratio (i.e., air-fuel ratio A/F~30, excess-air factor λ~2).

Enrichment of the mixture in the preceding cylinders 52A, 52D is achieved by increasing the ratio of the fresh air quantity Vf consumed in the preceding cylinders 52A, 52D to the total fresh intake air quantity Vv. Doing so is also equivalent to increasing the ratio of inert gases introduced into the following cylinders 52B, 52C (or increasing the EGR ratio). As there is the aforementioned relationship expressed by the equation (total fresh intake air quantity Vv)=(consumed fresh air quantity Vf)+(residual fresh air quantity Va), the proportion of the consumed fresh air quantity Vf increases and the proportion of the residual fresh air quantity Va decreases when the air-fuel ratio in the preceding cylinders 52A, 52D is increased. In this embodiment, an internal EGR ratio of the following cylinders 52B, 52C is set to a value equal to the ratio of the consumed fresh air quantity Vf to the residual fresh air quantity Va in the special operation mode. It follows that there is established a relationship expressed by an equation (internal EGR ratio of following cylinders)=(fresh air quantity Vf consumed in preceding cylinders)/(residual fresh air quantity Va)×100. Using the excess-air factor λ, the equation expressing this relationship is rewritten as (internal EGR ratio of following cylinders)=1/((excess-air factor λ of preceding cylinders) −1)×100.

Figure 39:
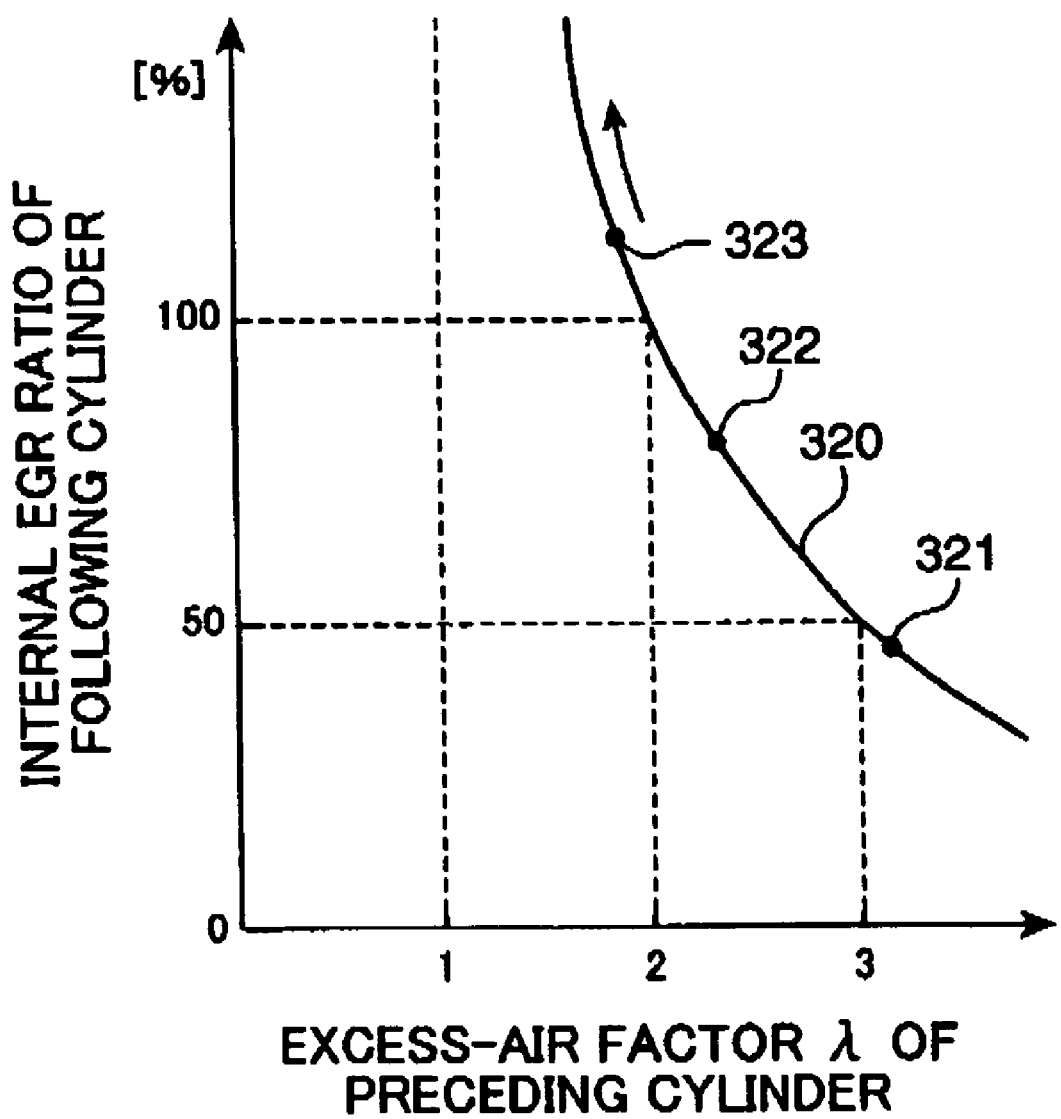
FIG. 39 is a characteristic diagram showing a relationship between an internal EGR ratio of following cylinders and an excess-air factor of preceding cylinders.

FIG. 39 is a characteristic diagram showing a relationship between the internal EGR ratio of the following cylinders 52B, 52C and the excess-air factor λ of the preceding cylinders 52A, 52D. As shown by a characteristic curve 320 in this Figure, the internal EGR ratio of the following cylinders 52B, 52C increases in inverse proportion to a decrease in the excess-air factor λ (or a rapid increase in load) of the preceding cylinders 52A, 52D.

Referring to FIG. 39, the internal EGR ratio of the following cylinders 52B, 52C becomes approximately equal to 50% or less when the engine is judged to be in the lower-load operating subrange CC1, because the fuel injection controller 305 sets the excess-air factor λ of the preceding cylinders 52A, 52D to approximately 3 or larger in this case. When the engine is judged to be in the medium-load operating subrange CC2, the internal EGR ratio of the following cylinders 52B, 52C falls within a range of approximately 50% to 100%, because the fuel injection controller 305 sets the excess-air factor λ of the preceding cylinders 52A, 52D within a range of approximately 2 to 3 (e.g., a point 322 on the characteristic curve 320) in this case. When the engine is judged to be in the higher-load operating subrange CC3, the internal EGR ratio of the following cylinders 52B, 52C becomes approximately equal to 100% or over, because the fuel injection controller 305 sets the excess-air factor λ of the preceding cylinders 52A, 52D to approximately 2 (e.g., a point 323 on the characteristic curve 320) or less in this case.

When the internal EGR ratio of the following cylinders 52B, 52C is increased, the amount of inert gases introduced into the following cylinders 52B, 52C increases. Although the temperature of intake air introduced into the following cylinders 52B, 52C increases as a consequence, it becomes difficult for the compression ignition to occur in this case so that the occurrence of knocking can be effectively avoided. This means that anti-knock performance of the engine is enhanced by increasing the internal EGR ratio of the following cylinders 52B, 52C with an increase in engine load in this embodiment.

When knocking occurs in the higher-load operating subrange CC3, the control device of the embodiment further decreases the air-fuel ratio in the preceding cylinders 52A, 52D and increase the internal EGR ratio of the following cylinders 52B, 52C (as shown by an arrow in FIG. 39), as necessary, to prevent knocking. If it is still impossible to prevent the occurrence of knocking, the fuel injection controller 305 sets the excess-air factor λ of the preceding cylinders 52A, 52D to 1 (stoichiometric air-fuel ratio) and interrupts fuel injection into the following cylinders 52B, 52C so that combustion would not occur in the following cylinders 52B, 52C.

The fuel injection controller 305 sets fuel injection timing for the special operation mode in the following fashion. Specifically, the fuel injection controller 305 controls the engine in such a manner that the fuel injectors 58 inject the fuel with appropriate timing during the compression stroke into the preceding cylinders 52A, 52D to produce a stratified mixture therein and the fuel is locally distributed around the spark plugs 55 at their ignition points. Also, the fuel injection controller 305 controls the engine in such a manner that the fuel injectors 58 inject the fuel into the following cylinders 52B, 52C during the intake stroke when the burned gas is introduced from the preceding cylinders 52A, 52D introduced into the following cylinders 52B, 52C to produce a uniform mixture therein.

Referring again to FIG. 36, the ignition controller 306 performs a control operation for controlling the ignition points and interrupting ignition by the spark plugs 55 in the individual cylinders 52A–52D according to the engine operating condition. In the special operation mode, the fuel injection controller 305 controls ignition in the individual cylinders 52A–52D as follows. Specifically, the ignition controller 306 causes the spark plugs 55 to forcibly ignite the mixture near the top dead center in the compression stroke in the preceding cylinders 52A, 52D to produce stratified charge combustion by burning the fuel locally distributed around the spark plugs 55. On the other hand, the ignition controller 306 deactivates the spark plugs 55 of the following cylinders 52B, 52C to disable forced ignition therein since the mixture in the following cylinders 52B, 52C is fired by the compression ignition in the special operation mode. To ensure stable firing of the mixture by the compression ignition and to adjust the timing of firing, however, the mixture is ignited immediately before the firing by performing the firing assist operation with the aid of the spark plugs 55.

There may be provided means for making a judgment on the temperature in the following cylinders 52B, 52C, for instance. In this case, the working of the ignition controller 306 may be such that the ignition controller 306 controls the engine to produce the compression ignition as discussed above if the temperature in the following cylinders 52B, 52C is judged to be high enough to produce the compression ignition, whereas the ignition controller 306 adjusts the ignition timing to forcibly ignite the mixture at a specific point in time near the top dead center in the compression stroke if the temperature in the following cylinders 52B, 52C is judged to be too low to produce the compression ignition.

To set a point in time of firing the mixture (or a firing assist ignition point) in the firing assist operation performed with the aid of the spark plug 5, the ignition controller 306 includes a firing assist ignition controller 307 and a knocking detector 308. The firing assist ignition controller 307 sets the firing assist ignition point such that the compression ignition of the mixture occurs with optimum timing. Typically, the firing assist ignition point is set to a point of 15° before the top dead center in the compression stroke in terms of crank angle, for example. If knocking occurs when the engine is in the higher-load operating subrange CC3, the firing assist ignition controller 307 retards the firing assist ignition point.

Figure 40:
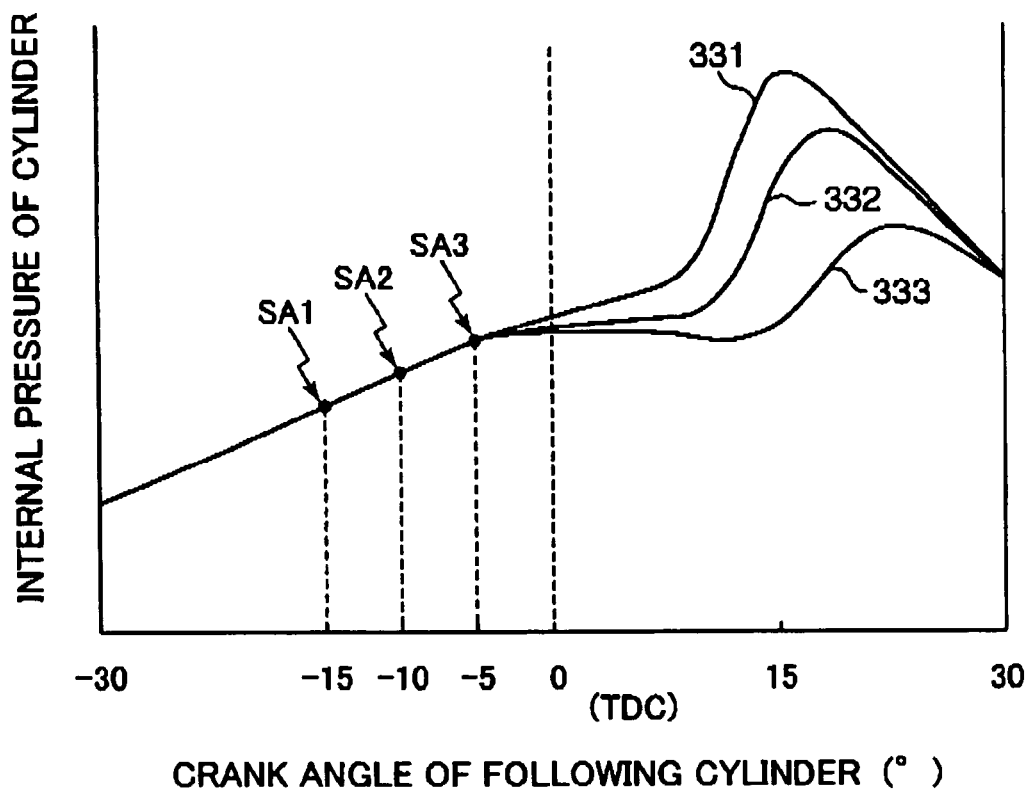
FIG. 40 is a diagram showing a relationship between the internal pressure of the following cylinders and the crank angle of the preceding cylinders observed when a mixture is fired by compression ignition accompanied by a firing assist operation performed with the aid of spark plugs.

FIG. 40 is a diagram showing a relationship between the internal pressure of the following cylinders 52B, 52C and the crank angle (CA) of the preceding cylinders 52A, 52D observed when the mixture is fired by the compression ignition accompanied by the firing assist operation performed with the aid of the spark plugs 55. In FIG. 40, the horizontal axis represents the crank angle in degrees of the following cylinders 52B, 52C, the crank angle 0° corresponding to the top dead center TDC in the compression stroke, while the vertical axis represents the internal pressure of the following cylinders 52B, 52C. A characteristic curve 331 shows the internal pressure of the following cylinders 52B, 52C observed when the mixture is fired by the firing assist operation with the aid of the spark plug 55 at a firing assist point SA1 (−15° C. CA). Similarly, a characteristic curve 332 shows the internal pressure of the following cylinders 52B, 52C observed when the mixture is fired by the firing assist operation at a firing assist point SA2 (−10° C. CA), and a characteristic curve 333 shows the internal pressure of the following cylinders 52B, 52C observed when the mixture is fired by the firing assist operation at a firing assist point SA3 (−5° C. CA). As can be seen from this Figure, a point at which the internal pressure of the following cylinders 52B, 52C reaches a maximum value (peak) is delayed as the firing assist ignition point is retarded. The more the peak of the internal pressure of the following cylinders 52B, 52C is delayed, the more slowly the mixture burns, because the effective volume of each combustion chamber 54 increases in the expansion stroke after the top dead center TDC. Therefore, the temperature in the following cylinders 52B, 52C decreases and knocking becomes less likely to occur. This means that the anti-knock performance of the engine improves when the firing assist point is retarded. On the other hand, however, the peak value of the internal pressure of the following cylinders 52B, 52C decreases and the engine output drops as the firing assist point is retarded. Accordingly, the amount of retardation of the firing assist point is set such that the reduction in engine output can be kept to a minimum according to engine characteristics while improving the anti-knock performance of the engine.

The knocking detector 308 judges whether knocking has occurred or ceased based on a signal fed from the knock sensor 270.

The present embodiment produces essentially the same working and advantageous effects as the third and fourth embodiments in that the special operation mode is selected in the part-load range operating range CC in which the mixture is combusted under extremely lean conditions in the preceding cylinders 52A, 52D while the mixture is combusted by the compression ignition in the following cylinders 52B, 52C, resulting in a significant improvement in fuel economy and the quality of emissions, whereas the normal operation mode is selected in the operating range DD on the high-load, high-speed side to maintain the desired engine output performance.

Figure 41:
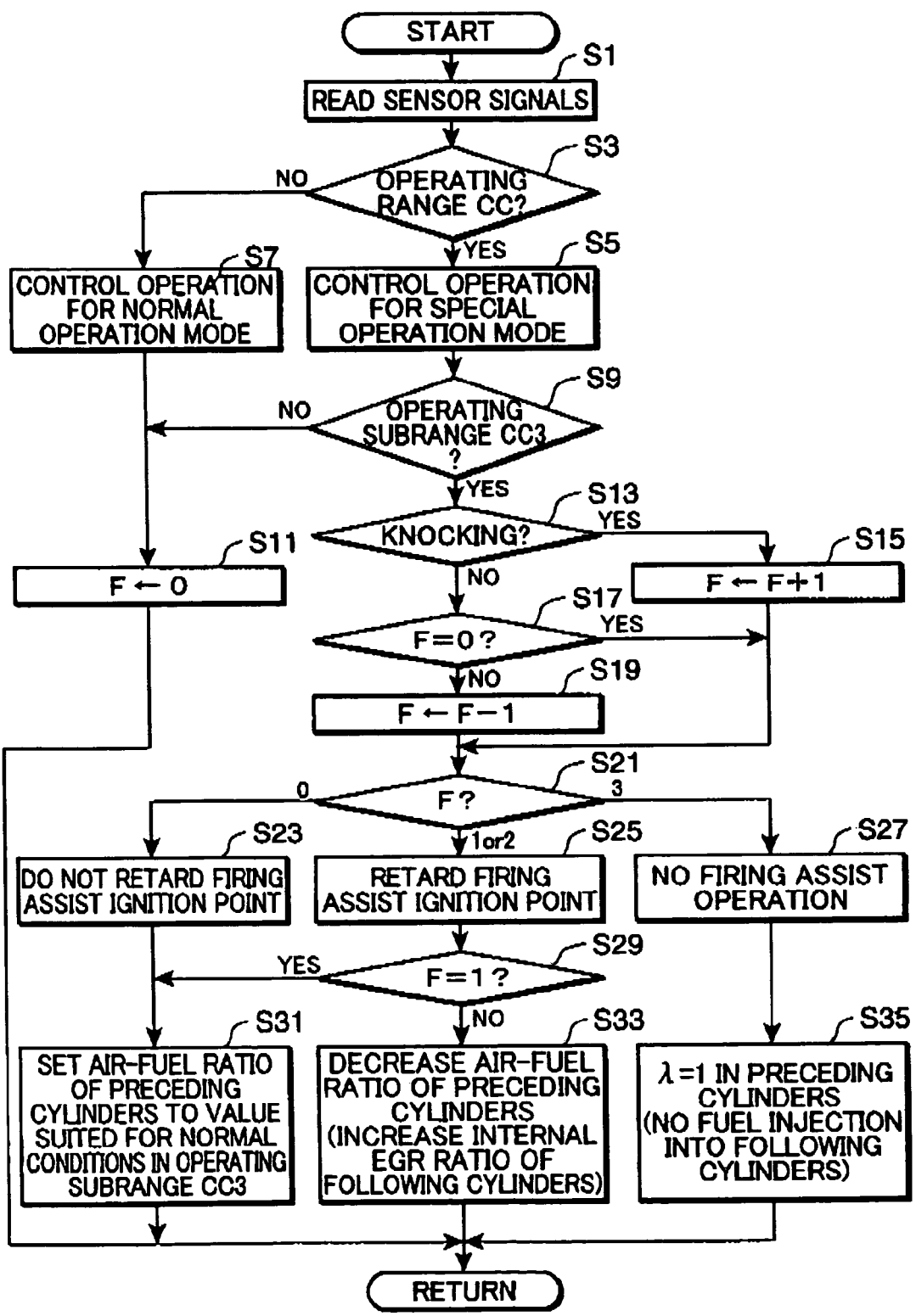
FIG. 41 is a flowchart generally showing a procedure followed in performing a control operation for suppressing knocking mainly in a special operation mode.

FIG. 41 is a flowchart generally showing a procedure followed by the ECU 300 in performing a control operation for suppressing knocking mainly in the special operation mode.

At the beginning of this control operation, the ECU 300 reads the individual sensor signals in step S1 and judges whether the engine is currently in the operating range CC in step S3. If the engine is judged to be in the operating range CC (Yes in step S3), the ECU 300 proceeds to step S5 to perform a control operation for the special operation mode. The ECU 300 further judges whether the engine is currently in the higher-load operating subrange CC3 in step S9. If the engine is judged to be in the higher-load operating subrange CC3 (Yes in step S9), the ECU 300 proceeds to step S13 to judge whether the engine is currently knocking. If the judgment result in step S13 is in the affirmative, i.e., the engine is currently knocking, the ECU 300 proceeds to step S15. Then, the ECU 300 adds 1 to a knocking suppression demand level F in step S15 and proceeds to step S21.

The knocking suppression demand level F is an index which indicates the degree of demanding the suppression of knocking. The knocking suppression demand level F takes a value ranging from 0 to 3. The larger the value of the knocking suppression demand level F, the higher the degree of demanding the suppression of knocking. Thus, a larger value of the knocking suppression demand level F indicates that it is more needed to control the engine in such a way that knocking would become less likely to occur. Under normal conditions where the engine is not knocking, the knocking suppression demand level F is set to an initial value 0 (F=0).

If the judgment result in step S13 is in the negative, i.e., the engine is not knocking, the ECU 300 judges whether the knocking suppression demand level F is 0 (F=0) in step S17. If the judgment result in step S17 is in the affirmative, the ECU 300 proceeds to step S21. A negative judgment, if made in step S17, indicates that the knocking suppression demand level F is not 0. As will be later discussed, the ECU 300 performs the control operation for suppressing knocking according to the value of the knocking suppression demand level F when the value is other than 0. When knocking has ceased as a result of the knocking suppressing control operation, both the judgment result in step S13 and the judgment result in step S17 become negative. In this case, the ECU 300 proceeds to step S19, in which the value 1 is subtracted from the current value of the knocking suppression demand level F, and further proceeds to step S21.

In step S21 (and in step S29), the ECU 300 determines the value of the knocking suppression demand level F. If F=0 in step S21, the ECU 300 causes the control device to control the engine in a manner suited for normal conditions. Specifically, the firing assist ignition controller 307 does not retard the firing assist ignition point (step S23) and the ECU 300 sets the air-fuel ratio of the preceding cylinders 52A, 52D to a value suited for normal conditions in the higher-load operating subrange CC3 (step S31). If F=1 (or 2) in step S21 (Yes in step S29), the firing assist ignition controller 307 retards the firing assist ignition point (step S25), and the ECU 300 sets the air-fuel ratio of the preceding cylinders 52A, 52D to a value suited for normal conditions in the higher-load operating subrange CC3 (step S31). The anti-knock performance of the engine improves when the firing assist point is retarded in this way. If F=2 (No in step S29), the firing assist ignition controller 307 retards the firing assist ignition point (step S25), and the ECU 300 further decreases the air-fuel ratio of the preceding cylinders 52A, 52D (or causes the excess-air factor λ to approach 1) in step S33. As a result, the internal EGR ratio of the following cylinders 52B, 52C increases, causing a further improvement in anti-knock performance. If F=3 ("3" in step S21), the control device causes the engine to produce combustion at the stoichiometric air-fuel ratio (excess-air factor λ=1) in the preceding cylinders 52A, 52D and no combustion in the following cylinders 52B, 52C in step S35, so that the ECU 300 interrupts fuel injection into the following cylinders 52B, 52C and does not perform the firing assist operation (steps S27, S35). As no combustion is made in the following cylinders 52B, 52C in this case, it is possible to prevent knocking in a reliable fashion.

Since the anti-knock performance of the engine is enhanced in a step-by-step manner according to varying knocking conditions as seen above, it is possible to suppress the occurrence of knocking in a best possible manner by always selecting minimum anti-knock measures. In this way, the operating range in which the special operation mode is selected can be extended toward the higher-load side as much as possible and achieve a significant reduction in fuel cost.

If the judgment result in step S3 is in the negative, the ECU 300 proceeds to step S7 to perform a control operation for the normal operation mode and returns to the beginning of the procedure. In this case, the knocking suppression demand level F is set to 0 (step S11). Also, if the judgment result in step S9 is in the negative, the ECU 300 returns to the beginning of the procedure via step S11.

As previously discussed, first exhaust valves 64a and the first intake valves 63a are set to the activated state while the second exhaust valves 64b and the second intake valves 63b are set to the deactivated state in the normal operation mode. Therefore, flow paths for drawing fresh air and exhaust gases form an independent cylinder configuration as shown in FIG. 19, in which the intake ports 61, 61a and the exhaust ports 62, 62a of the individual cylinders 52A–52D work substantially independently of one another, so that fresh air is introduced through the intake passage 65 and the intake ports 61, 61a into the respective cylinders 52A–52D and the burned gas is discharged from the cylinders 52A–52D into the exhaust passage 70 through the respective exhaust ports 62, 62a in the normal operation mode.

In the normal operation mode, the engine is controlled in such a way that fresh air is introduced and the exhaust gas is discharged with optimum intake and exhaust timing according to the engine load and the mixture is combusted by the forced ignition under of uniformly dispersed conditions with the amounts of intake air and injected fuel controlled to produce a mixture having the stoichiometric air-fuel ratio or a richer mixture. It is therefore possible to obtain a high engine output in the operating range DD on the high-load, high-speed side.

As one form of switching the engine from the special operation mode to the normal operation mode, the operating condition of the engine may be shifted from the higher-load operating subrange CC3 to the operating range DD by a relatively high load increasing rate as a result of quick depression of an accelerator pedal, for example, such as a transfer from an operating condition 310 to an operating condition 311 shown in FIG. 37. Temporary knocking (single-stroke knocking) tends to occur during a short time lag before the engine is completely set to the normal operation mode in such a case as well. To prevent this kind of knocking, the control device of this embodiment is so constructed as to perform a special control operation to make the air-fuel ratio in the preceding cylinders 52A, 52D equal to the stoichiometric air-fuel ratio and to interrupt combustion in the following cylinders 52B, 52C for a predetermined period of time before the engine is completely set to the normal operation mode when the engine is switched from the special operation mode to the normal operation mode at a load increasing rate higher than a predetermined rate. This control operation makes it possible to instantly suppress the single-stroke knocking without the need to wait until the engine is completely set to the normal operation mode.

This control operation to be carried out for the aforementioned specific period of time may be performed when any temporary knocking has occurred, or regardless of whether knocking of this kind has occurred or not. If the control operation is performed regardless of the occurrence of temporary knocking, the transfer from the special operation mode to the normal operation mode is once suspended when the engine load rapidly increases for a moment. Thus, when there is a spikelike momentary change in engine load which would cause the engine to return to the operating range CC immediately after the momentary change due to a rapid decrease in engine load (e.g., a release of the accelerator pedal), the gas flow paths may be left in the dual two-cylinder interconnect configuration. The aforementioned specific period of time during which the aforementioned special control operation is performed may either be predetermined or variable depending on the severity or duration of knocking.

Figure 42:
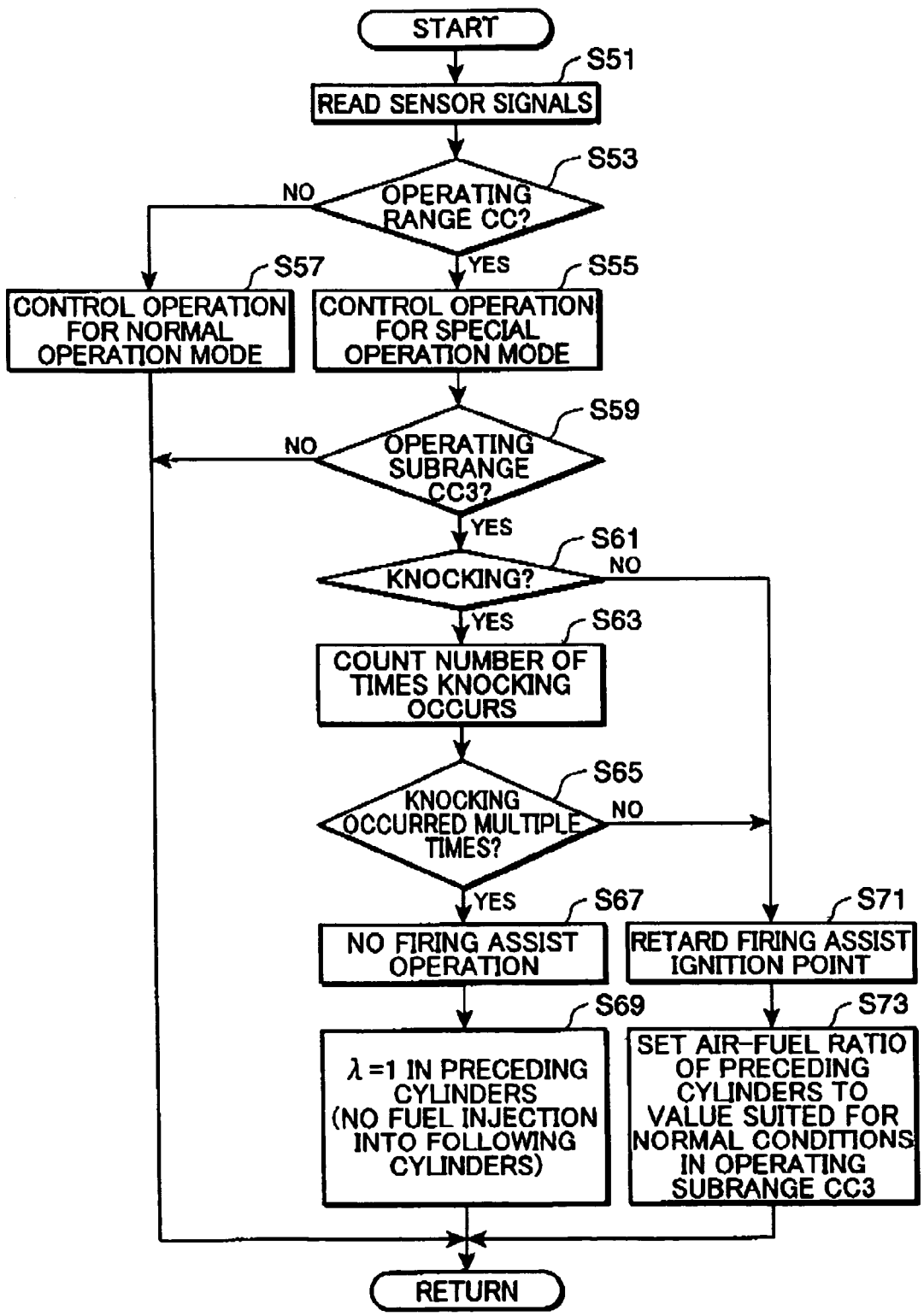
FIG. 42 is a flowchart showing a variation of the procedure of FIG. 41.

Next, a variation of the procedure of FIG. 41 followed by the ECU 300 in performing the control operation for suppressing knocking in the special operation mode is explained. FIG. 42 is a flowchart generally showing the variation of the procedure for performing the control operation for suppressing knocking in the special operation mode.

At the beginning of this control operation, the ECU 300 reads the individual sensor signals in step S51 and judges whether the engine is currently in the operating range CC in step S53. If the engine is judged to be in the operating range CC (Yes in step S53), the ECU 300 proceeds to step S55 to perform the control operation for the special operation mode. The ECU 300 further judges whether the engine is currently in the higher-load operating subrange CC3 in step S59. If the engine is judged to be in the higher-load operating subrange CC3 (Yes in step S59), the ECU 300 proceeds to step S61 to judge whether the engine is currently knocking. If the judgment result in step S61 is in the affirmative, i.e., the engine is currently knocking, the ECU 300 proceeds to step S63 and counts the number of times that knocking occurs. When knocking has occurred a predetermined number of times in succession (Yes in step S65), the control device causes the engine to produce combustion at the stoichiometric air-fuel ratio (excess-air factor $\lambda=1$) in the preceding cylinders 52A, 52D and no combustion in the following cylinders 52B, 52C, so that the ECU 300 interrupts fuel injection into the following cylinders 52B, 52C and does not perform the firing assist operation (steps S67, S69). As no combustion is made in the following cylinders 52B, 52C in this case, it is possible to prevent knocking in a reliable fashion.

If the engine is not knocking (No in step S61) or has just produced single-stroke knocking which has immediately ceased (No in step S65), the firing assist ignition controller 307 retards the firing assist ignition point (step S71), and the ECU 300 sets the air-fuel ratio of the preceding cylinders 52A, 52D to a value suited for normal conditions in the higher-load operating subrange CC3 (step S73). It is possible to prevent knocking as the anti-knock performance of the engine is improved in advance by retarding the firing assist ignition point in the aforementioned manner.

According to the aforementioned variation of the procedure for performing the knocking suppressing control operation, the control device continues to perform the ordinary control operation when the single-stroke knocking has occurred, without taking any special action against the single-stroke knocking. Thus, the variation of the procedure helps prevent frequent changes in the mode of suppressing engine knock. Nevertheless, the control device can suppress knocking in a reliable fashion when it has occurred the predetermined number of times in succession.

If the judgment result in step S53 is in the negative, the ECU 300 proceeds to step S57 to perform the control operation for the normal operation mode and returns to the beginning of the procedure. Also, if the judgment result in step S59 is in the negative, the ECU 300 returns to the beginning of the procedure without performing the knocking suppressing control operation.

While the invention has thus far been described with reference to the preferred embodiments, the invention is not limited to those embodiments and variations thereof but various changes and modifications are possible within the scope of the appended claims.

For example, the knocking suppressing control operation of FIG. 41 may be modified such that the control device switches the engine to the normal operation mode when the knocking suppression demand level F is judged to be equal to 3 (F=3) in step S21. In the normal operation mode, the engine produces combustion by drawing in fresh air of which temperature is approximately equal to atmospheric temperature. Therefore, the temperature in the following cylinders 52B, 52C becomes lower than in the normal operation mode and the anti-knock performance of the engine can be sufficiently enhanced.

In the foregoing embodiment, the ratio of inert gases contained in the burned gas introduced from the preceding cylinders 52A, 52D into the following cylinders 52B, 52C is increased to increase the internal EGR ratio in the following cylinders 52B, 52C. In addition to this arrangement, the control device may have a structure to recirculate the exhaust gas with the aid of gas flows produced when the exhaust gas is drawn in and let out for further increase the internal EGR ratio. Also, the embodiment may be modified to include EGR passages connecting the branched exhaust channels 71 or the exhaust passage 70 to the intercylinder gas channels 72 and EGR valves disposed in the EGR passages to perform external recirculation of the exhaust gas into the following cylinders 52B, 52C so that the EGR ratio of the following cylinders 52B, 52C is increased by the provision of these EGR passages or by a combination of these EGR passages and the aforementioned measures for increasing the internal EGR ratio.

The engine operation mode is not necessarily limited to the normal operation mode and the special operation mode but other operation mode(s) may be made available. Additionally, although the special operation mode range CC is divided into the aforementioned three subranges (CC1, CC2, CC3) in the foregoing embodiment, the special operation mode range CC may be divided into two, four or more subranges. As an alternative to dividing the special operation mode range CC into such distinct subranges as CC1, CC2 and CC3, the air-fuel ratio in the preceding cylinders 52A, 52D may be continuously varied according to the engine operating condition within the operating range CC, for example.

While the fifth embodiment has been described with reference to the four-cylinder engine, the invention is not limited thereto but is also applicable to engines having more than four cylinders, in which each pair of preceding and following cylinders is a combination of two cylinders of which exhaust and intake strokes overlap one another. In addition, the fuel supplied to the following cylinders 52B, 52C need not necessarily be injected directly into their combustion chambers 54 by the fuel injectors 58 of the direct injection type. As an example, there may be provided a fuel supply mechanism of an appropriate type in the intercylinder gas channels 72 instead of the direct-injection fuel injectors 58.

This application is based on Japanese Patent Application Nos. 2003-162169, 2003-181782, 2003-181783, and 2003-341798 filed in Japan Patent Office on Jun. 06, 2003, Jun. 25, 2003, Jun. 25, 2003, and Sep. 30. 2003, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for a spark-ignition engine in which a mixture in a combustion chamber is fired by compression ignition in a part-load range under warm-running conditions, said control device comprising:

an EGR controller for regulating the temperature in the combustion chamber at a point of the compression ignition by performing an EGR control operation in such a way that hot burned gas is left in the combustion chamber in a lower-load, lower-speed region within a compression ignition combustion range, which is an operating range in which the mixture is fired by the compression ignition, whereas cold burned gas is introduced into the combustion chamber in a higher-load, higher-speed region within the compression ignition combustion range; and a firing assist unit for inducing the compression ignition at least when ignitability of the mixture decreases as a result of introduction of the cold burned gas in the compression ignition combustion range.

2. The control device for the spark-ignition engine according to claim 1, wherein said EGR controller performs the EGR control operation in such a way that the amount of the hot burned gas left in the combustion chamber decreases as engine load increases in the compression ignition combustion range and the amount of the cold burned gas introduced into the combustion chamber increases as the engine load increases in the higher-load region within the compression ignition combustion range.

3. The control device for the spark-ignition engine according to claim 1, wherein said EGR controller includes:

a valve operation controller for regulating the amount of internal EGR gas by controlling the working of intake and exhaust valves; and a cold EGR controller for regulating the amount of external EGR gas recirculated from an exhaust passage through an EGR passage provided with a cooling unit.

4. The control device for the spark-ignition engine according to claim 1, wherein said firing assist unit is made essentially of an ignition controller for igniting the mixture in a cylinder before a top dead center in a compression stroke.

5. A control device for a spark-ignition engine in which a mixture in a combustion chamber is fired by compression ignition in a part-load range under warm-running conditions, said control device comprising:

an octane rating identifier for determining the octane number of fuel supplied;

a firing assist unit for inducing the compression ignition by firing the mixture in the combustion chamber at a point preceding a top dead center in a compression stroke at least in part of an operating range in which the mixture is fired by the compression ignition; and a firing assist ignition timing setter for setting an ignition point according to the octane number determined by said octane rating identifier in the operating range in which the mixture is fired by the compression ignition for inducing the compression ignition;

wherein said firing assist ignition timing setter progressively advances the ignition point as the octane number increases.

6. The control device for the spark-ignition engine according to claim 5 further comprising:

an intra-cylinder temperature limiter for decreasing the temperature in a cylinder at compression stroke in a special operation region in which the temperature in the cylinder tends to excessively increase due to compression within the operating range in which the compression ignition is performed:

wherein said firing assist unit fires the mixture for inducing the compression ignition at least in the special operation region.

7. The control device for the spark-ignition engine according to claim 5, wherein said firing assist ignition timing setter has a map defining a relationship between the engine load and appropriate ignition points for fuels having different octane numbers.

8. The control device for the spark-ignition engine according to claim 5, wherein said octane rating identifier determines the octane number of the fuel based on a detected combustion pattern.

9. The control device for the spark-ignition engine according to claim 5 further comprising as means for detecting the combustion pattern an ion current sensor for detecting an ion current occurring as a result of combustion in the combustion chamber.

10. The control device for the spark-ignition engine according to claim 5 further comprising as means for detecting the combustion pattern a pressure sensor for detecting the pressure in the combustion chamber.

11. The control device for the spark-ignition engine according to claim 5 further comprising as means for detecting the combustion pattern a knock sensor for detecting engine vibrations.

12. The control device for the spark-ignition engine according to claim 5, wherein said spark-ignition engine has a plurality of cylinders in which successive combustion cycles occur with specific phase delays;

wherein a special operation mode is selected as the mode of controlling intake and exhaust operation and conditions of combustion in the part-load range of the engine, and a pair of preceding and following cylinders of which exhaust and intake strokes overlap is connected to form a two-cylinder interconnect configuration in the special operation mode in which burned gas discharged from the preceding cylinder which is currently in the exhaust stroke is introduced into the following cylinder which is currently in the intake stroke through an intercylinder gas channel and exhaust gas discharged from the following cylinder is led to an exhaust passage, a lean mixture having an air-fuel ratio higher than the stoichiometric air-fuel ratio is combusted in the preceding cylinder, and the fuel is supplied to the burned gas having a high air-fuel ratio introduced from the preceding cylinder into the following cylinder so that a mixture thus produced in the following cylinder is combusted by the compression ignition;

wherein said firing assist unit fires the mixture in the following cylinder at said point preceding the top dead center in the compression stroke of the following cylinder at least in part of the operating range in which the mixture is fired by the compression ignition; and wherein said firing assist ignition timing setter sets the ignition point for the following cylinder according to the octane number of the fuel in the operating range in which the mixture is fired by the said firing assist unit for inducing the compression ignition in the following cylinder.

13. The control device for the spark-ignition engine according to claim 12, wherein the spark-ignition engine is a four-cycle multicylinder engine provided with spark plugs disposed in individual cylinders and a three-way catalyst disposed in the exhaust passage, and wherein the mixture in the following cylinder is combusted at the stoichiometric air-fuel ratio at least when the engine is in the special operation mode in the part-load range, and the three-way catalyst disposed in the exhaust passage to which the exhaust gas discharged from the following cylinder is led exhibits high converting performance with respect to HC, CO and NOx at the stoichiometric air-fuel ratio.

14. A control device for a spark-ignition engine having a plurality of cylinders in which successive combustion cycles occur with specific phase delays, wherein a special operation mode is selected as the mode of controlling intake and exhaust operation and conditions of combustion in a part-load range of the engine, and
wherein a pair of preceding and following cylinders of which exhaust and intake strokes overlap is connected to form a two-cylinder interconnect configuration in the special operation mode in which burned gas discharged from the preceding cylinder which is currently in the exhaust stroke is introduced into the following cylinder which is currently in the intake stroke through an intercylinder gas channel and exhaust gas discharged from the following cylinder is led to an exhaust passage, a lean mixture having an air-fuel ratio higher than the stoichiometric air-fuel ratio is combusted in the preceding cylinder, and fuel is supplied to the burned gas having a high air-fuel ratio introduced from the preceding cylinder into the following cylinder so that a mixture thus produced is combusted in the following cylinder, said control device comprising:
a firing assist unit for accelerating compression ignition in the following cylinder;
wherein the air-fuel ratio in the preceding cylinder is set to a value equal to or larger than the stoichiometric air-fuel ratio while said firing assist unit accelerates the compression ignition in the following cylinder in a lower-load, lower-speed region within the part-load range in which combustion is made in the special operation mode.

15. The control device for the spark-ignition engine according to claim 14, wherein said firing assist unit is made essentially of a spark ignition controller which fires the mixture in the following cylinder immediately before the top dead center in the compression stroke.

16. The control device for the spark-ignition engine according to claim 14, wherein combustion in the following cylinder is made with the air-fuel ratio therein set to a value approximately equal to the stoichiometric air-fuel ratio in the special operation mode.

17. The control device for the spark-ignition engine according to claim 14 further comprising:
an octane rating identifier for determining the octane number of the fuel;
wherein the higher the octane number of the fuel determined by said octane rating identifier, the more a firing assist range in which the compression ignition in the following cylinder is induced by said firing assist unit is broaden to a higher-load, higher-speed side of the part-load range.

18. The control device for the spark-ignition engine according to claim 14, wherein stratified charge combustion is produced in the preceding cylinder in the firing assist range in which the compression ignition in the following cylinder is induced by said firing assist unit.

19. The control device for the spark-ignition engine according to claim 14, wherein the compression ignition in the following cylinder is induced by said firing assist unit while the air-fuel ratio in the preceding cylinder is made equal to twice or higher than the stoichiometric air-fuel ratio from engine idle when the engine is warm.

20. The control device for the spark-ignition engine according to claim 14 further comprising:
an anti-knock unit for suppressing knocking of the following cylinder;
wherein the compression ignition in the following cylinder is induced by said firing assist unit while said anti-knock unit suppresses knocking of the following cylinder in medium-load, medium-speed to higher-load, higher-speed regions within the part-load range of the engine.

21. The control device for the spark-ignition engine according to claim 20, wherein said anti-knock unit is made essentially of a cooling controller for cooling the burned gas introduced from the preceding cylinder into the following cylinder through the intercylinder gas channel.

22. The control device for the spark-ignition engine according to claim 20, wherein said anti-knock unit is made essentially of an effective compression ratio reducer for reducing the effective compression ratio of the following cylinder.

23. The control device for the spark-ignition engine according to claim 14, wherein the spark-ignition engine is a four-cycle multicylinder engine provided with spark plugs disposed in individual cylinders and a three-way catalyst disposed in the exhaust passage, and wherein the mixture in the following cylinder is combusted at the stoichiometric air-fuel ratio at least when the engine is in the special operation mode in the part-load range, and the three-way catalyst disposed in the exhaust passage to which the exhaust gas discharged from the following cylinder is led exhibits high converting performance with respect to HC, CO and NOx at the stoichiometric air-fuel ratio.

24. A control device for a multicylinder spark-ignition engine of which individual cylinders go through successive cycles of intake, compression, expansion and exhaust strokes with specific phase delays, wherein gas flow paths can be connected to form a two-cylinder interconnect configuration in which a pair of preceding and following cylinders of which exhaust and intake strokes overlap is connected in such a way that burned gas discharged from the preceding cylinder which is currently in the exhaust stroke is introduced directly into the following cylinder which is currently in the intake stroke through an intercylinder gas channel and exhaust gas discharged from the following cylinder is led to an exhaust passage, and said control device offers at least a special operation mode as an engine operation mode in which the gas flow paths are connected to form the two-cylinder interconnect configuration so that a lean mixture having an air-fuel ratio higher than the stoichiometric air-fuel ratio by a specific amount is combusted in the preceding cylinder while homogeneous charge combustion is produced in the following cylinder by firing a mixture produced by supplying fuel to the burned gas having a high air-fuel ratio introduced from the preceding cylinder into the following cylinder, said control device comprising:

an air-fuel ratio controller for setting the air-fuel ratio in each of the cylinders;

an ignition controller for setting an ignition point of a spark plug disposed in each of the cylinders; and a knocking detector for detecting engine knock;

wherein the EGR ratio is increased in the following cylinder in an engine operating region on a relatively high-load side and said ignition controller enhances anti-knock performance of the engine by retarding a firing assist ignition point in a case where the mixture in the following cylinder is fired by compression ignition by performing a firing assist operation while the engine is operated in the special operation mode; and wherein said air-fuel ratio controller decreases the air-fuel ratio in the preceding cylinder to enrich the mixture therein when said knocking detector has detected engine knock.

25. The control device for the spark-ignition engine according to claim 24, wherein said ignition controller begins to retard the firing assist ignition point if said knocking detector detects engine knock, said air-fuel ratio controller performs control operation for enriching the mixture in the preceding cylinder by decreasing the air-fuel ratio if said knocking detector still detects engine knock while the firing assist ignition point of the following cylinder is being retarded, and the air-fuel ratio in the preceding cylinder is made equal to the stoichiometric air-fuel ratio and combustion in the following cylinder is interrupted if said knocking detector still detects engine knock while the control operation for enriching the mixture in the preceding cylinder is underway.

26. The control device for the spark-ignition engine according to claim 24, wherein the gas flow paths can be connected to form an independent cylinder configuration in which fresh air is drawn through an intake passage to intake ports of the individual cylinders and the exhaust gas discharged through exhaust ports of the individual cylinders is led to the exhaust passage, said control device offers a normal operation mode as an additional engine operation mode in which combustion in the individual cylinders is produced with the gas flow paths connected to form the independent cylinder configuration, said ignition controller begins to retard the firing assist ignition point if said knocking detector detects engine knock, said air-fuel ratio controller performs control operation for enriching the mixture in the preceding cylinder by decreasing the air-fuel ratio if said knocking detector still detects engine knock while the firing assist ignition point of the following cylinder is being retarded, and said control device switches the engine from the special operation mode to the normal operation mode if said knocking detector still detects engine knock while the control operation for enriching the mixture in the preceding cylinder is underway.

27. The control device for the spark-ignition engine according to claim 24, wherein the spark-ignition engine is a four-cycle multicylinder engine provided with spark plugs disposed in individual cylinders and a three-way catalyst disposed in the exhaust passage, and wherein the mixture in the following cylinder is combusted at the stoichiometric air-fuel ratio at least when the engine is in the special operation mode in the part-load range, and the three-way catalyst disposed in the exhaust passage to which the exhaust gas discharged from the following cylinder is led exhibits high converting performance with respect to HC, CO and NOx at the stoichiometric air-fuel ratio.

28. A control device for a multicylinder spark-ignition engine of which individual cylinders go through successive cycles of intake, compression, expansion and exhaust strokes with specific phase delays, wherein gas flow paths can be connected to form a two-cylinder interconnect configuration in which a pair of preceding and following cylinders of which exhaust and intake strokes overlap is connected in such a way that burned gas discharged from the preceding cylinder which is currently in the exhaust stroke is introduced directly into the following cylinder which is currently in the intake stroke through an intercylinder gas channel and exhaust gas discharged from the following cylinder is led to an exhaust passage, and said control device offers at least a special operation mode as an engine operation mode in which the gas flow paths are connected to form the two-cylinder interconnect configuration so that a lean mixture having an air-fuel ratio higher than the stoichiometric air-fuel ratio by a specific amount is combusted in the preceding cylinder while homogeneous charge combustion is produced in the following cylinder by firing a mixture produced by supplying fuel to the burned gas having a high air-fuel ratio introduced from the preceding cylinder into the following cylinder, said control device comprising:

an air-fuel ratio controller for setting the air-fuel ratio in each of the cylinders;

an ignition controller for setting an ignition point of a spark plug disposed in each of the cylinders; and a knocking detector for detecting engine knock;

wherein the EGR ratio is increased in the following cylinder in an engine operating region on a relatively high-load side and said ignition controller retards a firing assist ignition point in a case where the mixture in the following cylinder is fired by compression ignition by performing a firing assist operation while the engine is operated in the special operation mode; and wherein the air-fuel ratio in the preceding cylinder is made equal to the stoichiometric air-fuel ratio and combustion in the following cylinder is interrupted if said knocking detector detects engine knock at least a predetermined number of times in succession while the firing assist ignition point of the following cylinder is being retarded.

29. The control device for the spark-ignition engine according to claim 28, wherein the spark-ignition engine is a four-cycle multicylinder engine provided with spark plugs disposed in individual cylinders and a three-way catalyst disposed in the exhaust passage, and wherein the mixture in the following cylinder is combusted at the stoichiometric air-fuel ratio at least when the engine is in the special operation mode in the part-load range, and the three-way catalyst disposed in the exhaust passage to which the exhaust gas discharged from the following cylinder is led exhibits high converting performance with respect to HC, CO and NOx at the stoichiometric air-fuel ratio.

30. A control device for a multicylinder spark-ignition engine of which individual cylinders go through successive cycles of intake, compression, expansion and exhaust strokes with specific phase delays, wherein gas flow paths can be connected to form either of a two-cylinder interconnect configuration, in which a pair of preceding and following cylinders of which exhaust and intake strokes overlap is connected in such a way that burned gas discharged from the preceding cylinder which is currently in the exhaust stroke is introduced directly into the following cylinder which is currently in the intake stroke through an intercylinder gas channel and exhaust gas discharged from the following cylinder is led to an exhaust passage, and an independent cylinder configuration, in which fresh air is drawn through an intake passage to intake ports of the individual cylinders and the exhaust gas discharged through exhaust ports of the individual cylinders is led to the exhaust passage, and said control device offers as engine operation modes a special operation mode to be selected in a low-load, low-speed operating range in which the gas flow paths are connected to form the two-cylinder interconnect configuration so that a lean mixture having an air-fuel ratio higher than the stoichiometric air-fuel ratio by a specific amount is combusted in the preceding cylinder while homogeneous charge combustion is produced in the following cylinder by firing a mixture produced by supplying fuel to the burned gas having a high air-fuel ratio introduced from the preceding cylinder into the following cylinder, and a normal operation mode to be selected in a high-load, high-speed operating range, in which combustion in the individual cylinders is produced with the gas flow paths connected to form the independent cylinder configuration, said control device comprising:

an air-fuel ratio controller for setting the air-fuel ratio in each of the cylinders; and an ignition controller for setting an ignition point of a spark plug disposed in each of the cylinders;

wherein the EGR ratio is increased in the following cylinder in an engine operating region on a relatively high-load side in a case where the mixture in the following cylinder is fired by compression ignition by performing a firing assist operation while the engine is operated in the special operation mode, and said control device performs a special control operation to make the air-fuel ratio in the preceding cylinder equal to the stoichiometric air-fuel ratio and to interrupt combustion in the following cylinder for a predetermined period of time before the engine is completely transferred to the normal operation mode when the engine has reached the operating range in which the normal operation mode should be selected at a load increasing rate higher than a predetermined rate.

31. The control device for the spark-ignition engine according to claim 30, wherein the spark-ignition engine is a four-cycle multicylinder engine provided with spark plugs disposed in individual cylinders and a three-way catalyst disposed in the exhaust passage, and wherein the mixture in the following cylinder is combusted at the stoichiometric air-fuel ratio at least when the engine is in the special operation mode in the part-load range, and the three-way catalyst disposed in the exhaust passage to which the exhaust gas discharged from the following cylinder is led exhibits high converting performance with respect to HC, CO and NOx at the stoichiometric air-fuel ratio.

\* \* \* \* \*